(12) United States Patent
Chin et al.

(10) Patent No.: US 10,443,976 B2
(45) Date of Patent: Oct. 15, 2019

(54) CARRIAGE FOR ROCKET LAUNCH SYSTEM

(71) Applicants: Howard M. Chin, Kingston (JM); Kimberly A. Carraha, Weston, FL (US)

(72) Inventors: Howard M. Chin, Kingston (JM); Kimberly A. Carraha, Weston, FL (US)

( * ) Notice: Subject to any disclaimer, the term of this patent is extended or adjusted under 35 U.S.C. 154(b) by 19 days.

(21) Appl. No.: 15/627,558

(22) Filed: Jun. 20, 2017

(65) Prior Publication Data

US 2017/0284768 A1 Oct. 5, 2017

Related U.S. Application Data

(62) Division of application No. 13/577,813, filed as application No. PCT/US2011/000237 on Feb. 10, 2011, now Pat. No. 9,739,567.

(Continued)

(51) Int. Cl.
*B64G 1/00* (2006.01)
*F41F 3/06* (2006.01)
(Continued)

(52) U.S. Cl.
CPC ............... *F41F 3/06* (2013.01); *B64G 1/005* (2013.01); *B64G 6/00* (2013.01); *F41F 3/04* (2013.01); *B64G 2001/643* (2013.01)

(58) Field of Classification Search
CPC .... B64D 1/00; B64D 7/00; B64D 7/08; B64F 1/04; B64F 1/32; B64F 3/00; B64F 3/02; F41F 3/00; F41F 3/04; F41F 3/06
See application file for complete search history.

(56) References Cited

U.S. PATENT DOCUMENTS

| 1,812,955 | A | | 7/1931 | Horni |
| 2,807,194 | A | * | 9/1957 | Cammin-Christy .... F41F 1/085 89/1.815 |

(Continued)

FOREIGN PATENT DOCUMENTS

| JP | S52118799 A | 10/1977 |
| JP | H0321592 A | 1/1991 |

(Continued)

OTHER PUBLICATIONS

"Rockoons," JP Aerospace [online], Dec. 7, 2009 [retrieved Aug. 31, 2011 from the Internet] <URL: http://web.archive.org/web/20091207004730/http://www.jpaerospace.com/rockoons.

(Continued)

*Primary Examiner* — Richard R. Green
*Assistant Examiner* — Michael A. Fabula
(74) *Attorney, Agent, or Firm* — Walter | Haverfield LLP; D. Peter Hochberg; Sean F. Mellino

(57) ABSTRACT

A carriage for use in a rocket launch system for cooperating with an electromotive cableway traction drives conveyed beneath a two axis pivot anchored to the earth, elevated into a co-axial transfer tube leading to three primary tether cables whose weight is offset by balloons. The carriage has traction drives which grip cables from which they derive power and rotate to drive the carriage from the low altitude to the high altitude. The traction drives rotate in the opposite direction as the carriage descends the cable following the launch of a rocket under gravitational force. The kinetic energy of the traction drive is converted to electrical energy which is fed back to the cables during descent of the carriage.

15 Claims, 40 Drawing Sheets

Related U.S. Application Data

(60) Provisional application No. 61/337,645, filed on Feb. 11, 2010.

(51) Int. Cl.
  *B64G 6/00* (2006.01)
  *F41F 3/04* (2006.01)
  *B64G 1/64* (2006.01)

(56) References Cited

U.S. PATENT DOCUMENTS

| | | | |
|---|---|---|---|
| 2,949,823 A * | 8/1960 | Ross | F41A 23/42 |
| | | | 280/79.6 |
| 2,987,964 A * | 6/1961 | Logan | F41F 3/04 |
| | | | 414/680 |
| 3,032,772 A | 5/1962 | Fonash | |
| 3,034,131 A | 5/1962 | Lent | |
| 3,081,626 A | 3/1963 | Shaller | |
| 3,084,599 A | 4/1963 | Webster et al. | |
| 3,160,060 A | 12/1964 | Zsoka et al. | |
| 3,162,088 A * | 12/1964 | Landstrom | F41A 9/26 |
| | | | 89/1.802 |
| 3,173,334 A * | 3/1965 | Landstrom | F41F 3/04 |
| | | | 89/1.802 |
| 3,191,788 A * | 6/1965 | Hopfeld | B66F 9/125 |
| | | | 414/420 |
| 3,304,115 A | 2/1967 | Brooks et al. | |
| 3,343,536 A | 9/1967 | Brisson et al. | |
| 3,363,266 A | 1/1968 | Swet | |
| 3,405,406 A | 10/1968 | Vykukal | |
| 3,411,156 A | 11/1968 | Feher | |
| 3,412,730 A | 11/1968 | MacLeod | |
| 3,437,285 A * | 4/1969 | Manfredi | B64G 5/00 |
| | | | 244/171.4 |
| 3,463,150 A | 8/1969 | Penfold | |
| 3,487,765 A | 1/1970 | Lang | |
| 3,517,445 A | 6/1970 | Harris | |
| 3,534,406 A | 10/1970 | Barthlome | |
| 3,534,407 A | 10/1970 | Barthlome | |
| 3,536,576 A | 10/1970 | Schwartz | |
| 3,558,083 A | 1/1971 | Conley et al. | |
| 3,559,209 A | 2/1971 | Vail | |
| 3,564,609 A | 2/1971 | Vail | |
| 3,564,611 A | 2/1971 | Hardy et al. | |
| 3,659,892 A * | 5/1972 | Briggs | F41A 9/87 |
| | | | 410/46 |
| 3,807,274 A | 4/1974 | Cohen | |
| 4,055,316 A | 10/1977 | Chipper et al. | |
| 4,064,786 A | 12/1977 | Elwin | |
| 4,091,464 A | 5/1978 | Vykukal | |
| 4,095,593 A | 6/1978 | Webbon et al. | |
| 4,148,260 A | 4/1979 | Minovitch | |
| 4,235,404 A | 11/1980 | Kraus | |
| 4,244,627 A | 1/1981 | Hastings, Jr. | |
| 4,387,868 A | 6/1983 | Regipa | |
| 4,405,034 A | 9/1983 | Dunne | |
| 4,790,970 A | 12/1988 | Kurth et al. | |
| 4,995,572 A | 2/1991 | Piasecki | |
| 5,092,129 A | 3/1992 | Bayes et al. | |
| 5,115,711 A * | 5/1992 | Bushagour | F41F 3/042 |
| | | | 89/1.816 |
| 5,115,859 A | 5/1992 | Roebelen, Jr. et al. | |
| 5,125,319 A | 6/1992 | Goricke et al. | |
| 5,127,896 A | 7/1992 | de Gaston | |
| 5,153,938 A | 10/1992 | Epperson | |
| 5,294,078 A | 3/1994 | Gurr | |
| 5,318,018 A | 6/1994 | Puma et al. | |
| 5,400,550 A | 3/1995 | Beasley | |
| 5,685,514 A | 11/1997 | Carnahan et al. | |
| 5,697,108 A | 12/1997 | Culbertson, Jr. | |
| 5,816,765 A | 10/1998 | Pijanowski | |
| 5,857,645 A | 1/1999 | Hodgson | |
| 5,865,401 A | 2/1999 | Watkins | |
| 5,924,648 A * | 7/1999 | Ellinthorpe | F41F 3/04 |
| | | | 244/63 |
| 6,050,835 A | 4/2000 | Henrion et al. | |
| 6,068,211 A | 5/2000 | Toliver et al. | |
| 6,116,544 A | 9/2000 | Forward et al. | |
| 6,158,050 A | 12/2000 | MacKendrick | |
| 6,173,922 B1 | 1/2001 | Hoyt et al. | |
| 6,186,039 B1 * | 2/2001 | Mueller | B64G 1/002 |
| | | | 89/1.805 |
| 6,224,015 B1 * | 5/2001 | Reinhard | B61B 7/00 |
| | | | 244/24 |
| 6,234,425 B1 | 5/2001 | Rand et al. | |
| 6,386,484 B1 | 5/2002 | Hoyt et al. | |
| 6,419,191 B1 | 7/2002 | Hoyt et al. | |
| 6,422,506 B1 | 7/2002 | Colby | |
| 6,435,457 B1 | 8/2002 | Anzel | |
| 6,460,448 B1 | 10/2002 | Zangrando | |
| 6,491,258 B1 | 12/2002 | Boyd et al. | |
| 6,827,313 B1 | 12/2004 | Aldrin | |
| 6,942,186 B1 | 9/2005 | Levin et al. | |
| 6,981,674 B1 | 1/2006 | Dempsey | |
| 7,178,763 B2 | 2/2007 | Licata | |
| 7,503,526 B1 | 3/2009 | Taylor et al. | |
| 7,530,532 B2 * | 5/2009 | Watts | B64G 1/002 |
| | | | 244/171.3 |
| 8,240,598 B2 * | 8/2012 | Redford | B64B 1/50 |
| | | | 187/240 |
| 2002/0167702 A1 | 11/2002 | Badesha et al. | |
| 2002/0189432 A1 * | 12/2002 | Facciano | F41F 3/0413 |
| | | | 89/1.801 |
| 2004/0040064 A1 | 3/2004 | Mah et al. | |
| 2004/0206086 A1 | 3/2004 | Boettcher et al. | |
| 2004/0069135 A1 | 4/2004 | Fowler | |
| 2006/0055134 A1 | 3/2006 | McLoughlin et al. | |
| 2006/0214053 A1 | 9/2006 | Hase | |
| 2006/0226281 A1 | 10/2006 | Walton | |
| 2008/0060101 A1 | 3/2008 | Cadogan | |
| 2009/0184196 A1 | 7/2009 | Price | |
| 2009/0260511 A1 | 10/2009 | Melnychuk et al. | |
| 2009/0308237 A1 * | 12/2009 | Atmur | B64G 5/00 |
| | | | 89/1.815 |
| 2010/0000547 A1 | 1/2010 | Johnson et al. | |
| 2010/0007218 A1 | 1/2010 | Ogram | |
| 2010/0012771 A1 | 1/2010 | Jess | |
| 2011/0005869 A1 * | 1/2011 | Hinton | B64G 5/00 |
| | | | 187/414 |
| 2013/0264413 A1 | 10/2013 | Aoki et al. | |

FOREIGN PATENT DOCUMENTS

| | | |
|---|---|---|
| JP | 04193700 A | 7/1992 |
| JP | 2001526603 A | 12/2001 |

OTHER PUBLICATIONS http://ask.nate.com/knote/view.html?num=121284, "Nate knowlege—of answers you can trust who knows!," May 17, 2007.

* cited by examiner

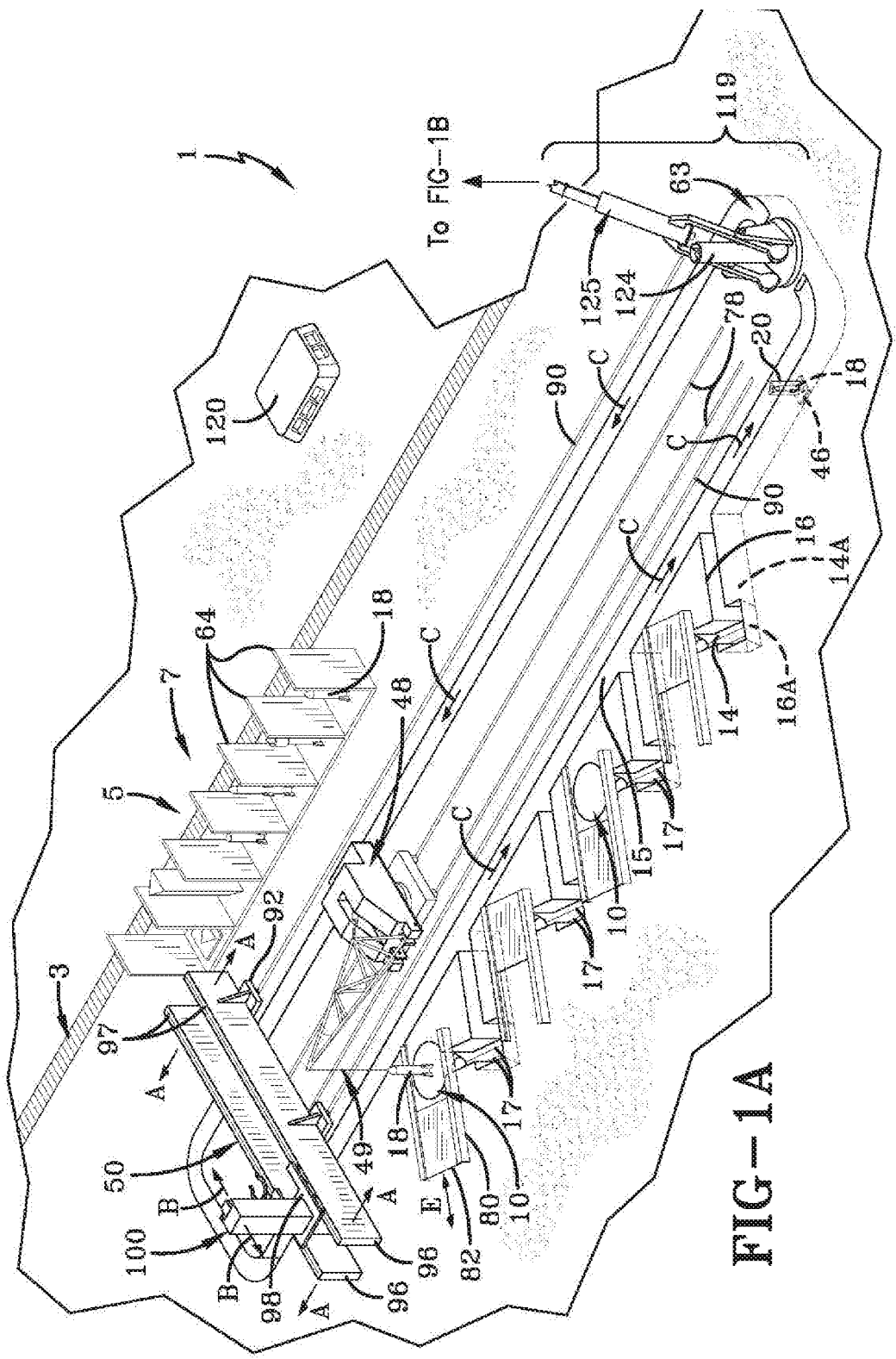

From FIG-1A

If R = 8'
  Δ = 2'
  δ = 3'
a = R + Δ = 8' + 2' = 10'
in △ AOB
  OB = 2a = 20'
  AB = a(√3) = 10√3 = 17.32'
    carriage side ≈ 2AB = 34.64'
  OC = OB + BC = 20' + 3' = 23'
∴ Diameter of turntable is at least ≈ 2(OC) = 46'

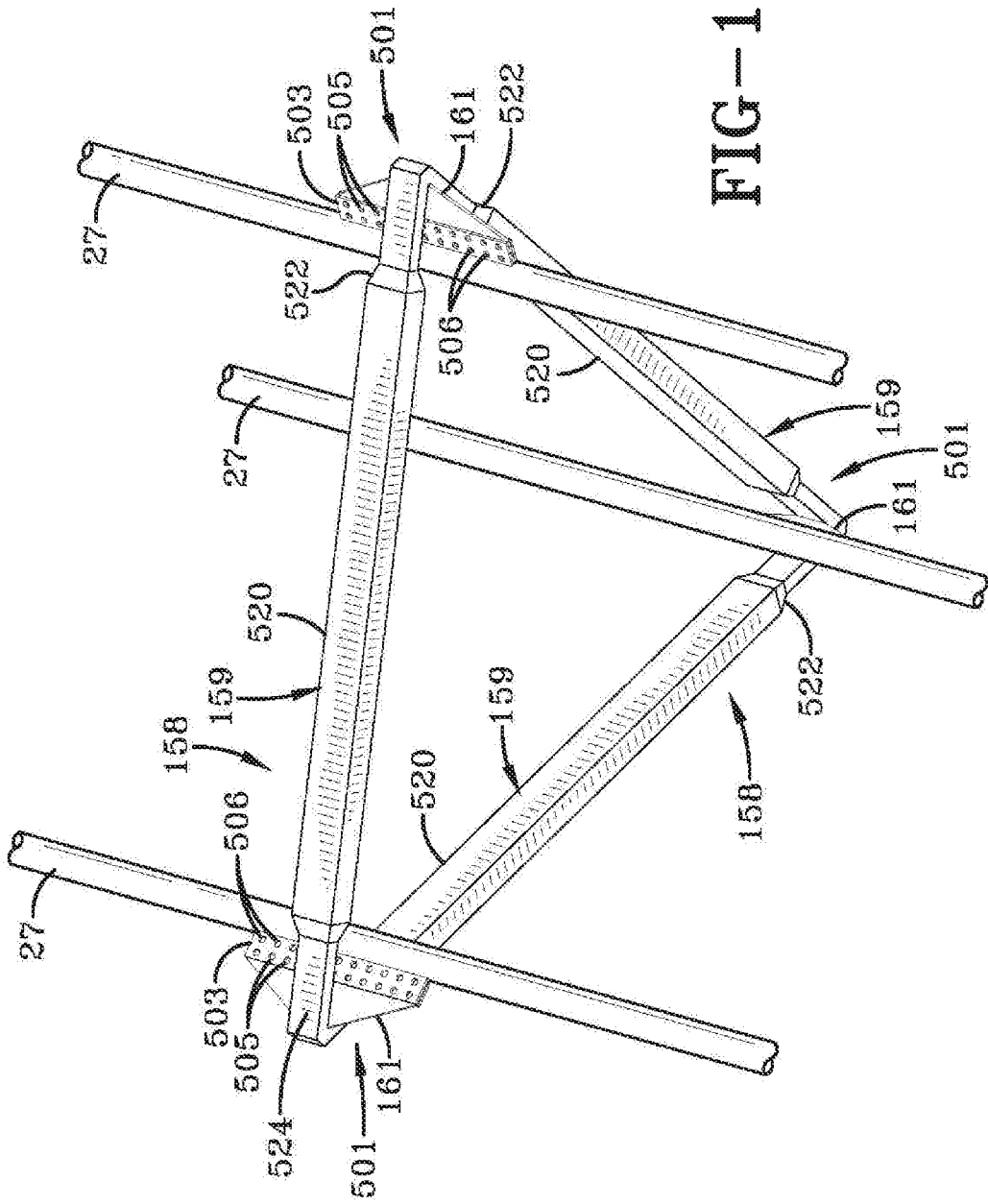

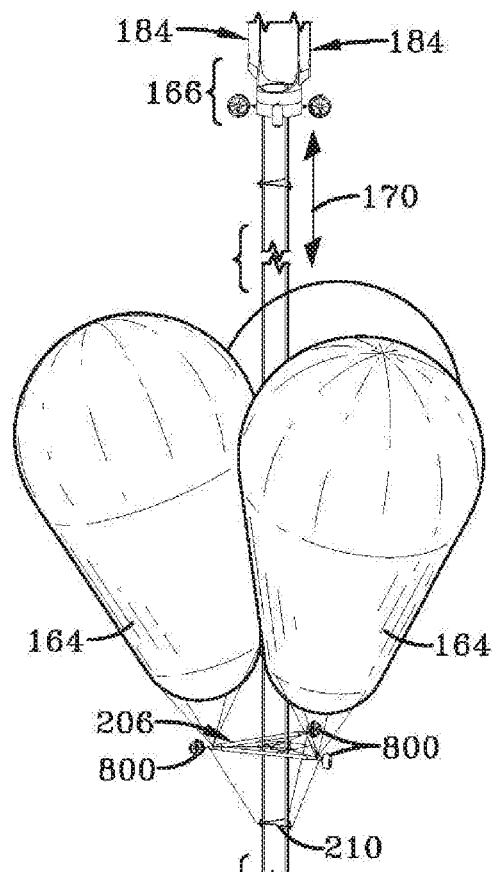
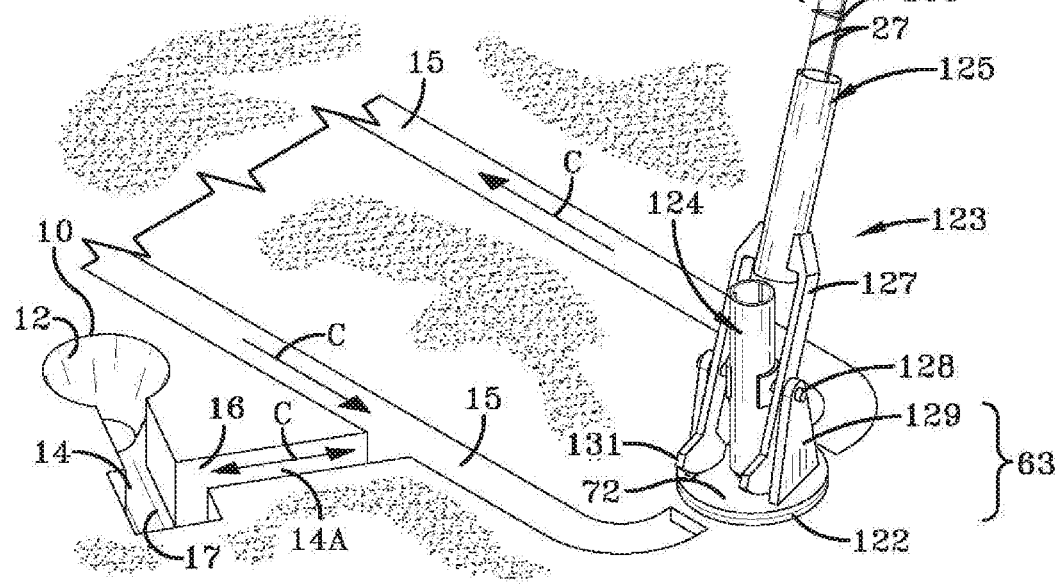
FIG-11

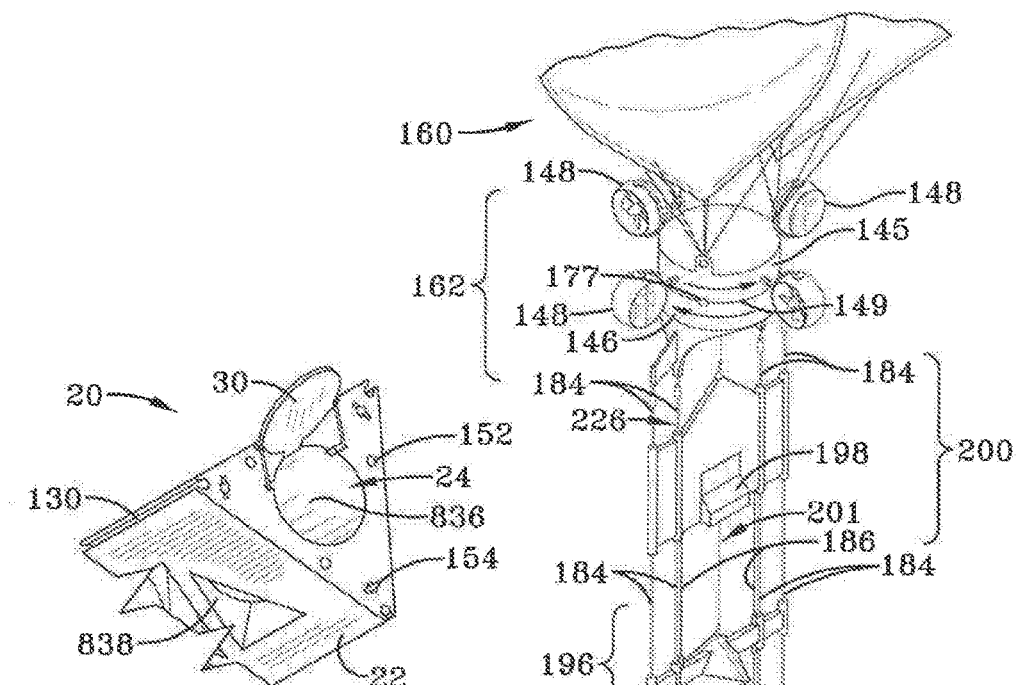
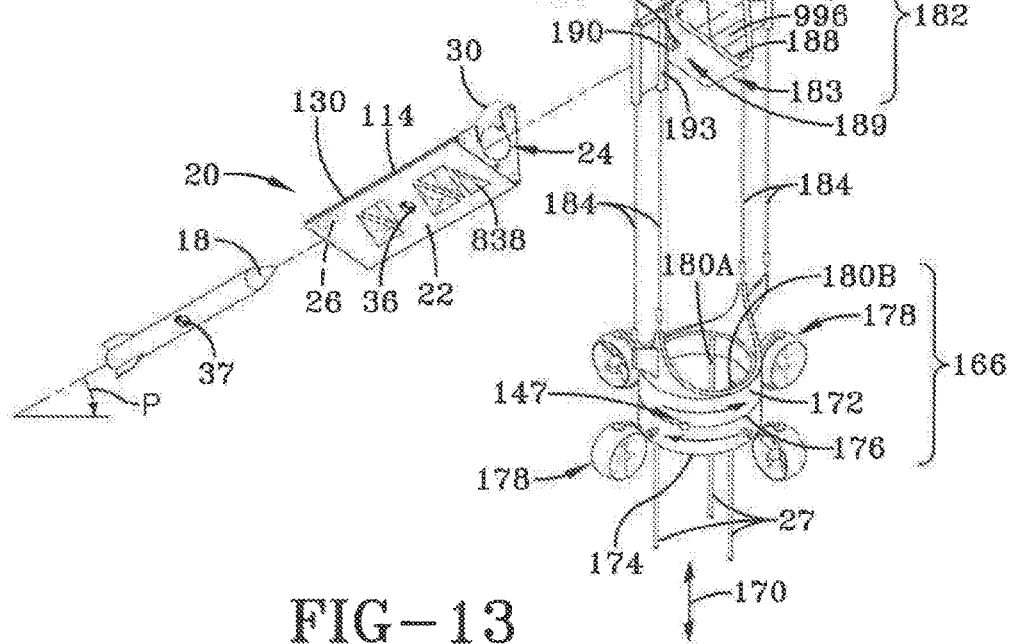
FIG-13A
FIG-13

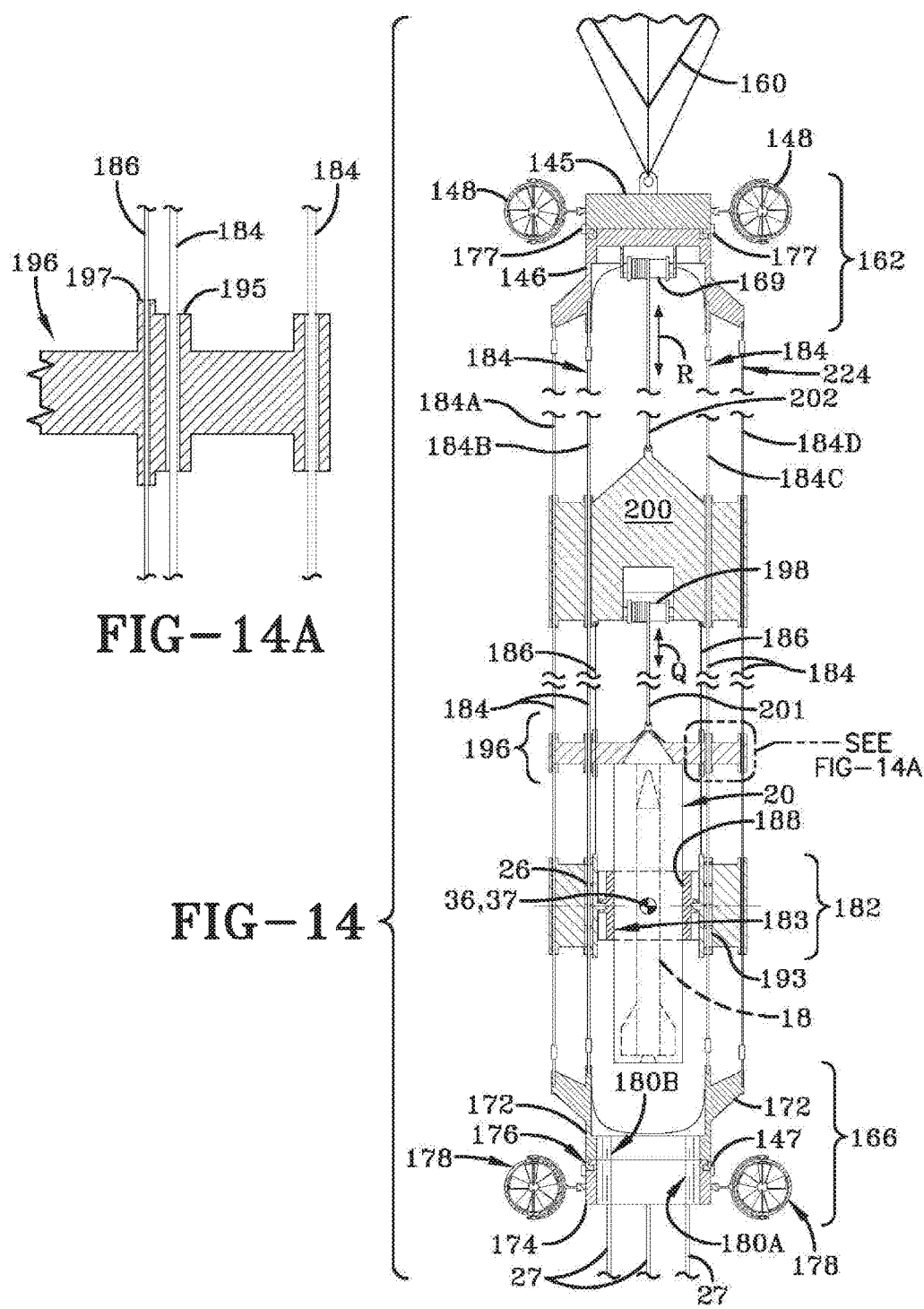

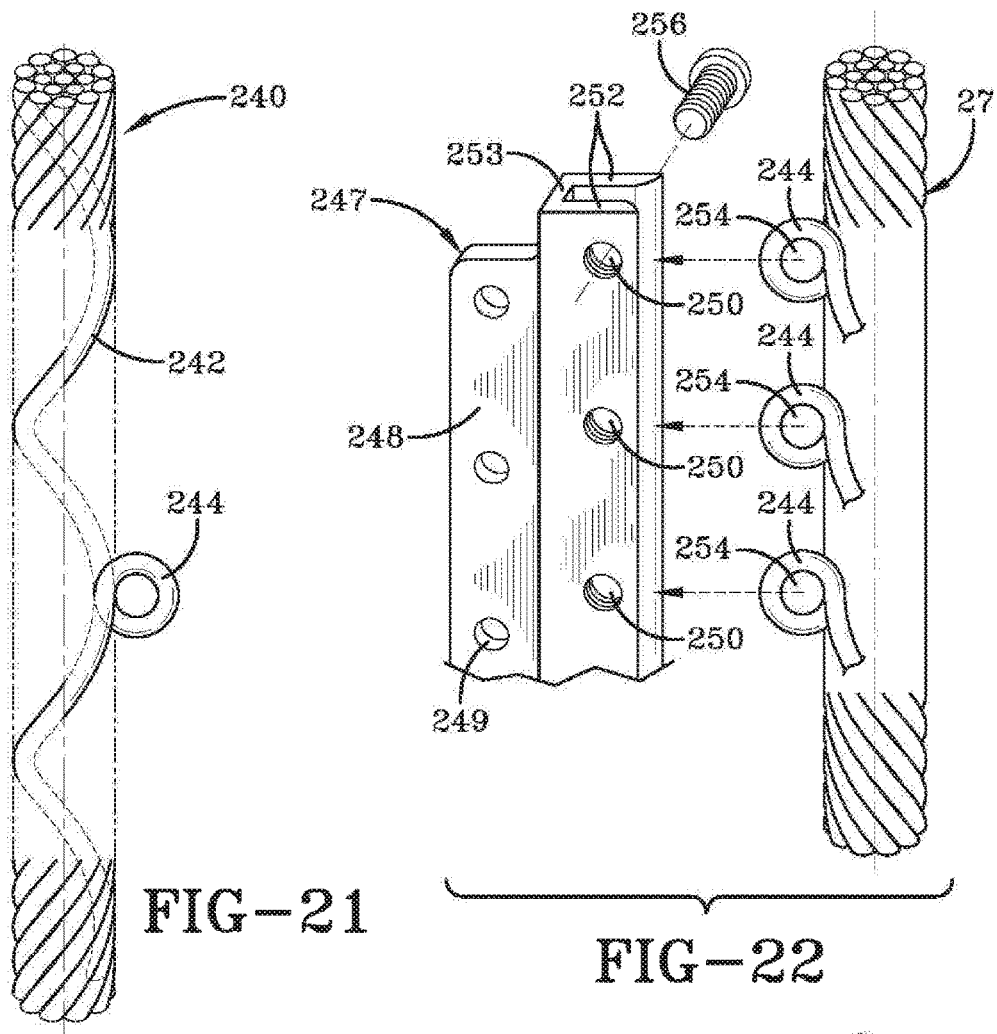
FIG-21
FIG-22
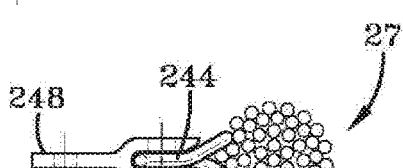
FIG-23
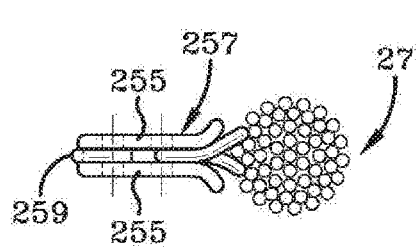
FIG-24
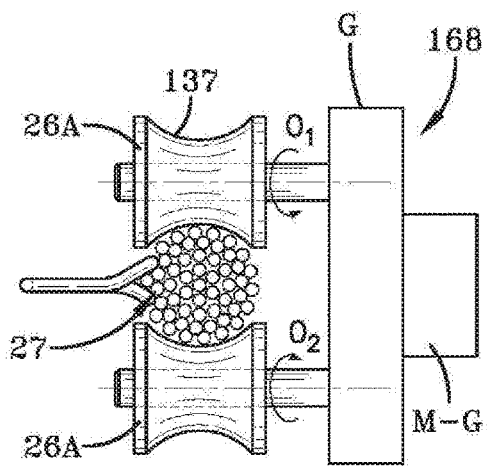
FIG-25

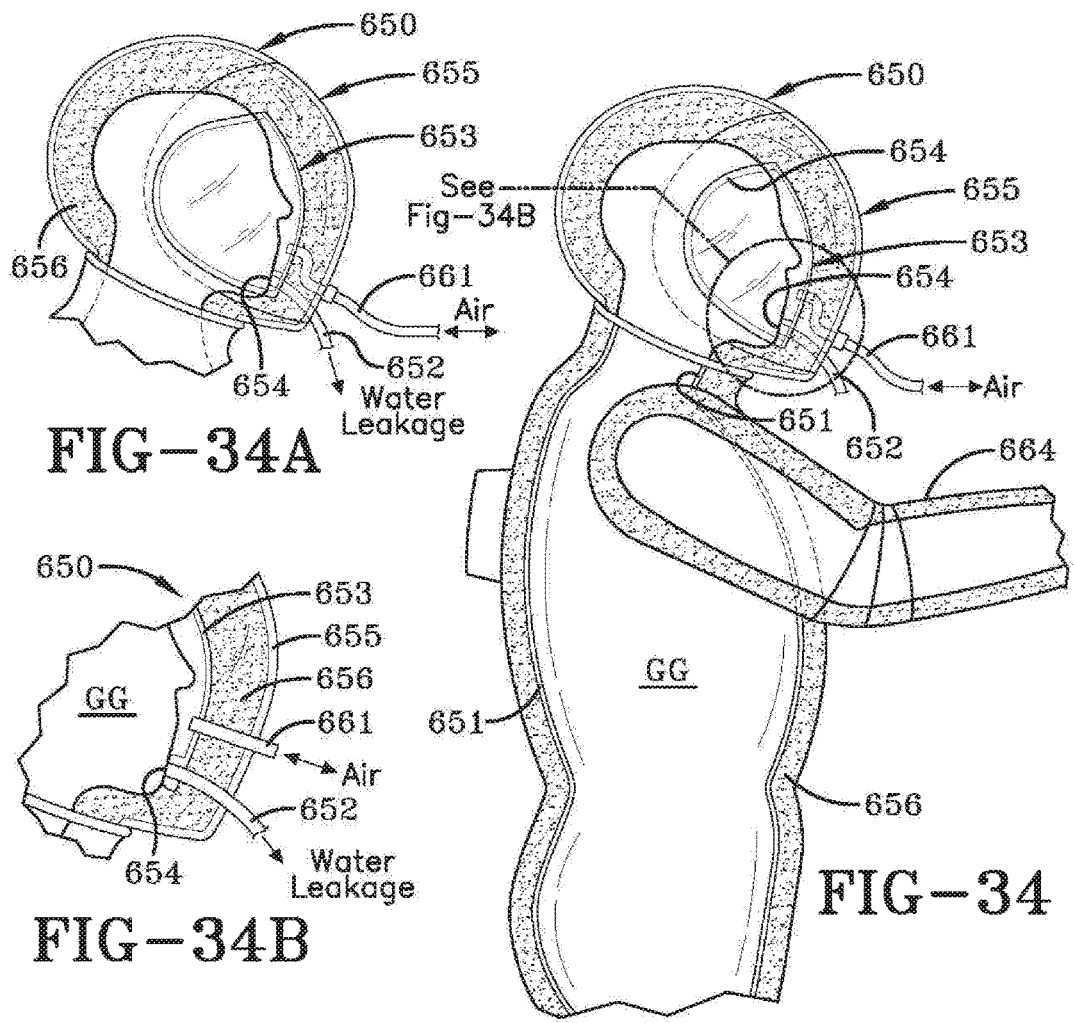
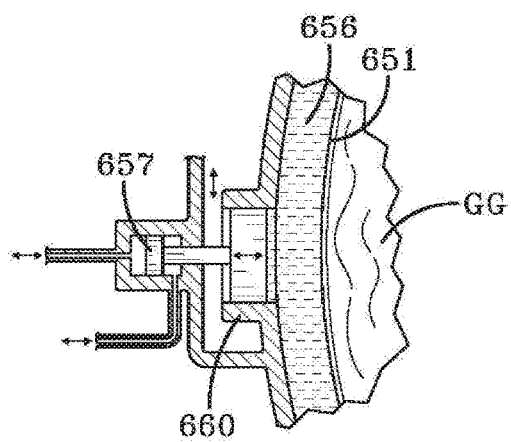
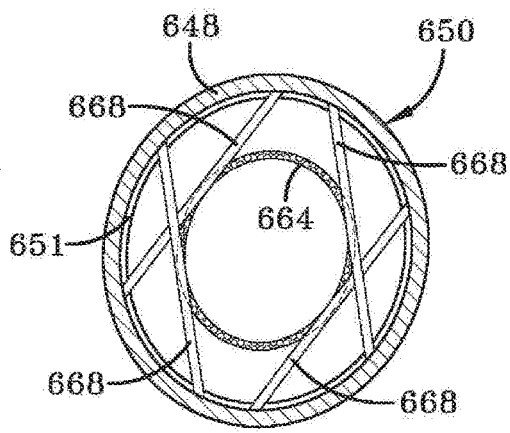

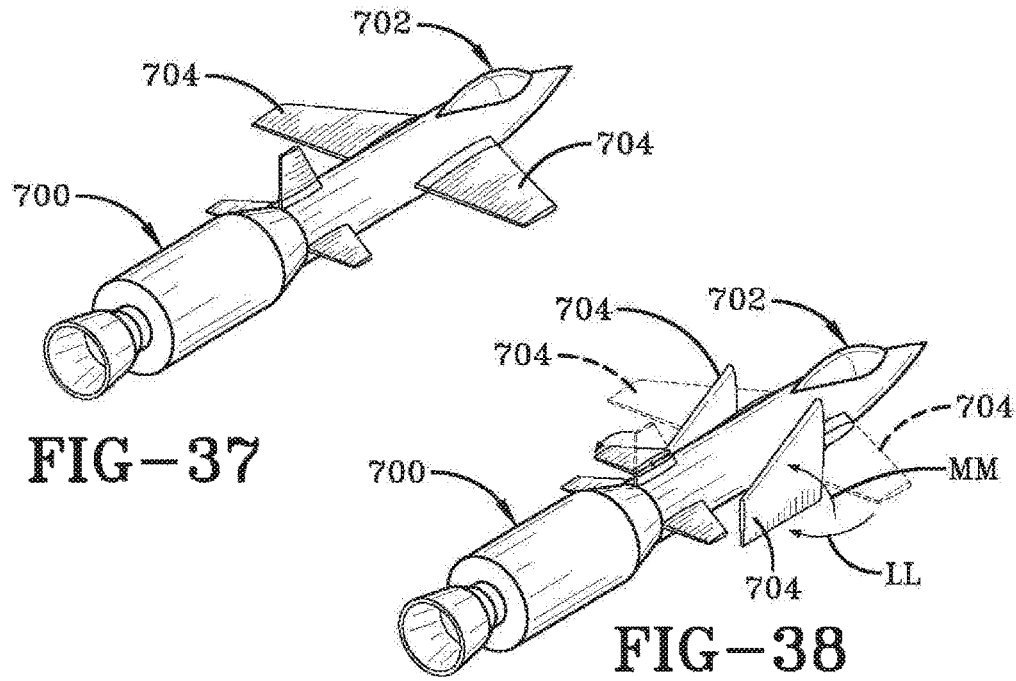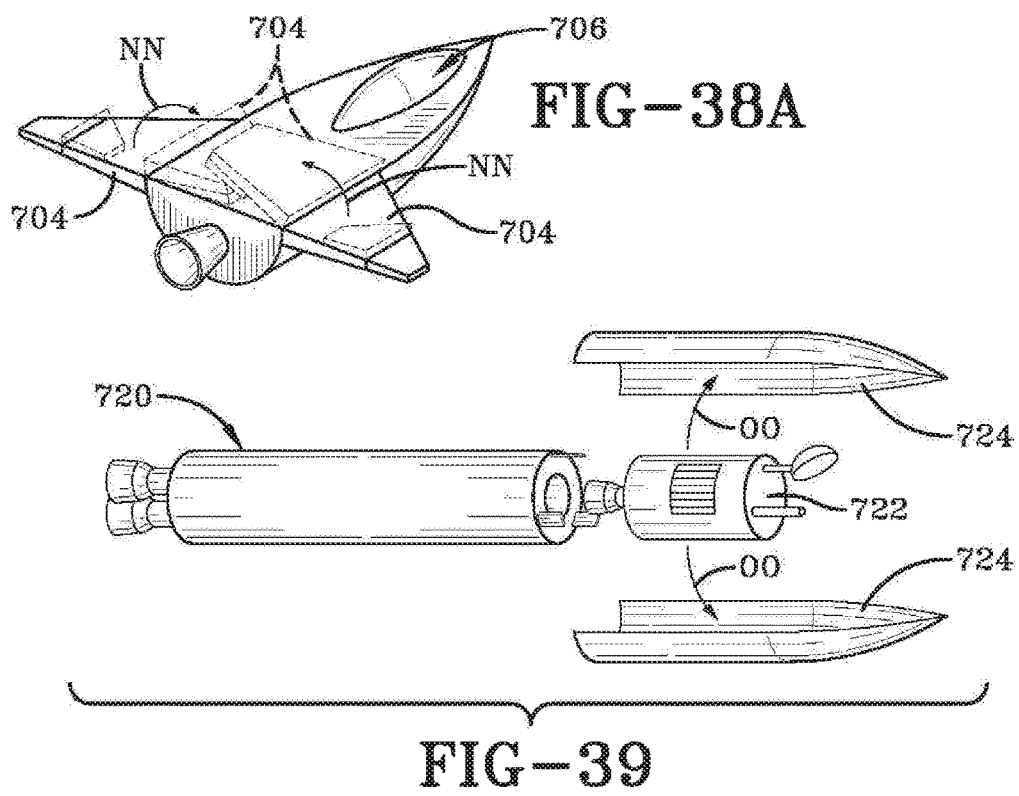

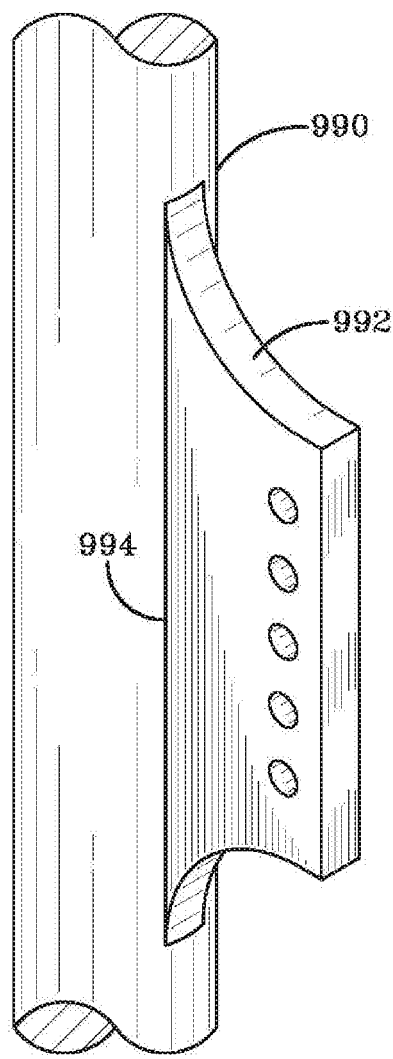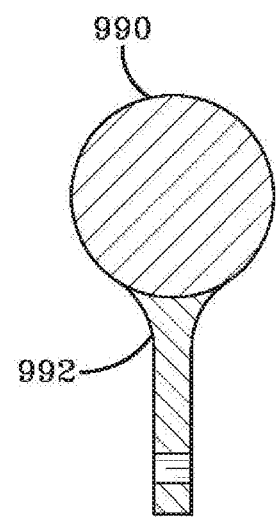
FIG-40
FIG-41

CARRIAGE FOR ROCKET LAUNCH SYSTEM

CROSS-REFERENCE TO RELATED APPLICATION

This application is a divisional of U.S. patent application Ser. No. 13/577,813 filed Aug. 8, 2012, which is a National Stage application of International Application No. PCT/US2011/000237, filed on Feb. 10, 2011, which claims priority of U.S. Provisional application Ser. No. 61/337,645, filed on Feb. 11, 2010, all of which are incorporated herein by reference in their entireties.

BACKGROUND OF THE INVENTION

Field of the Invention

The present invention relates to a system for delivering various types of payloads to the upper atmosphere and beyond, and more particularly to a high cyclic rate launch rate rocket launcher with an upper launch station. The cables' self weight is offset by lighter-than-air balloons. The cables are tensioned by one or more lighter-than-air balloons and anchored by a pivoting tether.

Description of the Prior Art

Many methods of delivering useful materials such as propellants, gases for life support, etc. and fabricated items to the upper atmosphere or beyond, exist or have been proposed in recent publications.

These primarily involve rockets powered by chemical, nuclear or ground based laser or maser energy sources. Various methods of reducing the cost per unit mass of delivering useful materials and fabricated items to the upper atmosphere or beyond, which involve rockets, exist or have been proposed.

These included re-usable rocket powered vehicles such as the soon to be retired United States of America's Space Shuttle, or Russia's now inoperative Buran. Currently, only chemical multi-stage rockets or vehicles with strap on solid fuel powered rocket boosters, or rockets such as the USA's diminutive Pegasus, which is transported to high altitude before launch, are known to be in service.

Proposed methods of decreasing the delivery cost to the upper atmosphere or beyond, most commonly involve transferring energy to the rockets by increasing either their initial kinetic or potential energy before igniting the main motor or motors. Proposals by which this can be achieved include: elevation suspended under a disposable, free flight, lighter-than-air balloon or, forcible ejection at high velocity from large guns utilizing either chemical propellants or compressed air or compressed hydrogen or, transport to high altitude attached to airplanes such as Virgin Galactic's White Knight Two or, transport to high altitude towed on a cable tether behind an airplane or, acceleration to high velocity using ground based linear induction motors or, jet or rocket powered sleds, prior to igniting the rocket's main motor or motors.

One proposed method for reducing the delivery cost, which does not involve rockets, is the so called "Space Elevator" where a large mass is tethered to the earth by a single cable many thousands of miles long. The large mass orbits the earth in a geosynchronous orbit and keeps the cable taut. This cable would then be used in a manner analogous to a railway track on which a train travels.

The primary difficulty with this latter method is that the tensile strength of the material required for the cable far exceeds any existing material, especially since the self weight of the cable would be considerable. Another difficulty is to supply the vehicle climbing this cable with sufficient energy to essentially climb out of the majority of the earth's gravitational field. A weightless, super strong, cable material would be ideal for such a "space elevator" but, this does not yet exist. Also, the problem of energy supply up thousands of miles of cable has prompted the consideration of beamed microwave or laser power to the climbing vehicle. The defocusing and obstructive effect of clouds and the atmosphere on the beamed power is likely to greatly reduce the amount of power that actually reaches the climbing vehicle. Dissipation of energy on the return of the (climbing) vehicle to the earth is likely to be quite wasteful because of the need for braking to prevent it from exceeding the speed capacity of the mechanism holding the said vehicle to the cable.

Many of the current proposed methods require the development of new materials or massive structures and are unlikely to see commercial service for many decades to come, if ever.

The majority of current launch methods involve the use of huge amounts of energy, derived primarily from fossil fuels such as coal or oil to produce cryogenic liquid oxygen oxidizer, cryogenic liquid hydrogen or other liquid hydrocarbon fuels or solid propellants. This use of non-renewable resources is inherently inefficient because at each stage of production of the fuels there is a compounding of process inefficiencies. As well, the large mass and sometimes toxic nature of exhaust material used to propel the vehicle out of the atmosphere frequently does ecological damage or may cause climatological disturbances.

Accordingly, a need exists for a method of delivering useful materials such as propellants, gases for life support, etc. and fabricated items to the upper atmosphere or beyond, at a cost per unit mass delivered, far less than currently commercially available, which utilizes currently available materials and technologies. Furthermore, it would be ecologically beneficial to minimize the mass of material used to propel the vehicle out of the earth's atmosphere by the use of hydroelectric, geothermal or solar photovoltaic generated electricity to raise the vehicle as high as possible before igniting the vehicle's engine or engines.

Atmospheric monitoring has been in effect for over fifty years. Measurement of solar radiation, concentrations of trace gases, temperature, pressure and other parameters, by which the direction of the earth's climatological changes can be predicted, has greatly increased our understanding of our world's climate. It is of particular importance with regards to the ozone hole, the continuous rise of carbon dioxide and other "greenhouse" gases in the atmosphere, and now, the more than fifty chemical species in the earth's atmosphere.

As increased levels of "greenhouse" and ozone depleting gases occur, such as carbon dioxide, chlorofluorocarbons, nitrous oxide and sulfur hexafluoride, which cause global warming and other changes in the global weather, there arises an increased requirement for atmospheric monitoring on a more continuous basis. Current methods for monitoring atmospheric conditions involve heavily instrumented aircraft, manned and unmanned; free flight balloons with suspended instrument packages; rockets with sampling and instrument payloads; and ground based laser and radar stations.

These, with the exception of the ground based stations, cannot provide more than a relatively brief period of atmospheric data sampling. The longest duration of monitoring by non-ground based methods currently does not exceed more than a few days in the case of balloons, and the shortest, such as rockets, might be measured in minutes. Many of these methods of atmospheric monitoring also utilize single use instrument packages, while existing ground based stations cannot obtain physical samples to determine the chemical composition, the bacterial/viral content, or the intensity and spectral analysis of sunlight and other data throughout the depth of the atmosphere.

Thus, there exists a need for constructions extending from the surface of the earth to a great height, on which instrumentation for continuous monitoring and sampling of the atmosphere and, incident solar and other radiation may be mounted.

Radio telecommunications and over the horizon radar are being more extensively used for security reasons by many countries throughout the world.

The recent worldwide security concerns about surprise terrorist attacks has driven countries such as the United States of America to increase the level of surveillance by the use of radar and other means of detection utilizing various regions of the electromagnetic spectrum. This is evidenced by the 9/11 Commission Act of 2007 of Congress, relating in part to the interoperable radio telecommunication system for the security of the United States. The range of ground based radar is limited by the curvature of the earth's surface and, in an attempt to achieve greater useful ranges, radar and other systems have been mounted on high flying aircraft or low altitude tethered balloons.

In a similar way, cellular radio telephony operators are currently seeking to enlarge the area serviced by the use of high altitude aircraft, with receivers and transmitters, proposed to fly in closed circuits over the service area. The extreme high altitude cases of this are the INMARSAT and IRIDIUM satellite phone systems which utilize extremely expensive and unrepairable geostationary satellites for telecommunications.

Thus it may be seen that there is a need for lower cost, high altitude radar and radio telecommunications platforms.

The present invention also relates to tourism. The visitation of tall monuments such as the Eiffel Tower, tall buildings such as the Empire State Building, or high altitude natural features such as Mount Everest continues to be a common activity of tourists. Indeed, recently there has also been increasing non-military interest in expensive high altitude airplane flights. The recent "X Prize" for safe flight to 100 kilometers or higher won by Burt Rutan's Space Ship One is further driving the commercialization of high altitude transport. A problem with Space Ship One and Space Ship Two is that their rocket motors uses a liquified nitrous oxide oxidiser and hydroxyl terminated polybutadiene solid fuel, which solid fuel produces an exhaust which includes soot, partially burnt rubber and other noxious materials. In recent publications, it has been stated that alternative fuels for Space Ship Two are being investigated, asphalt and paraffin. It is likely that, although these are cheap fossil fuels, combustion will not be complete. Yielding polluting exhaust products, in the case of asphalt, metal oxides and acidic sulphur compounds are likely. The effect of the soot alone, recently calculated for 1,000 launches per year by Martin Ross of the Aerospace Corporation, suggests stratospheric disruption and soaring temperatures at the earth's poles. The launch rate published being only a few times per week.

There is therefore a growing market for less expensive more frequent transport of tourists to ever higher altitudes.

In the past few years, skydiving as a sport has changed to include ram air wing type parachutes, the use of auxiliary equipment such as small rigid wings, miniature surfboards, rockets and even miniature turbojet engines. Further, the altitude from which skydivers have been jumping from has been on the increase, although this has been limited by two major factors. These are the limited capability of civilian fixed wing airplanes and helicopters to operate at higher altitudes where there exists a civil aviation half hour limit for oxygen enriched breathing systems or, a requirement for a pressurized suit or cabin. In the short term, it is expected that civilian pressurized suits will become available to skydiving enthusiasts as the market for high altitude skydiving develops.

Even more extreme forms of sky diving are even now being considered. These proposed forms involve jumping from the upper reaches of the atmosphere or even re-entry from space, as might occur when occupants of distressed orbital spacecraft are to be returned safely to earth.

Thus, there is an increasing market for novel, and higher altitude platforms for the various new forms of skydiving. Indeed, there is also a continuing demand for low cost platforms at altitudes of up to ten thousand feet.

In recent times, the rapid deployment of aircraft to sites of military interest has become practically a necessity, for reconnaissance or other purposes. Additionally, there is a growing interest in commercial hypersonic transport. Towards this end, hypersonic aircraft with supersonic combustion engines are being developed in many countries to fulfil these perceived needs.

However, the engines of such aircraft, designed to operate efficiently at higher Mach numbers have been reported to require the attainment of a velocity in excess of three times the speed of sound for them to start. Considerable complexity, with a concomitant weight penalty is required for an engine to operate in the various flight regimes from stationary to hypersonic. Apart from using rocket boosters to achieving starting speed, the other design path appears to require a two part engine. The first part is a turbofan or turbojet engine which predominates in the flight regime from subsonic to low Mach number supersonic, transitioning to the supersonic combustion engine at high Mach numbers, and shutting down the first part.

Engines designed to operate in the hypersonic range only, many with no moving parts, would therefore be lighter in weight, simpler in construction, and hence less expensive.

In 2003, the manned space shuttle Columbia of the United States of America was destroyed upon re-entry into the earth's atmosphere, due to structural damage which occurred during the launch phase. As well, over time, there has also been an accumulation of orbital craft in need of repair; and distressed orbital craft, and objectionable and dangerous debris which needs to be removed from orbit.

Since craft such as the Columbia space shuttle of the United States are heavy, and they lack main engines that can operate for significant lengths of time after re-entry due to the hazards and weight penalties of carrying cryogenic or other fuels for use on the return flight in atmosphere, these craft must leave orbit at specific points if they are to be able to glide to the few airports with runways of sufficient strength and length which exist close to its orbital track.

Thus, it is inevitable that others will create smaller craft capable of performing useful work outside the atmosphere, with the capability of flying under their own power in subsonic, supersonic or sustained hypersonic flight in the earth's atmosphere. These are likely to be launched using rocket power and, after re-entry at any point, fly to any of the multitude of existing civilian or military airfields suitable for such smaller aircraft and, land safely.

These will be used for the quick, safe retrieval of passengers of damaged orbital craft and, repair or removal from orbit of distressed unmanned orbital craft, and objectionable and dangerous debris. Another type, soon to come into service, is a small service vehicle for refuelling or attaching to distressed space craft and acting as a tug to extend the useful life of such vehicles. Further small craft or rockets can be used to launch small satellites, or modular components for the assembly and fuelling of large constructions in orbit which may be used to escape the earth's gravitational field to possibly deflect dangerous asteroids, or explore the solar system. The European Space Agency and Russian equivalent Roscosmos have recently begun to consider the creation of a shipyard in low earth orbit to facilitate moon or mars missions utilizing the yet to be built cargo return advanced re-entry vehicle (ARV).

Additionally, it is expected that there will be a continuing need to service satellites and, other orbital craft. This servicing could include delivering food, fuel, compressed or liquefied gases for breathing or other uses, medical and scientific supplies, electrical, mechanical or other equipment to replace or upgrade spacecraft systems, transporting sick or injured personnel, or replacing personnel.

Thus, there is expected to be a need for a quick, inexpensive means of launching modular components for assembly and fuelling in space, small utility craft, small satellites and other devices.

The sensitivity of many telescopes used in astronomy has been greatly degraded due to atmospheric dust and aerosols as light is reflected or scattered by the aforementioned particles. The least affected telescopes are generally to be found at the top of remote mountains, above much of the atmosphere where most of the dust and aerosols are to be found.

Thus, there is a further need for high altitude platforms on which sensitive telescopes may be mounted. Particularly, multiple platforms and telescopes may be used to simulate an extremely large aperture telescope as currently used to locate planets in other solar systems.

As the Indonesian tsunami disaster unfolded in December 2004, it was clear that reconnaissance of many of the affected areas and subsequent delivery of initial relief supplies did not occur until days or even weeks after the event, with the consequence that many tens of thousands died, more than if early relief had been available. Thus, there is a need for a fast suborbital rocket launching system to deliver numerous small unmanned reconnaissance drones and thousands of tons of terminally GPS guided parachute delivered relief supplies using simple GPS-guided disposable rockets.

BRIEF SUMMARY OF THE INVENTION

Accordingly, a need exists for a method of delivering useful materials such as propellants, gases for life support, etc. and fabricated items to the upper atmosphere or beyond, at a cost per unit mass delivered that is far less than currently commercially available, which utilizes currently available materials and technologies. Furthermore, it would be ecologically beneficial to minimize the mass of material used to propel the vehicle out of the earth's atmosphere by the use of hydroelectric, geothermal or solar photovoltaic generated electricity or other renewable source of energy to raise the vehicle as high as possible before igniting the vehicle's engine or engines.

An object of the present invention is to provide a high launch rate rocket launcher for sending payloads to space, as well as to satellites located in space.

Still another object of the present invention is to provide a high launch rate rocket launcher which may utilize hydroelectricity or other renewable energy for elevating the rocket to launch altitude.

It is another object to utilize a more environmentally friendly fuel and oxidizer made using alternative or renewable energy.

Yet another object of the present invention is to provide an upper pivoting launch station utilizing electrically powered tubular launch carriages, the launch station being connected to the ground by cables to which are attached lighter-than-air balloons for tensioning and supporting the cables and associated structures.

A further object of the present invention is to provide a means for recovering potential energy involved in returning empty rocket launching carriages, after launch, to the earth, via tethers, through the use of regenerative braking utilizing motor generators, for re-use.

Yet another object of the present invention is to provide atmospheric monitoring on a more continuous basis as increased levels of "greenhouse" gases or other pollutants in the atmosphere cause changes in global weather.

A further object of the present invention is to provide high altitude radar and radio telecommunications platforms to greatly increase the spatial volume and area of earth's surface respectively covered.

Another object of the present invention is to provide continuous, reasonably priced commercial access for tourists to visit levels of the atmosphere inaccessible by other means except for rockets, aeroplanes or free flying lighter-than-air aircrafts.

Still yet another object of the present invention is to provide higher altitude platforms than are presently available for the various new forms extreme altitude or space skydiving, as well as low cost platforms at altitudes up to ten thousand feet which can be accessed without supplementary oxygen or a pressure suit.

Another object of the present invention is to provide a quick, inexpensive means of launching small utility craft for safe retrieval of passengers of damaged orbital craft, repair, upgrade or removal from orbit of distressed unmanned orbital craft and objectionable and dangerous debris.

Yet another object of the present invention is to provide high altitude platforms above the earth's cloud layers on which sensitive telescopes may be mounted, especially those which can combine by computational means, the electromagnetic waves inclusive of light and radio waves, received in such a manner as to act as a single telescope of a diameter equal to the distance of the outermost members of the array, for superior observations than are presently available, except from space.

A further object is to provide a means for servicing satellites and other orbital craft, for example for supplying food, compressed or liquefied gases for breathing or other uses, fuel, medicine and scientific supplies, electrical, mechanical or other equipment to replace or upgrade spacecraft systems, and for transporting sick or injured personnel, or replacing personnel.

It is an object to provide a transporting system for transporting rocket-loaded carriages along cables extending up through the atmosphere to a launch station.

It is a further object for providing carriages for carrying rockets along cables to a launch station located high in the atmosphere.

It is yet an additional object to provide an apparatus for holding and directing rocket-loaded carriages to the apparatus for conveying the carriages along the cables to a launch station located high in the atmosphere, and for conveying empty carriages from the launch station to the ground.

Yet a further object is to provide a system for safely storing rockets, and for delivering the rockets or rocket-loaded carriages to the apparatus for holding and directing the rockets or rocket-loaded carriages to the apparatus for conveying the rockets or rocket loaded carriages to a launch station located high in the atmosphere.

The provision of the apparatus for conveying rocket-loaded carriages is also an object of the invention.

Another object of the invention is a system for conveying rockets, components of rockets, carriages for rockets and/or holders of conveying devices for rockets from a storage facility to a holding and assembly facility, for subsequent transport to the apparatus for raising the rocket-loaded carriage to a launch station.

It is a further object of the present invention to provide a transverse loader for loading rockets into carriages.

An additional object is the provision of an elevating assembly for elevating a rocket-loaded carriage to the apparatus for loading the rocket-loaded carriage into a set of elevated cables to a rocket launch station.

It is an additional object to provide a turret for receiving a rocket-loaded carriage, and related apparatus for orienting a rocket-loaded carriage to a guide structure apparatus for disposing the rocket-loaded carriage on the cables directed to the launching station.

It is still a further object of the invention for providing devices for connecting lighter-than-air balloons to a cable system to stably hold and separate the cables which are directed to the launching station.

Another object of the invention is to provide a docking station for docking a rocket-loaded carriage on a set of cables going to the launching station.

The object of providing electrical power for transporting a rocket-loaded carriage along a cable system to the elevated launching station is another goal of the present invention.

Another object of the present invention is to provide a lift ring for lifting a rocket-loaded carriage along the cable system above the docking station.

An additional object is the provision of a device for separating cables from the ground to an elevated launching station, and for stabilizing the cables.

It is also an object of the present invention to provide connecting apparatus for attaching frames and other apparatus to cables extending between the ground and an elevated launching station.

The provision of an apparatus for holding a rocket within a carriage is also an object of the present invention.

Another object is the provision of a telescope mount for use with a set of cables held upright in the atmosphere.

The provision of a rocket to be carried upwardly in a carriage for holding a person or persons, or equipment and supplies, is also an object of the present invention.

An additional object of the present invention is an improved hydrostatic pressure compensating suit to be worn by a person to permit the endurance of high accelerations during rocket launch and atmospheric re-entry.

These objects are achieved according to the preferred embodiments of the invention discussed below. Other objects will be apparent to those skilled in the art from the inventive concepts as discussed below and from the attached claims.

BRIEF DESCRIPTION OF THE DRAWINGS

FIGS. 1A and 1B are detailed views of the features shown in FIG. 1.

FIG. 5A is an enlarged detail of a portion of tracks illustrated in FIG. 5.

FIG. 7A is an enlarged detail perspective drawing of a leg and twist lock pin shown in FIG. 7.

FIG. 10A is an enlarged detail view of a cable spacer.

FIG. 11 shows a further portion of the preferred part of the invention with respect to the cable system for transporting rocket holding carriages.

FIG. 13 is a schematic view of an upper part of a preferred part of the present invention showing a portion of the cable assembly, and different components attached thereto.

FIG. 13A is an end view of a carriage with an end cover in the open position.

FIG. 14 is a schematic cross-sectional view of the preferred embodiment of the invention showing a cable assembly and different parts attached thereto.

FIG. 14A is an enlarged detail view of part of a carriage end gripper.

FIG. 21 is a perspective view of a multistranded cable as may be used in the cableway of the launch system, according to preferred form of the invention.

FIG. 22 shows the construction for mounting items to the side of a cable as shown in FIG. 21.

FIGS. 23 and 24 are cross-sectional views of variations of the construction shown in FIG. 22.

FIG. 25 shows in cross-sectional view the engagement of a cable by the wheels of a traction drive for driving up or down said cable, according to a preferred form of the invention.

FIG. 34 is a schematic of a space suit to be worn by an occupant according to a preferred embodiment of the invention for use in exiting and re-entering the atmosphere.

FIG. 34A is a detail of the space suit helmet shown in FIG. 34, and FIG. 34B is a further detail of the space suit helmet of FIG. 34.

FIG. 35 shows an apparatus for one method of varying the internal volume of a space suit shown in FIG. 34.

FIG. 36 is a detailed view of a person's limb within a portion of the space suit of FIG. 34.

FIGS. 37 and 38 show re-entry capable aerospace plane versions of the rocket assemblies mounted on top of rockets, one with wings extended and one with wings folded for the transport within a carriage, according to a preferred embodiment of the invention.

FIG. 38A is a pictorial view of a lifting-body type aerospace plane with folded lift and control structures for use with a preferred embodiment of the invention.

FIG. 39 is a schematic view of a satellite or other payload carried on a rocket according to part of a preferred embodiment of the invention with jettisonable, aerodynamic, protective shells.

FIGS. 40 and 41 show a perspective and a cross-sectional view of a rod as a type of cable to be used instead of a wire rope.

DETAILED DESCRIPTION OF THE PREFERRED EMBODIMENTS OF THE INVENTION

Figure 1:
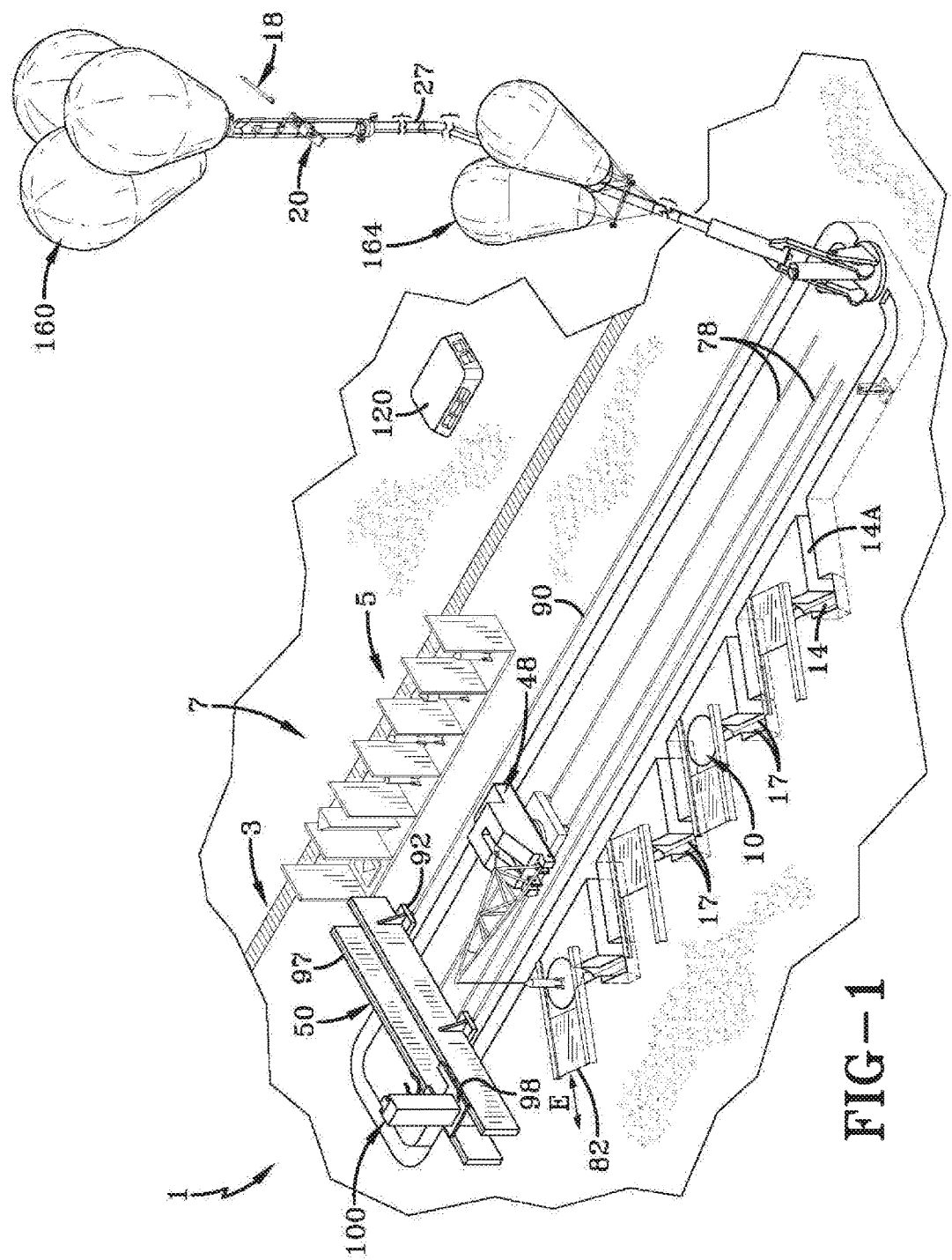
FIG. 1 depicts in schematic form some of the features of a preferred embodiment of the rocket launch system according to the invention.

The preferred embodiment of the invention is initially described in general terms referring to some components described in more detail below. The general components are shown in such general terms in FIGS. 1, 1A and 1B. The preferred embodiment is a rocket launch system 1 which includes apparatus for moving a rocket 18 to be launched. Rocket 18 is first either in a container or rocket-transporting device such as a carriage 20 or is to be loaded into carriage 20, from storage racks 7. Carriages 20 have cylindrical lengthwise bores into open-ended, heat-and-pressure resistant continuous tubes 836 (FIGS. 13, 13C) which are disposed and held in place for receiving a rocket 18. Carriages 20 are weatherproof and have a longitudinal axis, which is the same longitudinal axis of tube 836. Rockets 18, components thereof, and carriages 20 which may or may not be loaded with rockets 18, are conveyed to storage racks 7 by an appropriate transport railing car on a railway 3 to an off loading area 5. A crane 48 carries respectively rockets 18, and/or carriage 20 and/or a component of rocket 18 travels or is used to maintain various parts of the rocket launch system 1 on relatively narrow crane tracks 78. Rockets 18 may have fins 21 (FIG. 7), and each carriage 20 has internal supports in addition to tube 836.

A transverse loader 50 travels on tracks 90 in the directions shown by arrows A in FIG. 1A, tracks 90 being located further apart from each other than crane tracks 78. Transverse loader 50, which is preferentially used to transfer rockets 18, carriages 20, etc., from storage racks 7 to assembly or fuelling bays 10, includes trucks 92 for travelling on tracks 90, and has a wheeled truck 98 movable on a pair of transverse, parallel rails 97 on top of beams 96, and an elevator assembly 100 attached to a wheeled truck 98. Crane 48, which is preferentially used to perform launch system maintenance, may also be used to remove rockets 18, and/or carriages 20, etc. from storage racks 7, and transfer rockets 18 and/or carriages 20 to assembly/fuelling bays 10 (there would usually be a plurality of assembly bays 10). Elevator assembly 100 moves on rails 97 in the direction shown by the arrows B. Carriage 20, which may or may not have been loaded with a rocket 18 by one way or another, is placed in assembly bay 10. The entire operation is controlled by appropriate control equipment at a local launch control or systems control bunker 120.

Figure 2:
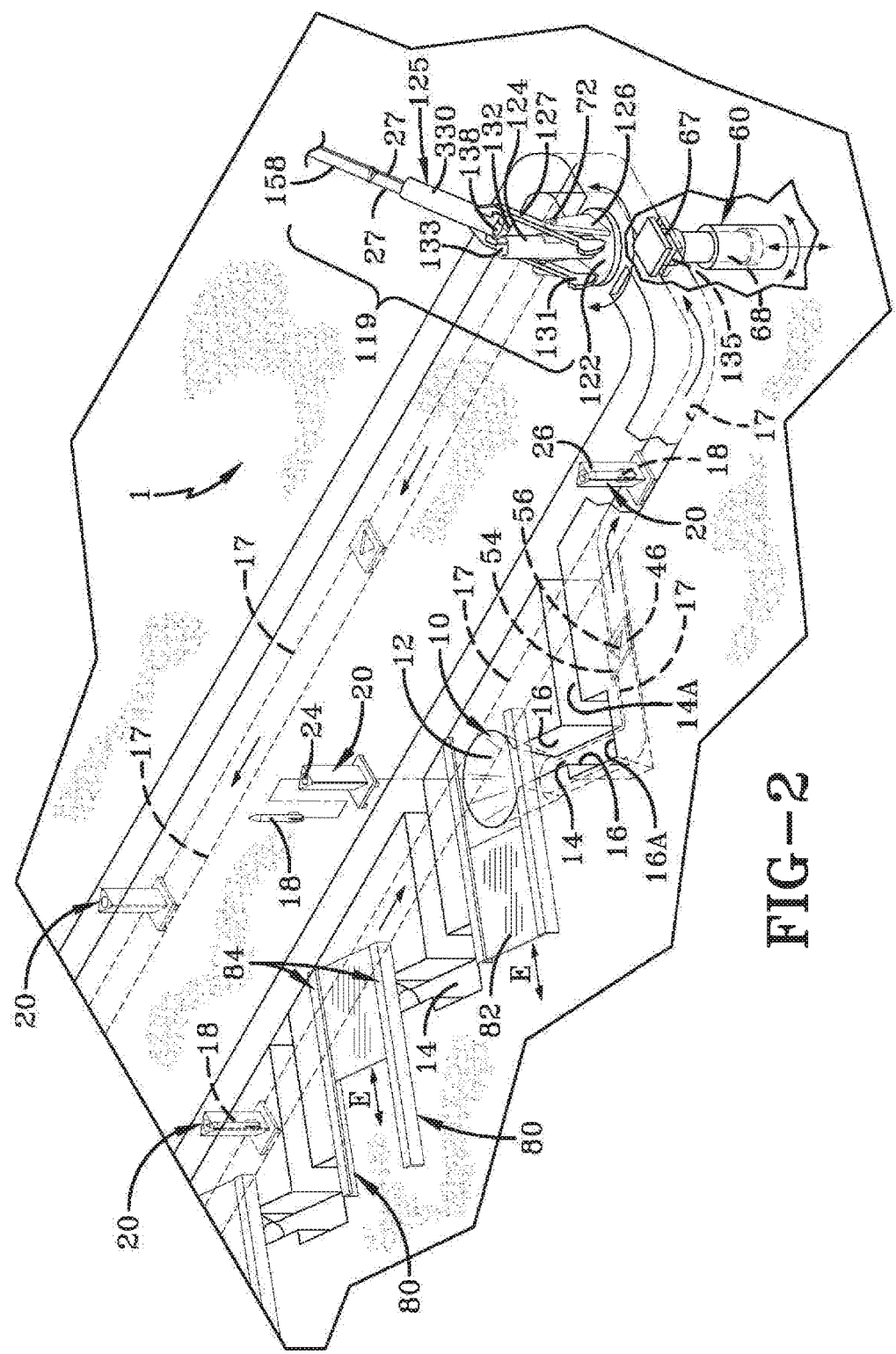
FIG. 2 is a schematic view showing the assembly and basic loading portion of the rocket launcher system according to the preferred embodiment of the invention.
Figure 3:
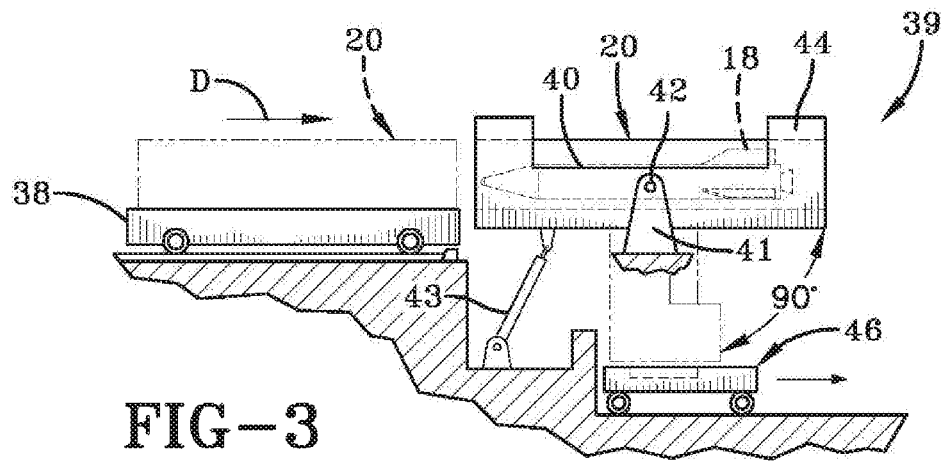
FIG. 3 shows the loading of a rocket into a lateral conveyance device according to an aspect of the preferred version of the invention.
Figure 4:
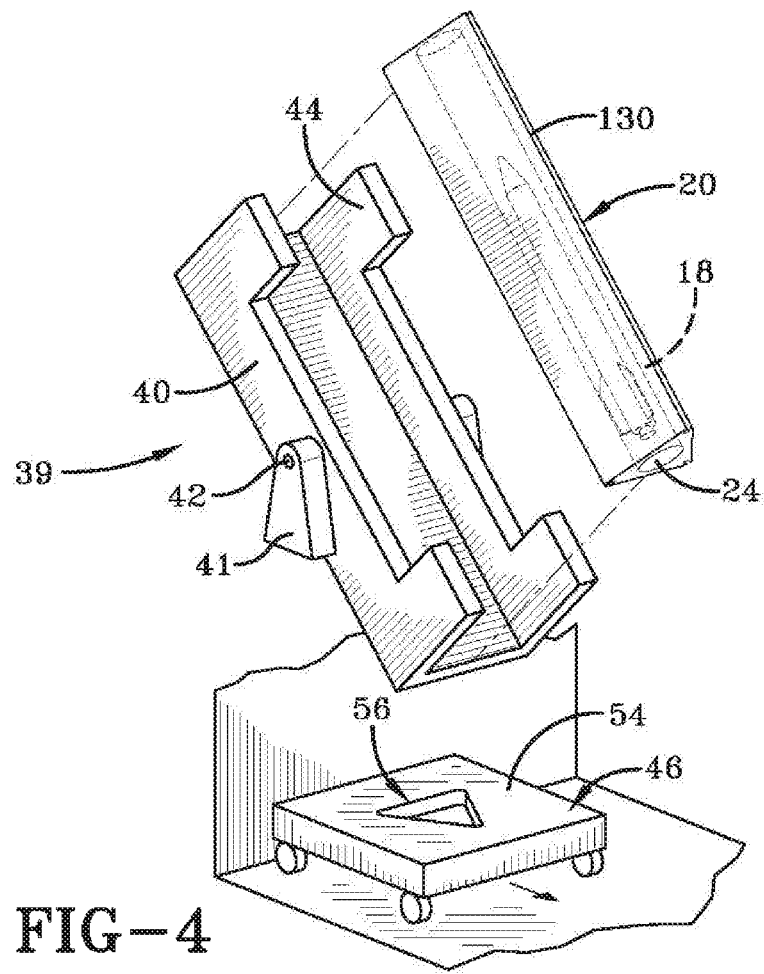
FIG. 4 is a schematic view showing a different view of a carriage holding a rocket, a tipping mechanism and a lateral conveying device.
Figure 8:
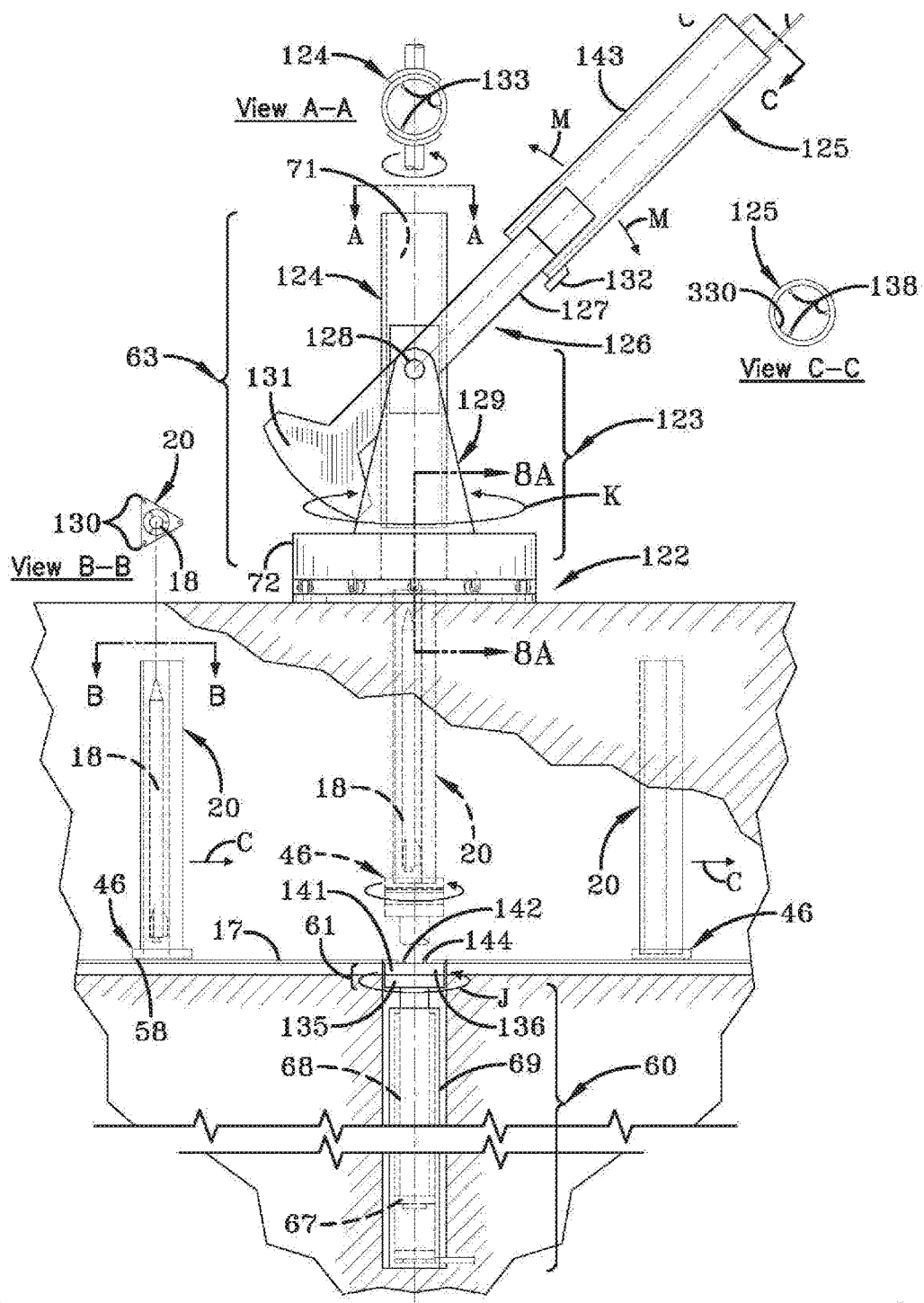
FIG. 8 is a schematic view showing the operation of an elevating assembly of the preferred embodiment of the invention with a lateral conveying device, and a rocket holding carriage.

Referring to FIGS. 1A and 2, a lateral conveying device 46 carries carriage 20 with rocket 18 loaded therein along a set of tracks 17 disposed in below-the-ground paths 14 and 14A, which are located between vertical walls 16. Path 14A (also referring to FIG. 5) leads to a closed loop pathway 15 also having tracks 17. Lateral conveying devices 46 move in the direction shown by arrows C. Lateral conveying device 46 transports carriage 20 with rocket 18 to a launcher 119 which includes an elevating assembly 60. Elevating assembly 60, referring to FIGS. 8 and 9, includes an upper swiveling mechanism 61. Carriage 20 is elevated to an above-the-ground turntable mechanism 63. Turntable mechanism 63 includes a turntable base 122 and a turret assembly 123 (FIGS. 8, 10, 11). Turret assembly 123 comprises a turntable 72, a lower guide tube 124 and a secondary guide structure 125, the latter being operatively connected to a set of power and transporting primary cables 27.

Primary cables 27 are electric energy providers for rocket-loaded carriages 20 being transported thereon. Electrical energy could be provided by one set of electricity-conducting cables, and carriages 20 could be transported by a second set of strong, transporting cables. However, the electric power lines and the rocket-transporting lines have been integrally combined into one of a set of power and transporting primary cables which function both as an electrical energy carrier and to support rockets (preferably in carriages to transport said carriages to and from high altitudes). Primary cables 27 have a low end portion at or near secondary guide structure 125 or turntable mechanism 63 and a high end portion which when in use is at high altitudes. Said power and transporting primary cables 27 are preferably three in number for carrying three-phase electrical power. Primary cables 27 referring to FIGS. 1, 1B, 11, 12, 13 and 14, are connected to a docking station 166, from which extend a set of secondary cables 184. Cables 184 operatively guide a lift ring assembly 182, which is adjusted to an appropriate height above docking station 166 once the pre-selected launch azimuth angle is adjusted with carriage 20 engaged by lift ring assembly 182 and an upper ring part 172 of docking station 166. After being lifted out of engagement with upper ring part 172 and released from a carriage end gripper 196, lift ring assembly 182 is adjusted to the pre-selected launch elevation angle. Lift ring assembly 182 is positioned above docking station 166 and located at significant altitudes for the final step in the launching of rockets 18 as explained below.

Cables 27, 184 and any other cables are supported to the upper atmosphere by a series of lighter-than-air balloons 164 and 160, the balloons are composed of a skin holding a lighter-than-air gas. Said lighter-than-air balloons 164 are attached to said primary cables 27 intermittently along the length of said primary cables 27 to support cumulatively the self weight of said set of primary cables 27 and any structure carried by said primary cables 27. Balloons 160 support the otherwise unsupported portion of cables 27, and any structures attached thereto, and all structures and assemblies from and including docking station 166 up to said balloons 160, and tension cables 27 and 184 so that they may carry a useful load. Cables 27 are separated from each other by a set of spacer or stabilizer assemblies 158. (Cables have been shown throughout most of the description as wire ropes, but they could be rods as explained later.)

Figure 15:
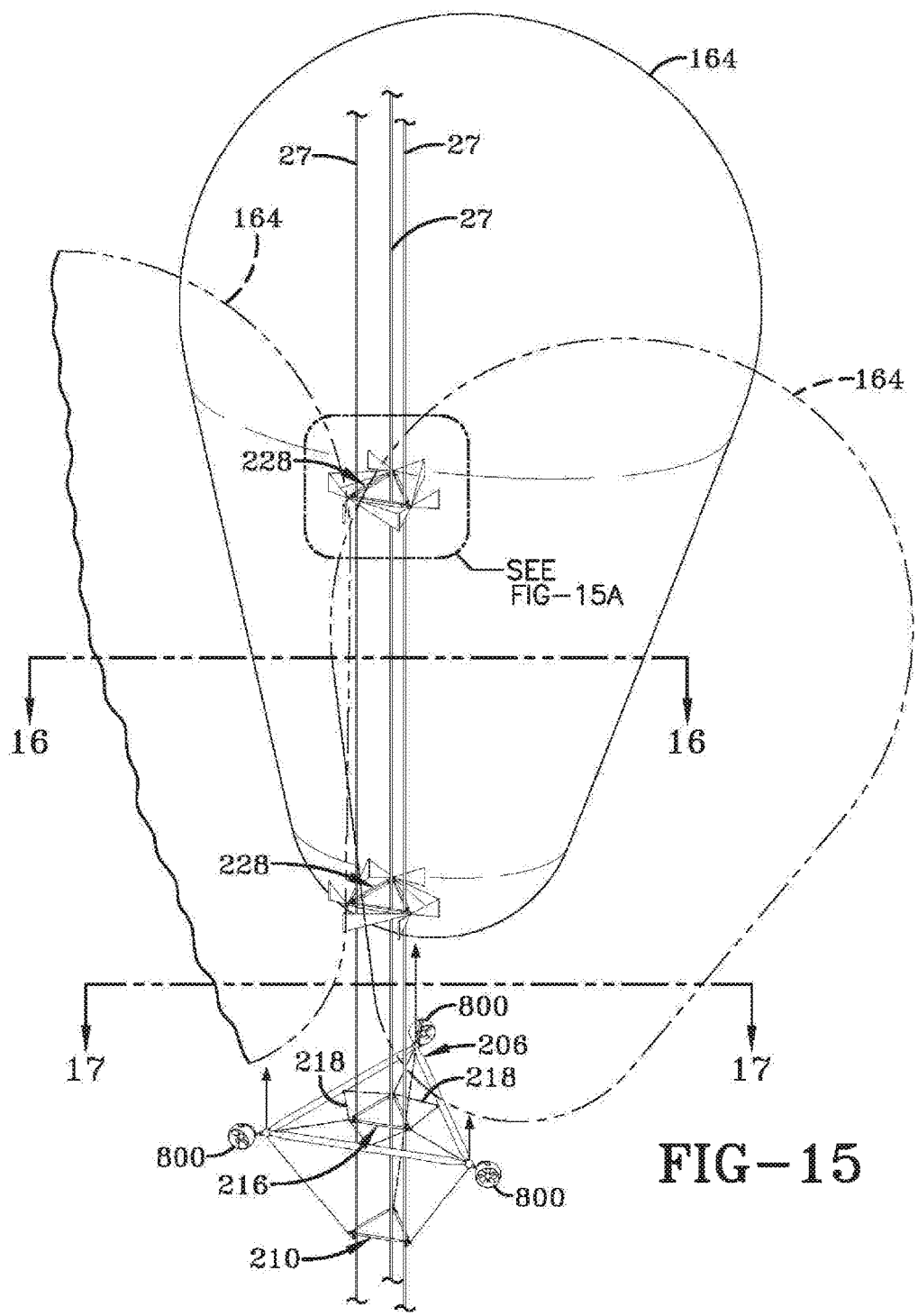
FIG. 15 is a schematic view of a preferred embodiment of the invention showing a stabilizing portion for the balloons and the cable assembly.
Figure 15A:
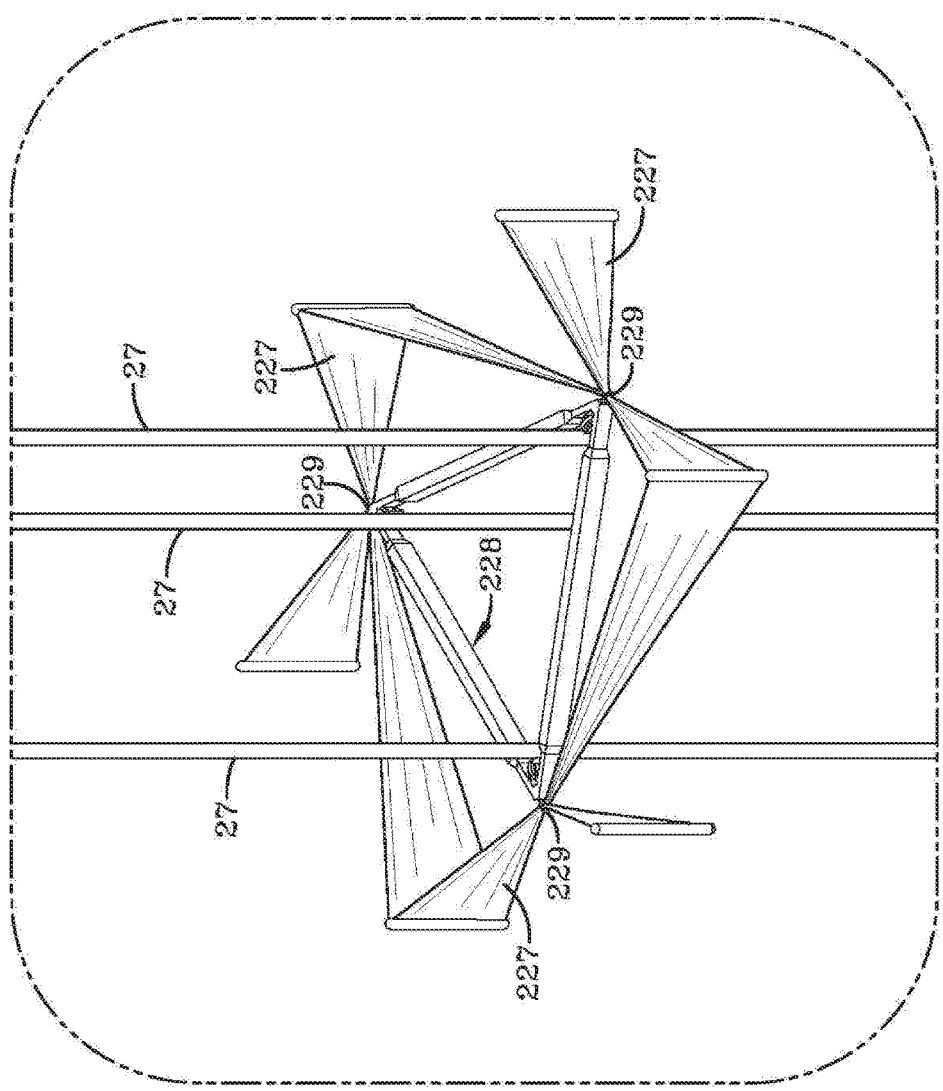
FIG. 15A is a detailed view of a portion of the stabilizing portion for the balloons shown in FIG. 15.
Figure 15B:
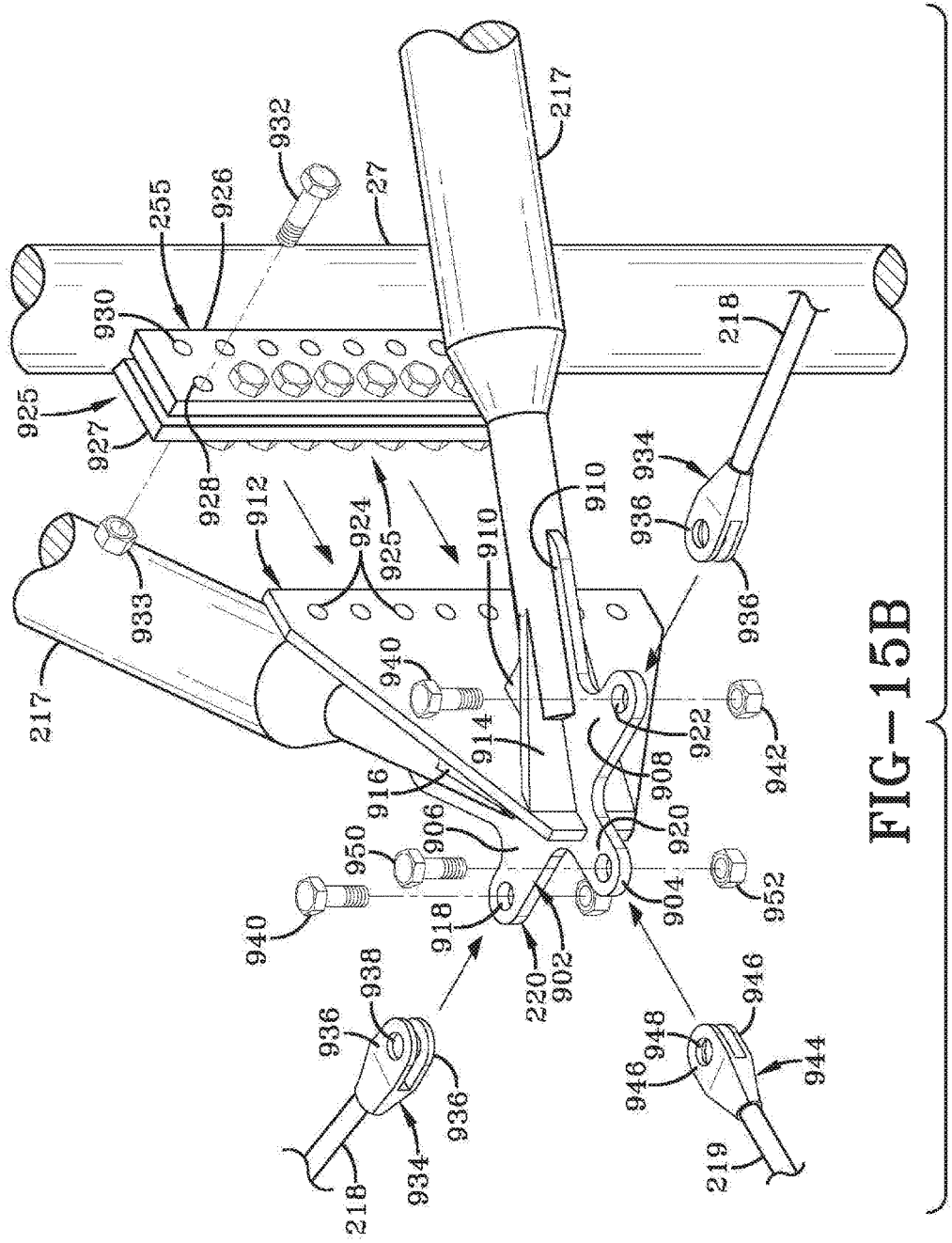
FIG. 15B is an exploded perspective view of the connection of an upper spacer to a cable.
Figure 15C:
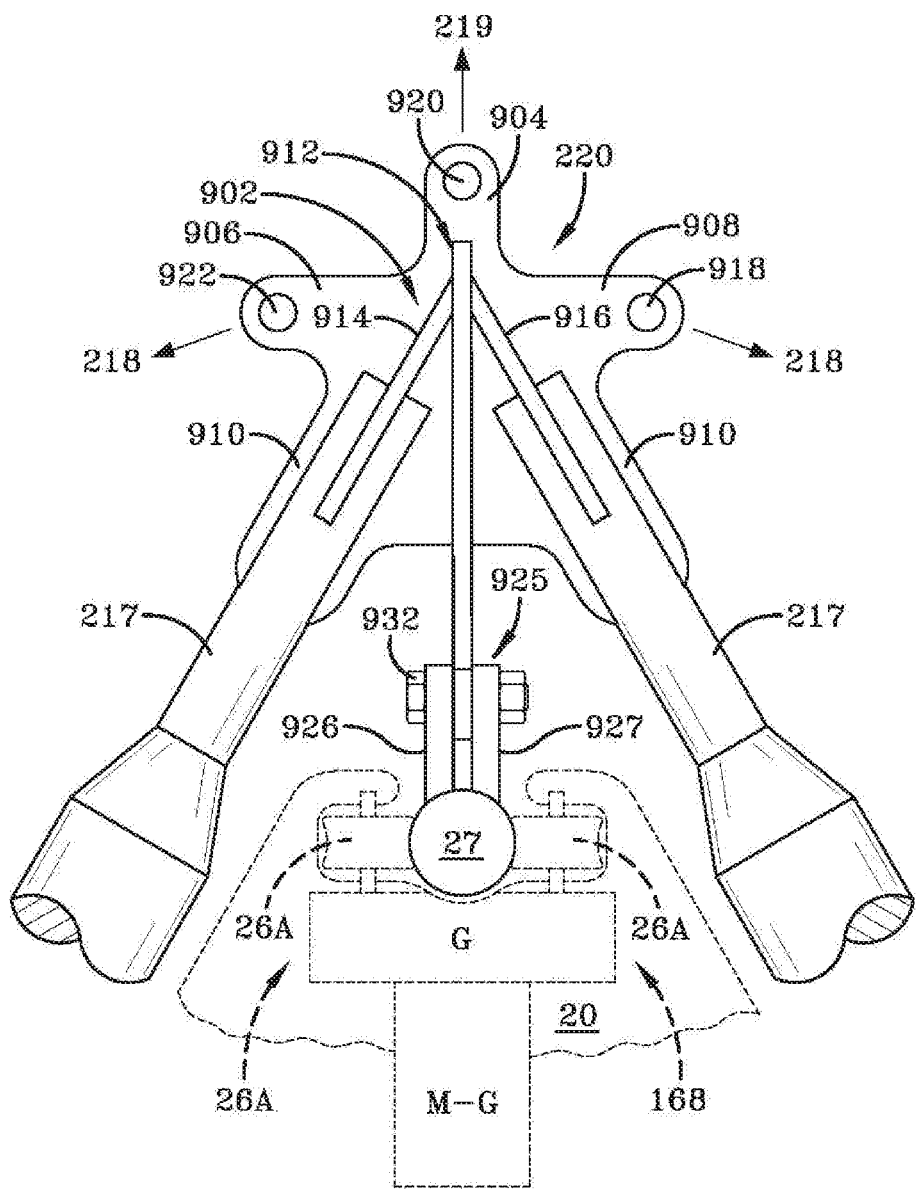
FIG. 15C is a plan view thereof.

Each assembled rocket 18 within a carriage 20 is transported from an assembly bay 10 into lower guide tube 124, then into secondary guide structure 125, and thence to docking station 166 by means of traction drives 26 and electrically powered energizing apparatus 168. Traction drives 26 can comprises a set of traction drive wheels 26A connected to apparatus for converting electrical power to mechanical power and for interconnecting together the mechanical and electrical apparatus. Thus, a set of gears in gearbox G can be operatively connected to electrically powered energizing apparatus 168. The latter can include a motor-generator M-G operatively connected to gears in gearbox G as shown in FIGS. 9C, 15C and 25. Traction drives 26 are built into carriage 20. Carriage 20 travels along and electrically powered energizing apparatus 168 derives power from primary cables 27 as when carriage 20 is lifted up (or climbs) cables 27 and other cables connected to them as described below by traction drives 26. The self weight of cables 27 and all items permanently affixed to said cables are periodically offset by lighter-than-air balloons 164 and which are held taut by lighter-than-air balloons 160. Traction drive wheels 26A and electrically powered energizing apparatus 168 (composed of gears in gearbox G coupled to motor generator M-G) convert electrical energy to kinetic energy to energize electrically powered energizing apparatus 168. The latter is advantageously a reversible electrically powered energizing apparatus for converting potential energy to electric power as carriage 20 descends, and delivering electric power to the electric power lines forming part of the cables upon which carriage 20 is traveling. When carriage 20 requires electrical energy to ascend, wheels 26A are driven by motor generator M-G via converting apparatus such as set of gears in gearbox G which rotate in response to being energized by motor-generator M-G. When carriage 20 descends under the influence of gravity, traction drives 26 act as a regenerative brake and operate gears in gearbox G (or any other device for changing rotational speed) which drives motor generator M-G (or any other device for converting mechanical energy to electrical energy). Balloons 160 and 164 preferably have inclined sides such as shown in FIGS. 1, 11, 20A and 28; cylindrical sides as shown in FIG. 20B, or can be spherical or have other shapes as well. High altitude balloons are well known and are continuously being developed and improved. Appropriate balloons 160 and 164 should preferably remain functional in the applications for the present invention for many months and optimally for years. Balloons for going to the stratosphere have been known and used since the 1950's Carriage 20 is lifted further along secondary cables 184 and rotated and then tilted according to predetermined amounts as discussed below, after which rocket 18 is launched.

The foregoing description provides an overview of components of a preferred form of the invention. Set forth below is a more detailed discussion of the invention in its preferred forms.

Rockets 18 and their respective payloads are assembled, loaded into carriages 20 and fuelled if required, and kept in blast-resistant assembly bays 10 prior to launch. Each bay 10 is located below the ground surface and is constructed so as to limit damage in case there is an accidental detonation of the propellant of a rocket 18. Each bay 10 has an inverted surface in the shape of an inverted frustum 12 referring to FIGS. 2 and 11 of a cone made of an appropriate reinforced concrete material or the like for limiting the effects of any such blast by deflecting it upwardly and laterally. Each bay 10 is connected by means of below-the-ground paths 14 and 14A to closed loop path 15. Path 14 ends at an inclined open chute 86 (FIG. 6) with upwardly sloping wall 16A (FIG. 2) facing into the lateral opening of assembly bay 10. This deflects any lateral component of the possible blast from bay 10 upwards and away from the supporting apparatus (structures, equipment) for launch system 1, and from personnel. Path 14 then turns at approximately 90 degrees to join with path 14A. Each bay 10 is capable of holding a rocket 18 within a carriage 20. Each rocket 18 can comprise a short duration booster rocket motor for ejecting rocket 18 from its open ended continuous tube 836 (FIG. 13A) within carriage 20 with such a velocity that, even if the main rocket engine misfires, the short duration booster rocket motor and rocket 18 will not fall and damage rocket launching system 1. The booster rocket motor would operate only within the heat and pressure resistant confines of the container in which it is held, as described below. Each rocket 18 has one or more main motors for driving rocket 18 to its design velocity.

Figure 12:
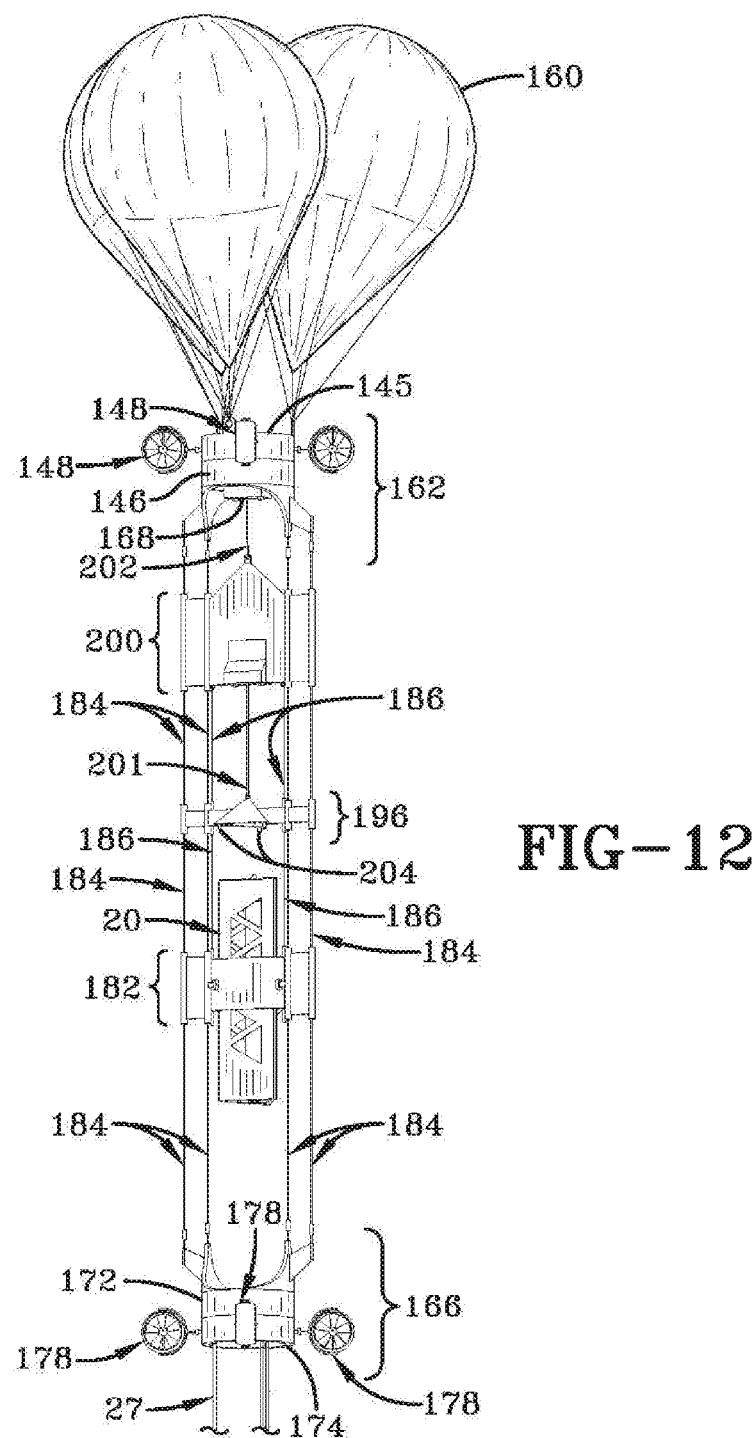
FIG. 12 is a detail of the upper portion of the preferred form of the invention in schematic form showing a balloon assembly for elevating a cable assembly and parts disposed thereon according to a preferred aspect of the present invention for lifting the rocket holding carriage.
Figure 13B:
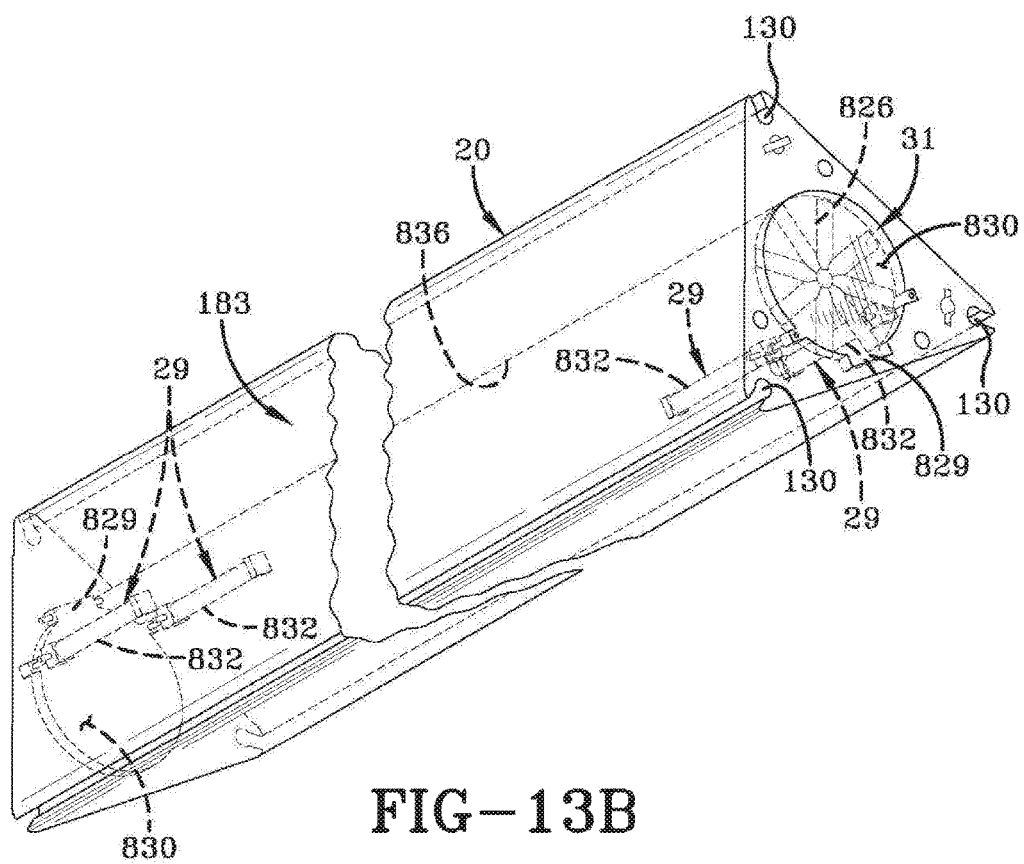
FIG. 13B is a perspective view of an end of the carriage for use in the apparatus shown in FIG. 13.
Figure 13C:
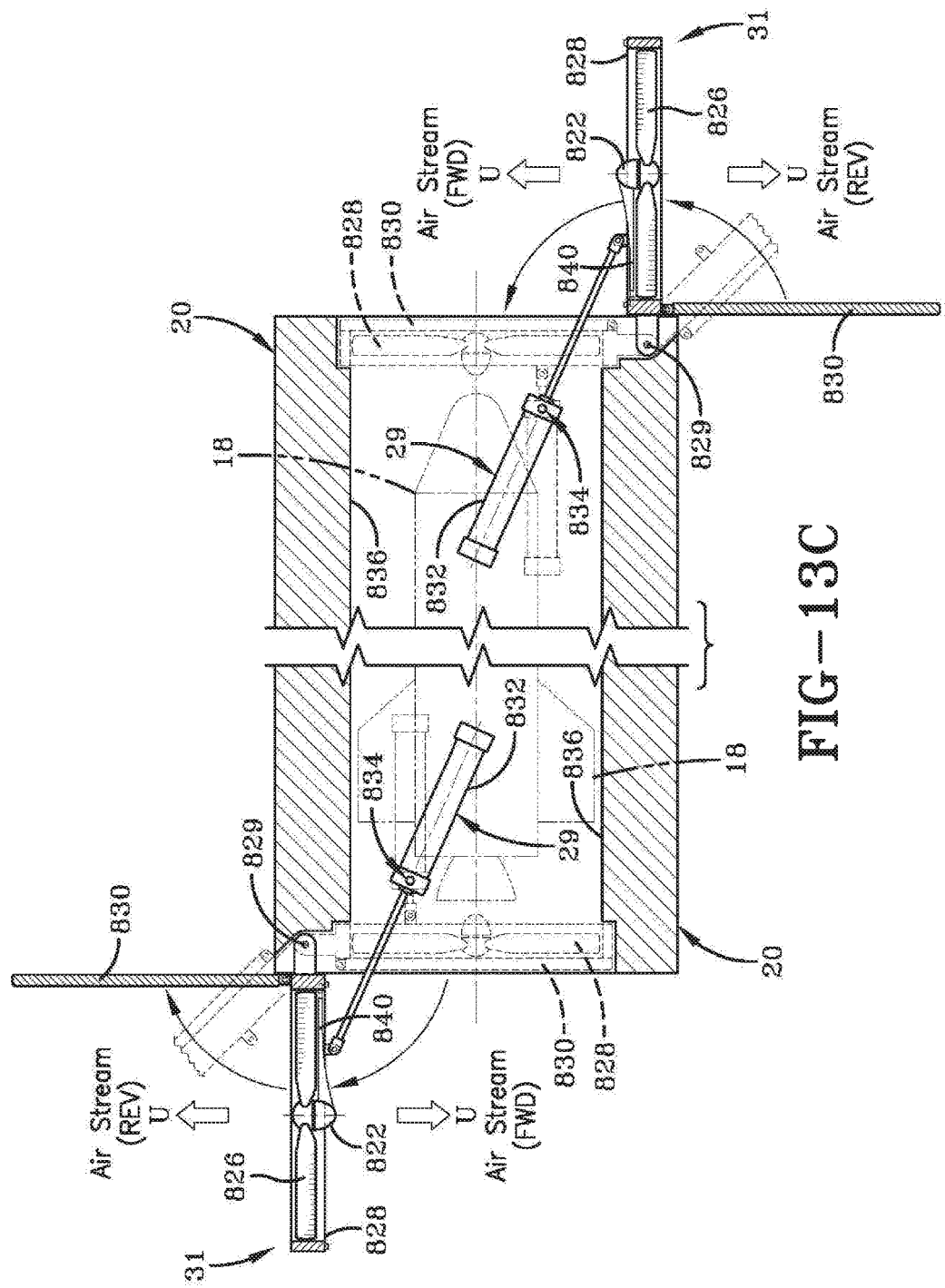
FIG. 13C is a side, partly cross-sectional view of the carriage showing operating positions of some of its components.

Each carriage 20 has opposed end openings 24 (FIGS. 9C, 13, 13A), and hinged weather end covers or retractable membranes 30 (FIGS. 9C, 13, 13A) at both ends thereof to protect rocket 18 in carriage 20 while carriage 20 travels from ground through the atmosphere. These covers 30 can be swung to open both ends of carriage 20 or membranes 30 retracted to likewise open both ends of carriage 20, as shown in FIG. 13A. Also within opposed end openings 24 are reversible variable pitch thrusters 31 hinged parallel to one side of carriage 20 so that they may be rotated to a position perpendicular to the ends by use of actuators 29 (FIGS. 13B, 13C). Each carriage 20 has multiples of three traction drives 26 (FIG. 9C) equally spaced around the periphery of carriage 20 for the purpose of gripping and pulling the carriage 20 up equally spaced primary power cables 27. Cables 27 and 184 have suitably high tensile strengths and conductivity, as discussed below. Traction drives 26 are powered by the foregoing three equally spaced primary power cables 27, cables 27 carrying three-phase power from which traction drives 26 draw their power. Traction drives 26 are reversible, using electrical power to raise the carriage 20 or generating electrical power when used as regenerative brakes. Traction drives 26 operating in the regenerative braking mode convert the potential energy of the carriage 20 as it is lowered, into electricity which is fed back to cables 27, which recovered electricity may be used to assist the raising of other loaded carriages in adjacent launch systems 1. Traction drives 386 (FIG. 28) and 26 (FIG. 9C) operate in a similar manner. The interior of carriage 20 is designed to be capable of resisting the heat and blast effects caused by the operation of the short duration booster rocket motor. End covers or membranes 30 (shown in detail in FIGS. 9C and 13A) protect rocket 18 held in carriage 20 from any adverse weather and may be used to contain inert or relatively inert gases within the interior of carriage 20 surrounding rocket 18 such as nitrogen to inhibit combustion of any reactive materials escaping from rocket 18 during transport to the high altitude launching position. The upper end of carriage 20 may have twist pin lock receptacles 32 (FIG. 13A) similar to fractional rotation twist pin sockets 154 (FIG. 9) (discussed below) to receive twist lock pins 204 (FIGS. 12 and 13) similar to a fractional rotation twist lock pin 144 (FIG. 9) (also discussed below) which are used to lift carriages 20 in preparing for a rocket launching process as discussed below.

Each carriage 20 has internal retractable arms 34 or 35 (FIG. 26, 27) which hold the rocket securely within carriage 20 such that centers of gravity 36 and 37 (FIG. 13) of carriage 20 and rocket 18 respectively are stably positioned in the middle of carriage 20 at its center of gravity. Small elastomeric or pneumatic wheels 372 (FIG. 27) may be attached to the periphery of the rocket to help prevent rubbing contact between the rocket and the inside of carriage 20 during ejection if the rocket's thrust vector does not pass exactly through the rocket's center of gravity. Retractable arms 35 and associated parts are discussed hereinafter.

Figure 5:
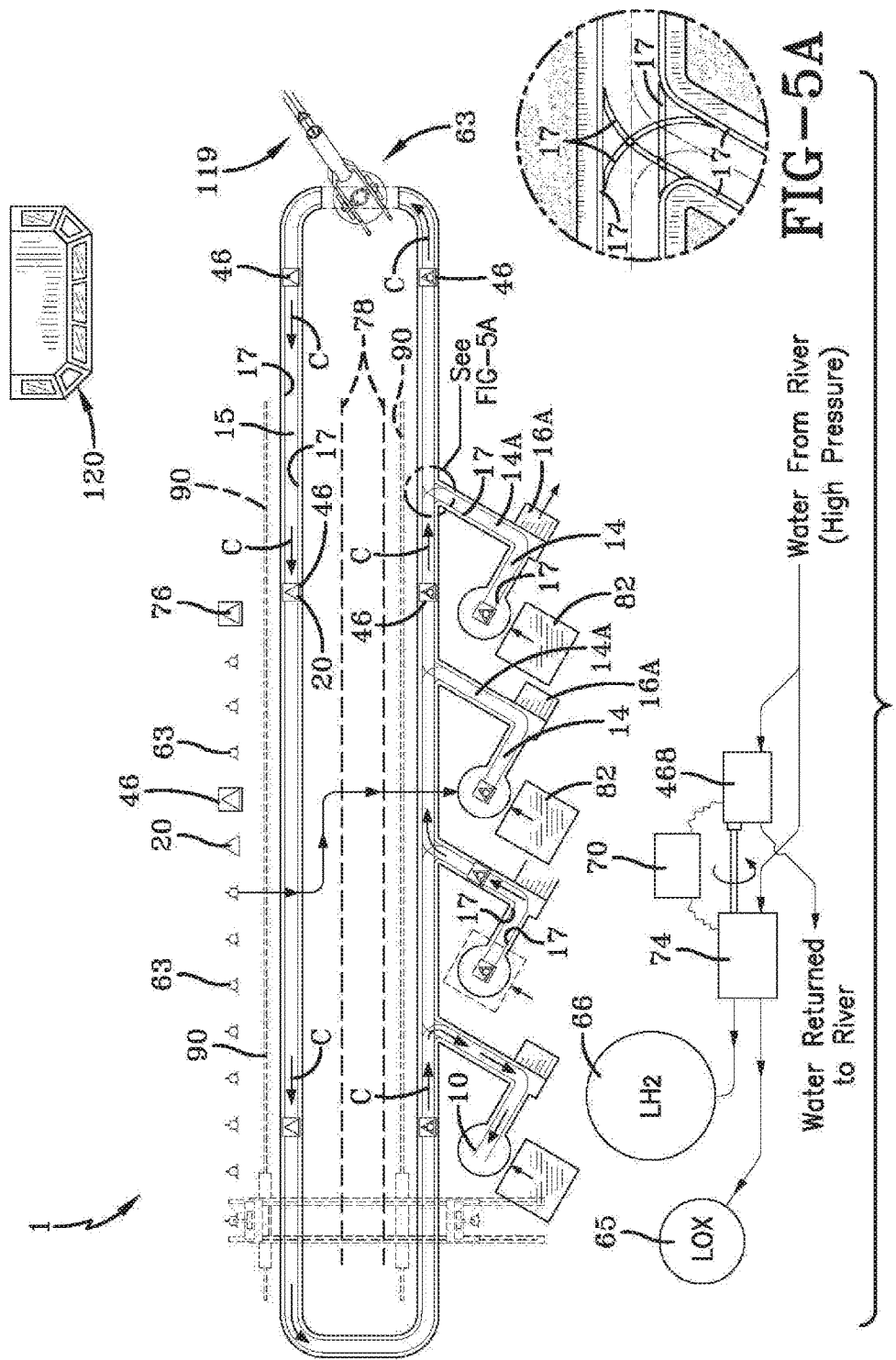
FIG. 5 is a schematic view of the plan layout showing a tracked loop for carriages, storage racks, rocket holding and assembly stations, carriages, fuel storage apparatus and an electrical supply system relating to readying rockets for launching pursuant to the preferred embodiment of the invention.
Figure 6:
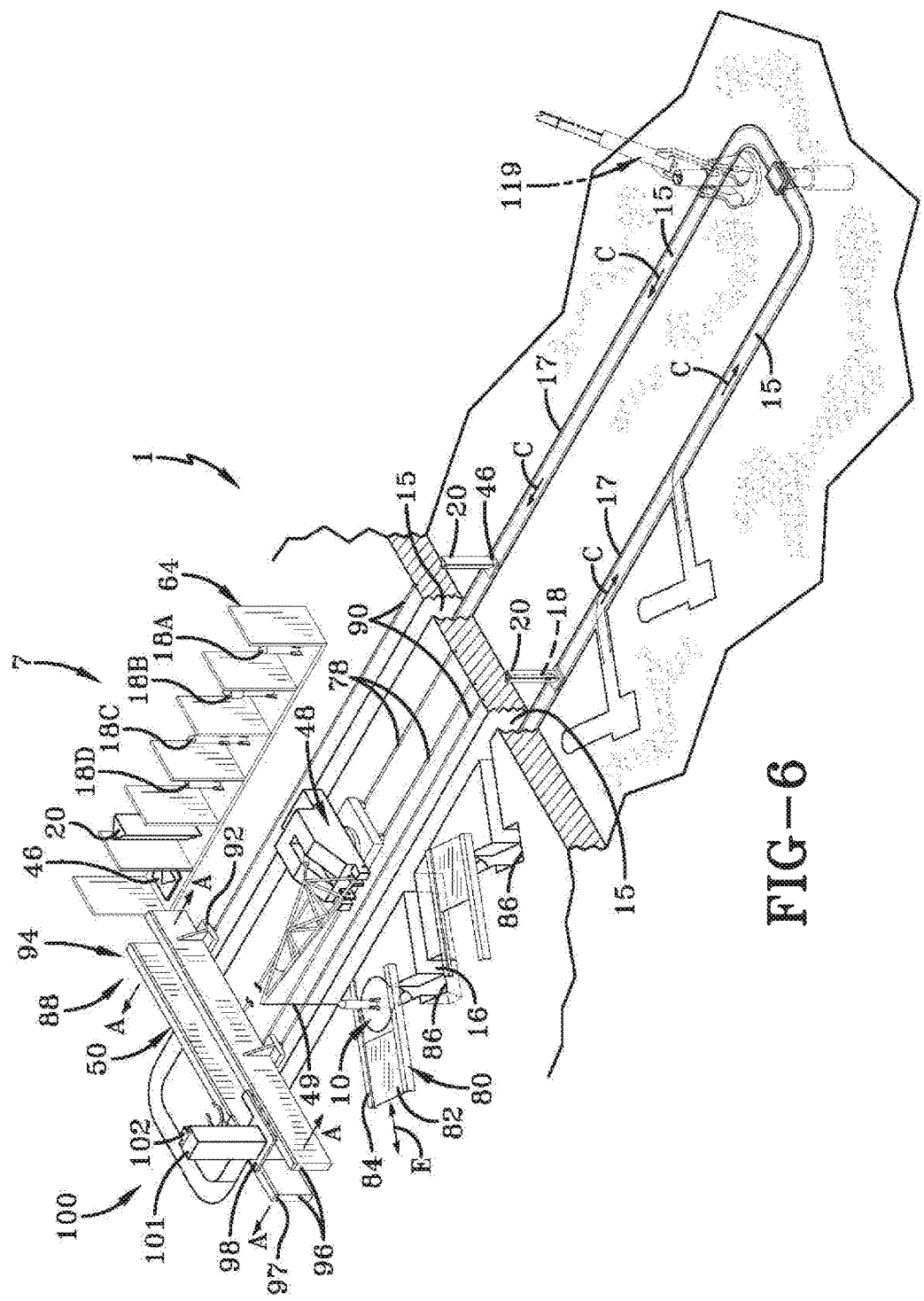
FIG. 6 shows in schematic form, the loading of a rocket into a fuelling or assembly bay according to a preferred embodiment of the invention.

Referring to FIGS. 3-6, there are different ways in which rockets 18 could be loaded in carriages 20. In one version, a rocket 18 is initially assembled horizontally, inserted into carriage 20, and initially placed on a wheeled loader 38 (FIG. 3) in the direction shown by the arrow D. Carriage 20 is then placed in a hydraulic rotator 39, rotator 39 having a hydraulically or otherwise rotatable bed 40 mounted between stands 41 for rotation on pins 42 by means such as a hydraulic actuator 43 (or some other appropriate actuator). The piston rod of hydraulic actuator 43 is almost entirely retracted inside the cylinder since carriage 20 has just passed over the piston and cylinder. Counterweights 44 are designed in each of the four corners of a bed 40, so as to cause the center of gravity of bed 40 to be co-incident with the axis of rotation of pins 42 and with the center of gravity of the rocket 18 and carriage 20 assembly—thereby reducing the actuation force which the hydraulic actuator 43 or other means of rotation, has to exert. Rockets 18 could have previously been placed in horizontally oriented carriages 20 of lateral conveying devices 46 (or similar transporters) prior to rotation to a vertical orientation by hydraulic rotators 39; or rockets 18 could have been placed in upstanding carriages 20 previously situated on lateral carrying devices 46 in assembly bays 10 by means of transverse loader 50. Referring to FIG. 6, transverse loader 50 or crane 48 can be used to transfer empty carriages 20 onto prepositioned lateral conveying devices 46 as explained below, in assembly bays 10, after which loader 50 or crane 48 would load a rocket 18 into carriage 20.

Lateral carrying devices 46 are shown in FIGS. 1-6, 8, 9 and 10. Lateral carrying devices 46 travel along paths 14, 14A and pathway 15 on tracks 17. Pathway 15 forms a closed loop which passes under above-the-ground turntable mechanism 63 (FIGS. 1A, 8, 10, 11 discussed below) and carry carriages 20 each loaded with a rocket 18 from blast resistant assembly bays 10 to elevating assembly 60 as shown in FIGS. 2 and 8, and carry empty carriages 20 as well. Each lateral conveying device 46 has a platform 54 (FIG. 9) with a generally triangular recess 56 (FIG. 2, 4) for receiving the end of a carriage 20 so that carriage 20 is in an upright position, with the outer edges of carriage 20 fitting into recess 56. Lateral carrying device 46 is shown having independently steerable wheels 58 (FIG. 9) for moving lateral conveying device 46 on tracks 17, and further has an appropriate steering mechanism to enable lateral conveying device 46 to travel along paths 14 and 14A, and pathway 15. An appropriate locking mechanism, which may include tapered alignment pins 142 (FIG. 9, discussed below), and fractional rotation twist lock pins 144 (FIG. 9, discussed below), is provided for locking carriage 20 in recess 56 on platform 54. Lateral conveying devices 46 further have similar receptacles as found on the bottom of carriages 20 to receive alignment pins and fractional rotation twist lock pins 144, as explained below, for releasably securing devices 46 to upper swivelling mechanism 61 which as stated earlier is part of an elevating assembly 60 as described later.

Along a portion of pathway 15, a series of rockets 18 and variants thereof, and other items such as lateral conveying devices 46, carriages 20 and variants such as pressurized tourist carriages and launching system servicing carriages, are stored on storage racks 7 which are divided by walls 64. Rockets 18, if they do not use solid fuel, can be fuelled during storage on racks 7 or preferably in assembly bays 10 using various combinations of propellant such as liquid-liquid or liquid-solid fuels depending on the type of rockets 18. One high specific impulse propellant combination is liquid oxygen (LOX) and liquid hydrogen ($LH_2$) which can be stored in storage tanks 65 and 66 respectively, as shown in FIG. 5.

This fuel combination can be produced in a most environmentally friendly manner, by using a system wherein one or more hydro-turbines deliver mechanical power and possibly other hydro-turbines drive electrical generators 62 which are included in a power facility 468. The hydro-turbine(s) receive water from an appropriate source, such as a river with sufficient pressure and mass flow rate, to power an electrical substation 70 from coupled electrical generators 62, and directly drive compressors as found in gas liquefaction plants such as a water electrolysis and gas liquefaction sub-plant in plant 74. Electrical power from substation 70 can be used to operate water electrolysis sub-plant in plant 74, and may be used to provide auxiliary power to a hydro-turbine driven gas liquefaction sub-plant in plant 74 for liquefying the resultant oxygen ($O_2$) and hydrogen ($H_2$), which are respectively stored in LOX storage tank 65 and $LH_2$ storage tank 66, as well, the electrical power being used to supply energy to all other parts of launch system 1 and its supporting apparatus requiring such power. Other sources of energy such as nuclear fission may be used as an alternative if hydroelectric and hydro-turbine derived shaft horse power are not available. Renewable sources of energy such as geothermal, hydropower or solar are preferred.

As explained earlier, rockets 18 are transported on the ground while being contained in carriages 20. Lateral conveying devices 46 can move along paths 14 and 14A, and pathway 15 on relatively narrow, parallel rails 17 (compared to tracks 90 discussed hereinafter). An empty carriage 20 on storage rack 7 is shown in FIGS. 5 and 6 next to an empty lateral conveying device 46. Also shown in FIG. 5 is a pressurized tourist carriage variant, service carriage vehicle variant, spare balloon containing carriages or a space tourism aerospace plane 76. Tracks 78 and a pair of tracks 90 (discussed below) (FIGS. 5 and 6), running parallel to the straight opposing parts of path 15, are used for the movement of crane 48 and wheeled transverse loader 50. Empty carriages 20 are shown on top of lateral conveying devices 46 moving along pathway 15, from which they can be removed for refurbishing or reloading.

The loading system is shown in further detail in FIG. 6. Storage racks 7 each hold either complete rockets 18 and/or component parts of rocket 18, shown as rocket parts 18A, 18B, and 18C, and/or a space tourism aerospace plane 76 (FIG. 5), and/or empty carriages 20 or spare lateral conveying devices 46. Rocket parts 18A-18C could be combined for a final rocket 18, but the invention is not so restricted. Rockets 18 with the respective rocket parts 18A-18C are fed to their respective places by means of railway 3 (see FIG. 1), which rockets 18, rocket parts, etc. could come from distant manufacturing facilities worldwide. Carriage 20 and a lateral carrying device 46 are also shown in racks 7. Crane 48 can travel on tracks 78 to assemble rocket parts 18A-18C in a bay within the storage racks 7 and then into one of carriages 20. Crane 48 may also be used to service paths 14 and 14A, and pathway 15. Crane 48 has a cable 49. Crane 48, using its cable 49 with appropriate lifting gear, may lift assembled rocket 18 and carry it into bay 10 (left part of FIG. 6) for insertion into a preplaced carriage 20 atop lateral conveying device 46. A crane 48 is needed in addition to the other service equipment noted above, for servicing the tracks 17, 78 and 90 and rails 97 (discussed hereinafter). Care must be taken in using crane 48 for transferring rockets 18, since crane's cable 49 may tend to sway during transfer and the rocket suspended from cable 49 could be damaged.

As explained below, there is always a risk of accidental detonation of a rocket 18 in bay 10 if highly reactive fuel-oxidizer combinations are used. In order to protect the various structures, equipment and personnel from the blast effects of such a detonation, a pair of parallel, inverted L-shaped guide members 80 (FIG. 6) extend over opposite edges of bay 10. Each pair of guide members 80 has a blast cover 82 slidable in the direction shown by arrows E, and blast cover 82 is slid under overlapping flanges 84 of guide members 80 prior to fueling. Blast cover 82, once located under flanges 84, cannot be moved even if a blast occurs. Blast covers 82 are made of such a material as not to be destroyed even if it has to withstand a blast within bay 10 during assembly, fuelling or otherwise, the blast being directed away from critical components via chute 86.

Figure 1B:
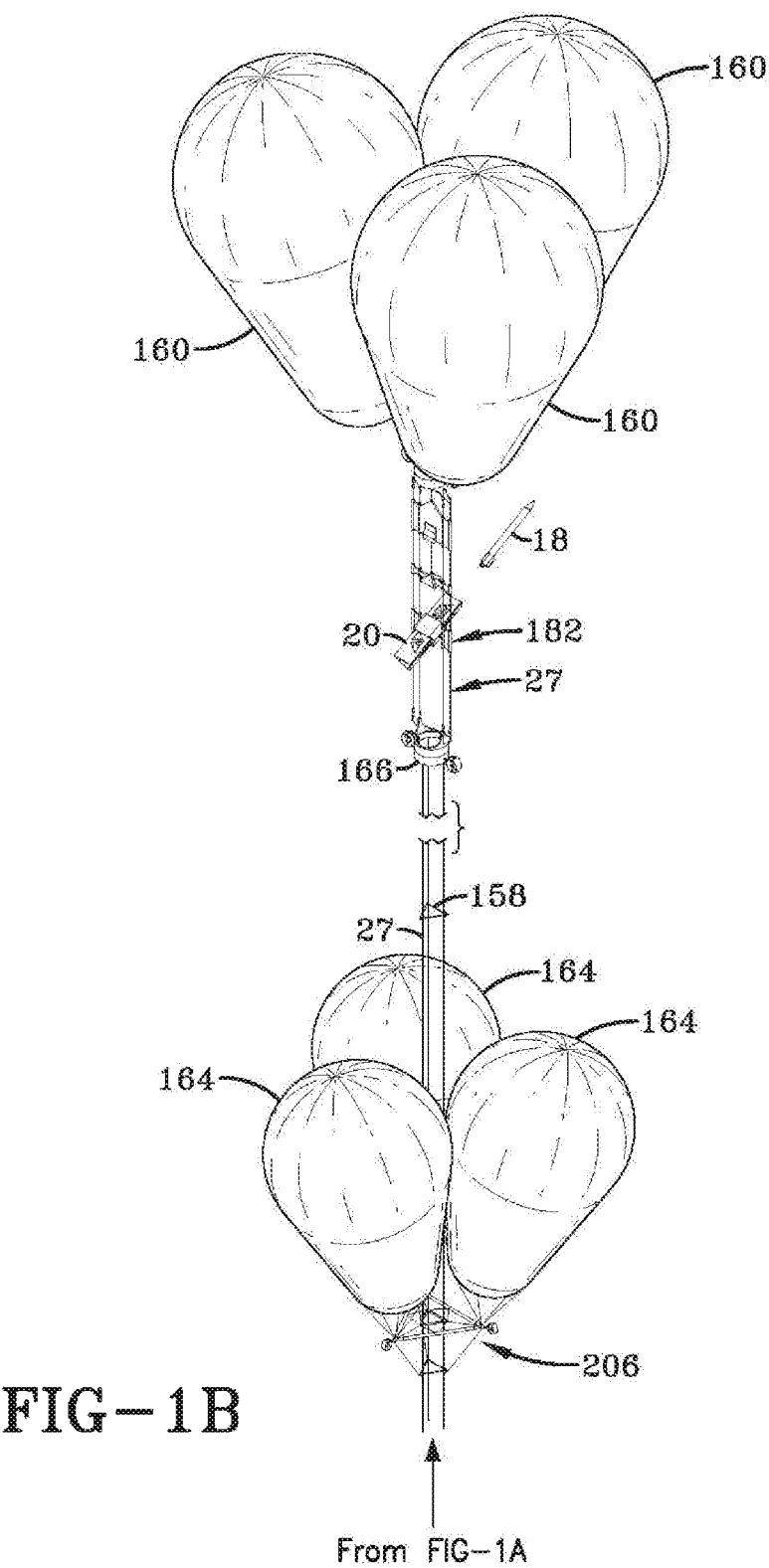
Figure 7:
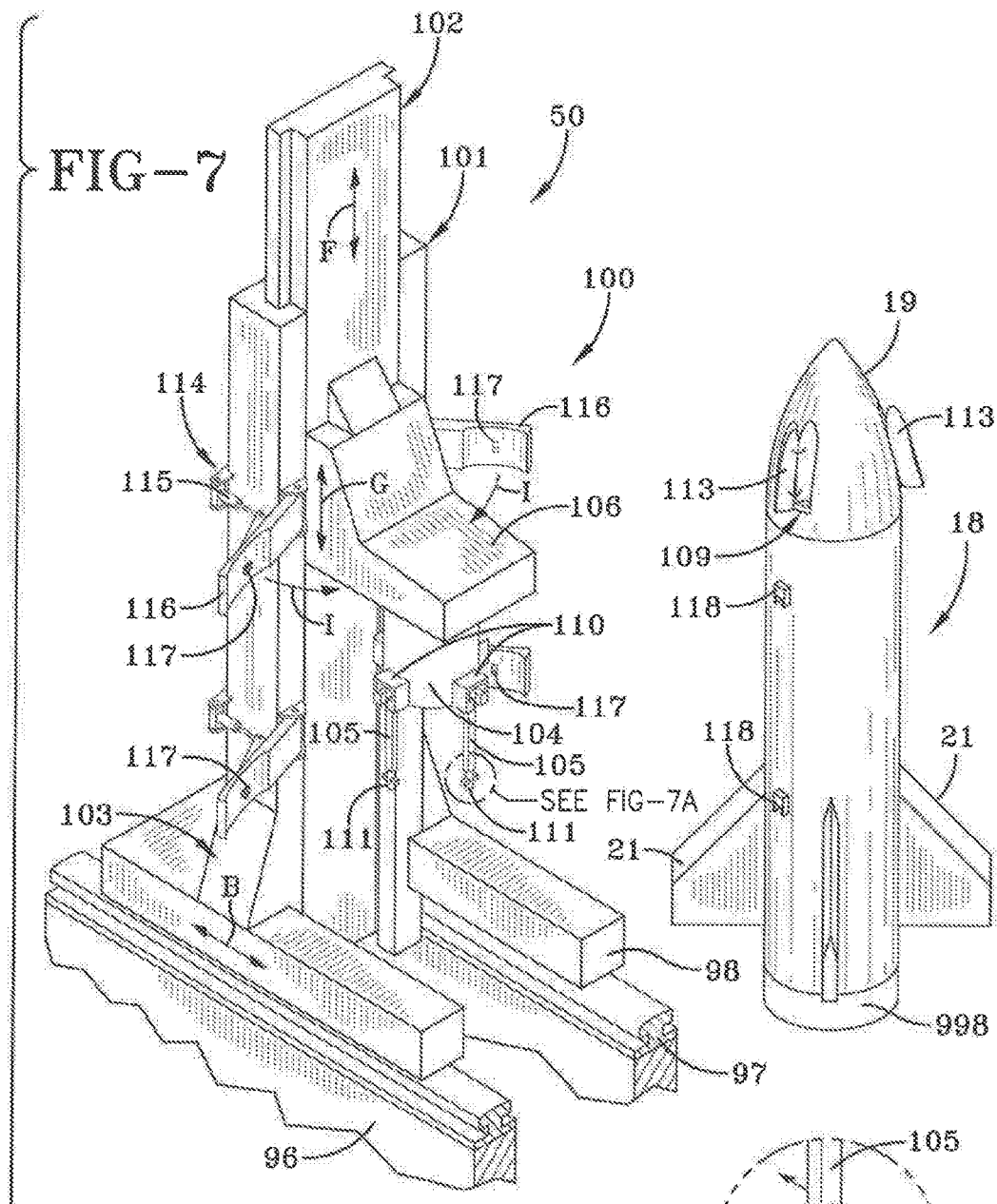
FIG. 7 shows a detail of a transverse loader as shown in FIG. 6.

Transverse loader 50, shown in FIGS. 1 and 6, is part of a rocket loading system 88 including the pair of wide tracks 90 (wider than tracks 78 for crane 48) upon which ride the pair of wheeled trucks 92. A guide assembly 94 comprising beams 96 and wheeled trucks 92 extends across wide tracks 90 and ride on trucks 92 which move on wide tracks 90. Guide assembly 94 has parallel rails 97 as shown in FIG. 7 on top of beams 96 across which travels elevator assembly 100. The entire transverse loader assembly 50 atop rails 90 is similar to a top running double girder crane with end trucks. Parallel guide beams 96 are affixed to trucks 92. Wheeled truck 98 moves across parallel rails 97 as shown in FIGS. 1, 1A, 6 and 7. Transfer loader 50 includes elevator assembly 100 as shown in FIG. 7 with a guide support apparatus 101 and an elevator 102 movable upwardly and downwardly as shown by the arrow F in support apparatus 101 using appropriate electro-mechanical means, preferably counterweighted. Transfer loader 50 removes rockets 18, or empty carriages 20 or variants thereof, or carriages 20 holding various types of rockets 18 or various components, from storage racks 7, to assembly bays 10, from which lateral carrying devices 46 transport the fueled rockets 18 within carriages 20 or other carriage variants to launcher 119.

Referring further to FIG. 7, one embodiment of the details of the upper portion of transverse loader 50 in slightly modified form is shown. As noted above, transverse loader 50 has elevator assembly 100, with guide support apparatus 101 in which is deposed elevator 102. Support apparatus 101 is shown having opposing extensions 103 which permits the connection of apparatus 101 to wheeled truck 98 for moving elevator assembly 100 across rails 97 on top of beams 96. In order to engage a rocket 18 for lifting, elevator assembly 100 has depending legs 105 of which a minimum of three is preferred for stability, which are connected to a body 106 affixed to the lower end of elevator 102 permitting a grasping assembly 104 to be lowered into assembly bay 10, as indicated by arrow G. Legs 105 are movable radially in guides 110 (as shown by arrows H in FIG. 7A) with respect to a rocket 18 located between legs 105 so as to accommodate different diameter rockets. A fractional rotation twist lock pin 111 or other means of attachment to rocket 18, is located at the free end of each leg 105, and the upper portion of rocket 18 has equally spaced fractional rotation twist lock pin sockets 109 or other receptacles for other means of attachment, for receiving the respective twist lock pins 111 for enabling the secure attachment of rocket 18 to elevator assembly 100. Pin sockets 109 are disposed in a nose portion 19 of rocket 18, are generally parallel to the longitudinal axis of rocket 18. Pin sockets 109 may have access covers 113 attached to nose 19 of rocket 18, but being removable from the respective sockets 109 as required to provide access to socket 109, while providing a smooth surface to rocket 18 when pin sockets 109 are not in use to reduce aerodynamic drag when the rocket is in flight.

Upper and lower stabilizing arm assemblies 114 may be provided for stabilizing a rocket 18 during lateral travel, held on elevator assembly 100 while travelling along tracks 90 and rails 97. Stabilizing arm assemblies 114 each have a hydraulic or other actuator 115 to which is attached an arm 116 of each arm assembly 114. Arms 116 are rotatable along paths indicated by arrows I. A lug 117 is provided at the free end of each arm 116 for engaging an appropriately configured recess 118 in rocket 18 for receiving each of lugs 117.

As discussed previously, FIG. 6 shows a lateral carrying device 46 loaded with a carriage 20 holding a rocket 18 moving in pathway 15 towards launcher 119 discussed below. Another lateral carrying device 46 carrying an empty carriage 20 is traveling away from launcher 119 which dispensed a rocket 18 from carriage 20 at high altitude, moving in pathway 15 returning to an unoccupied assembly bay 10 to be reloaded with rocket 18 or returning to storage rack 7 for servicing if required.

Referring back to FIG. 5, rocket launch system 1 further includes launcher 119. A local launch control bunker 120 directs the operation of rocket launch system 1, directing the flows of electrical energy to and from adjacent launch systems 1 from energy sources such as power facility 468 or other adjacent rocket launch systems 1, and housing the computer control and surveillance systems, utilizing data from the various measuring and imaging devices placed throughout launch system 1. This is where the personnel are generally located for controlling the local rocket launch system 1 and coordinating launches from the other members of the group of launch systems for minimizing the use of energy.

Figure 9:
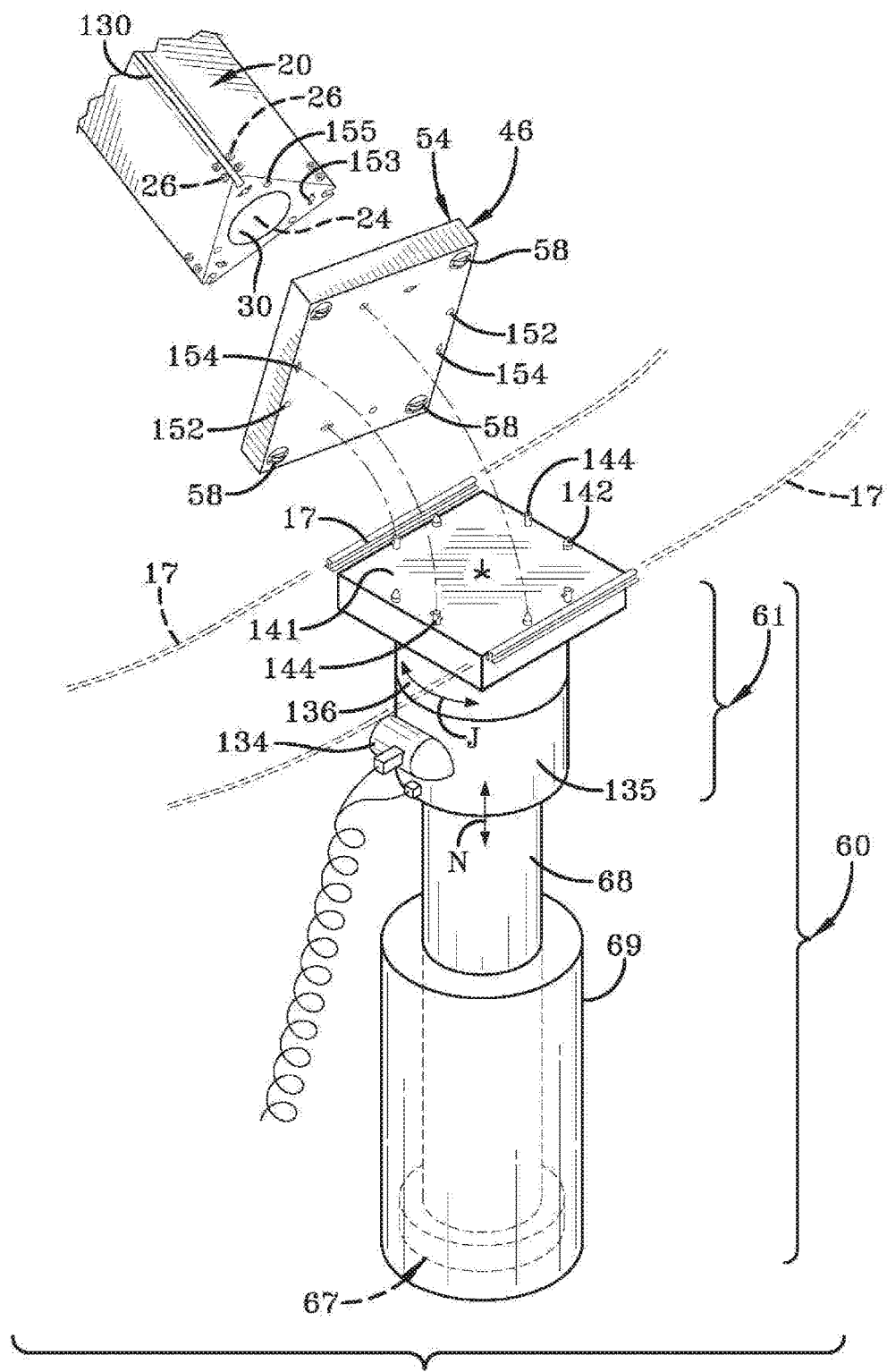
FIG. 9 is a schematic view of an elevating assembly, a rotating bed, a lateral conveying device, a portion of a carriage according to a preferred embodiment of the invention.
Figure 10:
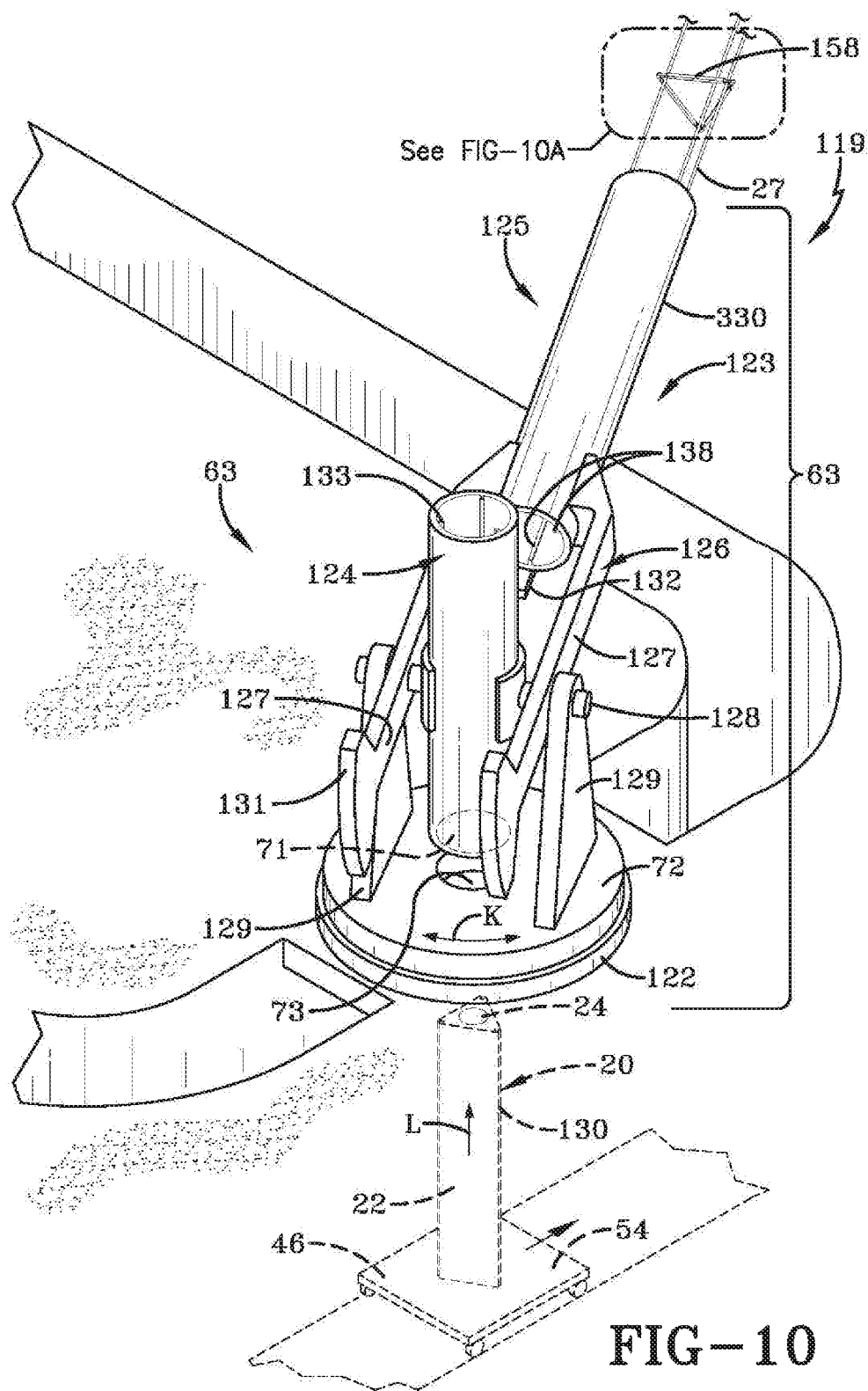
FIG. 10 shows the apparatus for receiving, aligning and commencing the insertion of a rocket holding carriage into the cableway according to the preferred embodiment of the invention.

Elevating assembly 60 is disposed beneath the ground as shown in FIGS. 2, 8 and 9. Elevating assembly 60 may have an elevating mechanism such as a hydraulic piston rod 68 upon which sits upper swivelling assembly 61 (FIG. 9) for rotating, by means of a rotary drive 134, a carriage 20 with rocket 18 within, loaded on lateral conveying device 46 in the direction shown by arrow J. Elevating system 60 described in more detail below with respect to FIG. 8, includes rod 68 having a wide, non-rotating lower bed 135 fixed to rod 68, mounted for supporting upper swivelling assembly 61. Upper swivelling assembly 61 is composed of a rotatable bed 136 (with a table portion 141) mounted on top of non-rotating lower bed 135 (which is not part of turntable mechanism 63).

Reference is now made to FIGS. 8 and 9. Piston rod 68 is part of a piston 67 extending from a hydraulic cylinder 69. Hydraulic cylinder 69, piston 67 and rod 68 do not rotate.

The foregoing hydraulic system is not the only way to operate the elevating mechanism. An electro-mechanical system could form the elevating mechanism.

Turning next to FIG. 10, turntable mechanism 63 is an above ground portion of rocket launcher 119 for receiving rocket-loaded carriages 20 from elevating assembly 60 and orienting them to be transported is shown. The upward movement of rocket-loaded carriage 20 is shown by the arrow L. As stated above, turntable mechanism 63 includes turntable base 122 and turret assembly 123. Turntable base 122 is attached to the earth.

Turntable 72 could be quite heavy, weighing several tons, and should be supported by a structure able to support such a heavy load, to withstand uplift and lateral forces, and rotate smoothly. A detail of an appropriate turntable support device is shown in FIG. 8A.

Figure 8A:
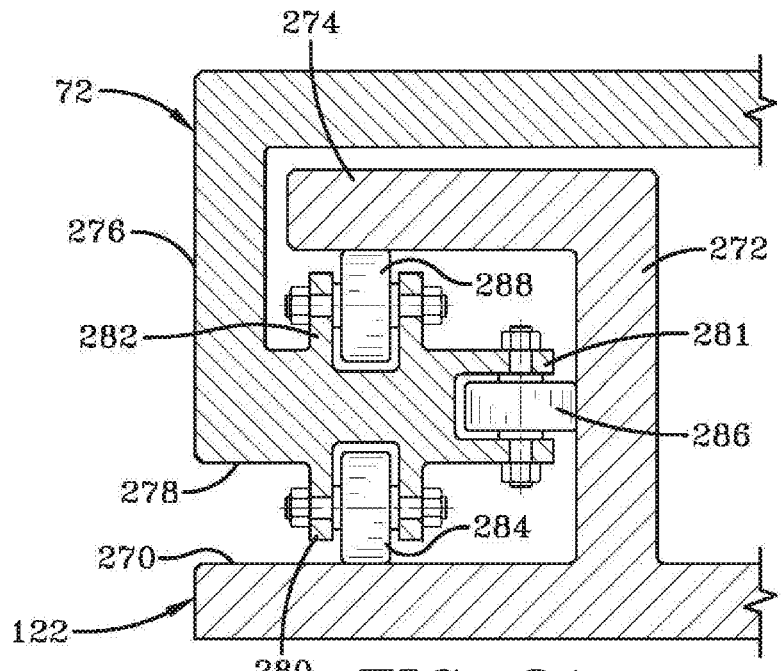
FIG. 8A is an enlarged detail view of one version of apparatus for supporting a turntable for rotation.
Figure 8B:
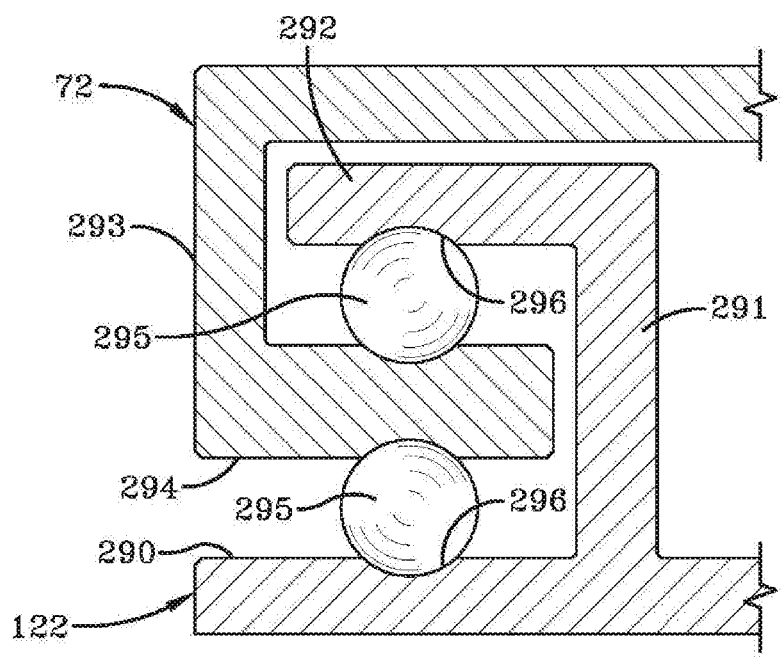
FIG. 8B is an enlarged detail view of another version of apparatus for supporting turntable 72 for rotation.

FIG. 8A shows turntable base 122 having a horizontal surface of a wheel engaging base 270 for being engaged by wheels 284, an upstanding tubular part 272, and a horizontal, annular flange 274 extending outwardly towards the outer circumference of turntable base 122. Turntable 72 has a downwardly extending tubular part 276 at the perimeter of turntable 72, from which extends an inwardly extending horizontal, annular flange 278 having a number of wheel axle holders 280, 281 and 282 extending towards wheel engaging base 270, upstanding tubular part 272 and horizontal, annular flange 274, respectively. Each axle holder 280, 281 and 282 respectively holds the axles of wheels 284, 286 and 288 respectively. Wheels 284, 286 and 288 ride on the surfaces of wheel engaging base 270, upstanding tubular part 272 and horizontal, annular flange 274 to enable the smooth circular rotation of turntable 72 shown in FIG. 8 by the arrow K. Alternatively, referring to FIG. 8B, turntable base 122 could have a horizontal bearing base 290, an upstanding tubular part 291 and a horizontal, annular flange 292. Likewise, turntable 72 could alternatively have a downwardly extending tubular part 293 and an inwardly extending horizontal, annular flange 294. A set of rolling bearings such as bearing balls or crossed rollers 295 is located between horizontal, annular flange 294 and each of bearing base 290 and horizontal, annular flange 292, and appropriate annular bearing surfaces such as grooves 296 would be used to enable the rotation of turntable 72 with reduced friction than if bearings were not provided.

Figure 8C:
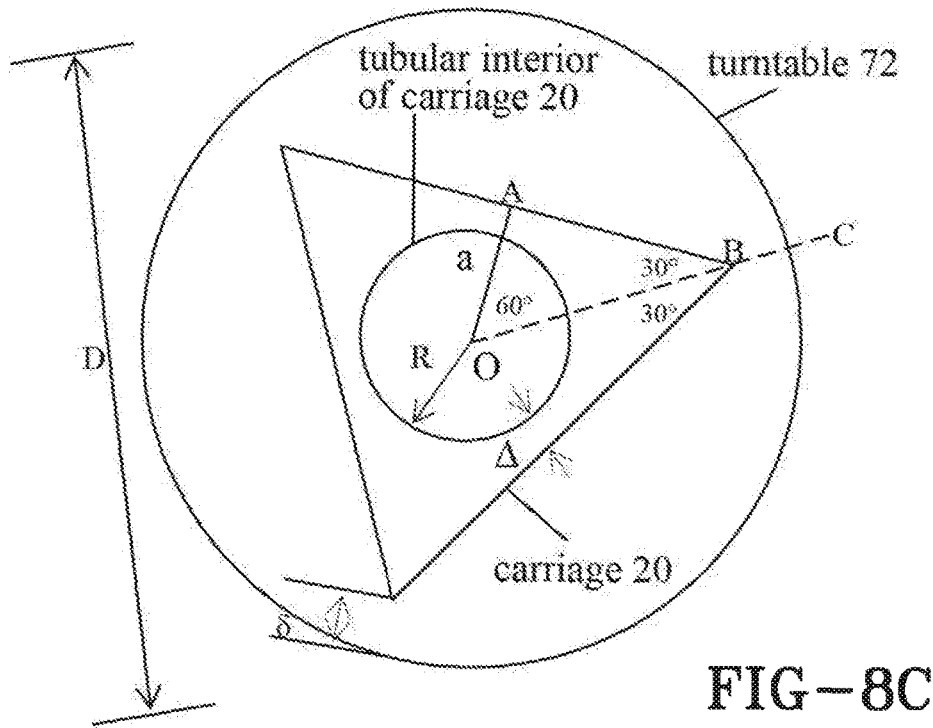
FIG. 8C is a schematic view of the location of a rocket in a carriage located on a turntable, all according to a preferred embodiment of the invention.

Turntable 72, based on the size of carriage 20, could be about 46 feet in diameter. For example, if the tubular interior of carriage 20 for containing rocket 18 has a radius of 8 feet, and the minimum thickness of carriage 20 holding rocket is 2 feet, with a clearance of centrally located carriage 20 is 3 feet, the diameter of turntable 72 would be about 46 feet. This is shown in FIG. 8C.

For a modest diameter of the tubular interior of carriage 20 for containing rocket 18 of 16 feet, carriage interior diameter, plus a modest (A=2 feet) clearance for the structure of carriage 20, and allowance of 3 feet (6=3 feet) for the mechanism to permit turntable 72 to rotate, the diameter of turntable 72 is about 46 feet and a flat side 22 of carriage 20 is about 34.6 feet.

Turret assembly 123 is located at ground level, above bed 136 (FIG. 8), and is supported and restrained by turntable base 122. The vertical axis of rotation of turret assembly 123 coincides with the axis of elevating assembly 60. Lower guide tube 124 has an orifice 71 for receiving rocket-loaded carriage 20 from lateral carrying device 46 through an orifice 73 as shown in FIG. 10 extending through turntable 72 and turntable base 122, by means of elevating assembly 60. Rotatable bed 136 (FIGS. 8, 9) has tapered alignment pins 142 and fractional twist lock pins 144 to releasably lock lateral conveying device 46 with carriage 20 thereon to bed 136. Carriage 20 is releasably locked in a similar manner to lateral conveying device 46 using alignment pins 142 and fractional twist locking pins 144. Being so releasably locked, carriage 20 may be driven as explained further below.

Still referring to FIGS. 8 and 10, turret assembly 123 further includes turntable 72 rotatable with respect to turntable base 122 in the direction shown by arrow K noted earlier, a yoke 126 having a pair of parallel, spaced apart, arms 127 which are pivotable above turntable 72. Between said arms 127 is disposed lower guide tube 124 (also part of turret assembly 123). A pair of horizontal coaxial pivot pins 128 extends through each of arms 127 and into opposing walls of lower guide tube 124, and is disposed through a pair of support members 129. Internal carriage guides 133 extend along the internal cylindrical walls of lower guide tube 124 and are separated from each other by 120.degree. for entering a set of corner recesses 130 (FIG. 9) extending in a longitudinal direction along the corner edges of carriages 20. The corner recesses contain traction drives 26. Lower guide tube 124 and secondary guide structure 125 pivot in the rotational path shown by the arrow M in FIG. 8 by means of an appropriate rotational drive system, about the same horizontal axis defined by pins 128. Each of arms 127 includes a counterweight 131 discussed below. The center point of lower guide tube 124 is disposed vertically above turntable 72 of turret assembly 123 so that the axes of rotation of each of turntable and lower guide tube 124 intersect orthogonally. The vertical axis of rotation of turntable 72 being coincident with the axis of elevating assembly 60 and any lateral conveying device 46 and carriage 20 situated thereon.

Secondary guide structure 125 has an integral tube 143 which is held at a fixed distance from the common pivot of itself and lower guide tube 124. Thus, secondary guide structure 125 is counterbalanced about its horizontal pivot and has internal carriage guides 138 within the integral tube. The lower end of integral tube 143 of secondary guide structure 125 is capable of coming in alignment with the upper end of lower guide tube 124 so the tubes are coaxial, and internal carriage guides 133 and 138 are also aligned. Lower guide tube 124 is rotatable about coaxial pivot pins 128, and rotates until its outer surfaces engage a stop 132 (FIG. 10) extending from an integral tube 330 so that carriage guides 133 and 138 are in alignment. Carriage guides 133 and 138 are powered in the same manner as are power cables 27 (as discussed below) so that traction drives 26 in carriage 20 can utilize the power. The upper end of the tube of secondary guide structure 125 has internal transitional attachment points for primary cables 27 to permit carriage 20 to move from internal carriage guides 138 onto primary cables 27.

As shown in FIG. 2, lateral conveying devices 46, each loaded with a carriage 20 holding a rocket 18 moves along pathway 15 from assembly bays 10. Carriage 20 with rocket 18 is removed from pathway 15, transferred to rocket launcher 119, and after the rocket is launched the empty carriage 20 is returned to the empty lateral carrying device 46 before proceeding along pathway 15, returning to assembly bays 10 or storage racks 7.

Turning to FIGS. 8-10, elevating assembly 60 raises or lowers carriage 20 with lateral conveying device 46 secured to rotatable bed 136, by raising piston 67 and rod 68 in the direction shown by arrow N (showing the raising and lowering directions) to move carriage 20 into lower guide tube 124, and clear of turntable 72. Rotatable bed 136 has structure described below for releasable attachment to lateral conveying device 46 to accurately align traction drives 26 of carriage 20 with appropriate internal carriage guides 133 of lower guide tube 124.

Figure 9A:
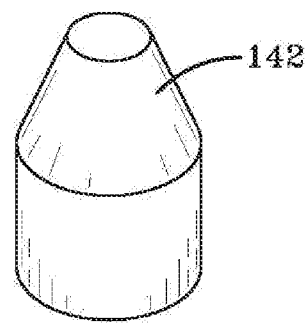
FIG. 9A is an enlarged perspective view of a tapered, alignment pin.
Figure 9B:
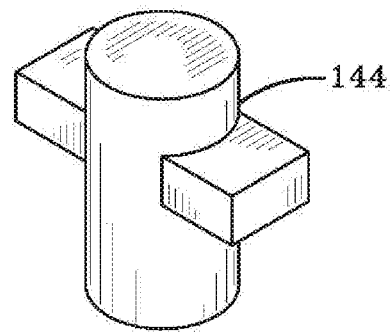
FIG. 9B is an enlarged perspective view of a fractional twist lock pin.
Figure 9C:
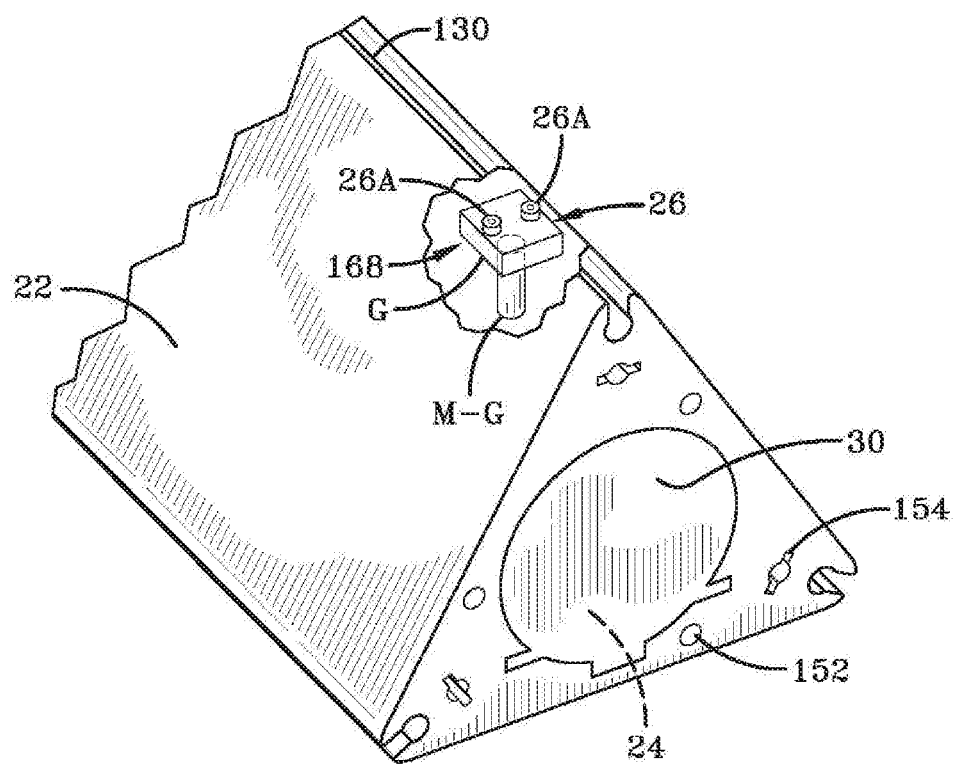
FIG. 9C is an enlarged detail view of the base of a carriage.

Elevating assembly 60, lateral carrying device 46 and carriage 20 are shown in more detail in FIGS. 8 and 9. Hydraulic piston 67 has on its upper end upper swivelling assembly 61 composed of non-rotating lower bed 135, rotatable upper bed 136 and table portion 141. Lateral conveying devices 46 can travel to a location centered over elevating assembly 60. As mentioned earlier, tracks 17 are likely to be of necessity wider than conventional railroad tracks. Upwardly tapered alignment pins 142 (four are shown) (shown in detail in FIG. 9A) extend from table portion 141 as do fractional twist lock pins 144 (four are shown) (shown in detail in FIG. 9B). These interconnect with lateral conveying device 46 as explained below. Of course, the location of the respective pins 142 and 144, and the respective sockets could be reversed between the lateral conveying devices 46 and the portion 141.

Upper swivelling assembly 61 of elevating assembly 60 is mounted on rod 68 and can be raised as shown by arrow N to permit engagement of lower tapered alignment pins 142 and fractional rotation twist lock pins 144 shown in FIG. 9 into corresponding alignment pin sockets 152 and twist pin socket 154 in lateral conveying device 46.

The upper surface of lateral conveying device 46 has upwardly extending tapered alignment pins and fractional rotation pins which are virtually the same as lower tapered alignment pins 142 and fractional rotation twist lock pins 144 extending from the top of table portion 141. A corresponding alignment pin socket 155 and a twist lock socket 153 are provided in the lower face of carriage 20 to receive the tapered alignment pins and fractional rotation pins on the top of device 46 to releasably attach carriage 20 to lateral conveying device 46.

Lateral conveying device 46 has four wheels 58 positioned and contoured to ride on electric rails or tracks 17, and including tracks 17 adjacent to table portion 141, and are independently alignable as mentioned earlier. Lateral conveying device 46 may be powered from electric rails 17 in ways similar to electric trains or tram cars (which would have to be connected to an electric power source) or from some other on board power source such as fuel cells or internal combustion engines.

Lower guide tube 124 has internal carriage guides 133 (FIGS. 8, 10) which extend into each of corner recesses 130 extending along the vertical intersections of sides 22, also shown in enlarged form, (FIG. 10) of carriage 20 to engage traction drives 26 of each carriage 20 to move each carriage 20 along carriage guides 133, and to maintain the orientation of carriage 20 in lower guide tube 124. Carriage traction drives 26 are provided for gripping primary power cables 27. Carriage traction drives 26 are mechanisms having cross sections partially enveloping primary cables 27 on which carriages 20 ride, and from which they derive power or to which they deliver power. Referring to FIG. 15C, one of traction drives 26 is shown as having two opposing traction drive wheels 26A in engagement with primary cable 27. Each traction drive 26 includes a gearbox G and motor-generator M-G. As mentioned earlier, traction drives 26 may include motor-generators M-G and gearboxes G and opposing cylindrical wheels 26A operatively connected thereto, each having an annular groove 137 for receiving a cable 27 as shown in FIGS. 9C, 15C and 25. Wheels 26A rotate in opposite directions as shown by arrows $O_1$ and $O_2$. Traction drives 26 are positioned along the length of a carriage 20. Surface roughening or modification could be provided on the gripping surfaces of traction wheels 26A to enhance the appropriate surface friction of the pairs of traction drive wheels 26A which in effect pinch respective cables 27. Electric motor-generators M-G of traction drives 26 derive electrical power from primary cables 27 (and any subsequent cables), to drive/rotate respective pairs of wheels 26A through gearboxes G as carriages 20 ascend primary cables 27, and motor-generators M-G provide electrical power to primary cables 27 as carriages 20 descend primary cables 27. The motors could rotate more than one pair of traction drive wheels 26A. There also could be individual motors operatively connected to individual pairs of traction drive wheels 26A. Much of this depends on the load being carried and the size of carriage 20.

Traction drives 26 propel carriage 20 along cables 27 or guides 133 and 138 (FIG. 10). Traction drives 26 generate power which is returned to the cables when each carriage 20 is propelled in a reverse direction by gravitational force. The generation of this power causes a reaction to the gravitational force and retards the motion of empty carriage 20 as it moves in a downward direction as occurs some time after launch of rocket 18. Each traction drive 26 can have a minimum of one opposing pair of wheels 26A, as shown in FIG. 25. The traction drive motors should be of a constant torque motor or of a variable frequency drive type to compensate for cable stretch or wheel slip, to cause each group of wheels to contribute equally and maintain the carriage co-axial with the centroid of cables 27 or internal carriage guides 133 of lower guide tube 124 or internal carriage guides 138 of integral tube 330 of secondary guide structure 125 when driving carriage 20 upwards.

As noted earlier, rocket launcher 119 according to the present invention has an elevating assembly 60 for raising or lowering a carriage 20 vertically into or out of engagement with lower guide tube 124 mounted on turntable 72 of turntable mechanism 63. Lateral conveying device 46 is movable with respect to table portion 141 so that fractional rotational twist lock pins 144 can be received in twist pin sockets 154 in the bottom of lateral conveying device 46. Elevating assembly 60 elevates table 141 a short distance out of the bed of tracks 17 to engage the bottom of lateral conveying device 46. Table 141 is then locked onto the bottom of lateral conveying device 46 before its wheels 58 and all of the table portion 141 are lifted above tracks 17 whereupon table portion 141 may be rotated with lateral carrying device 46 and carriage 20 mounted thereon by means of rotating drive 134 to align carriage traction drives 26 with internal carriage guides 133 in lower guide tube 124 which rotates freely or, if necessary with power assist, with turret assembly 123 to maintain alignment with the changing winds. This assures the necessary stable alignment of carriage 20 with rocket 18 held therein, in lower guide tube 124.

Referring to FIGS. 1, 10 and 11, rocket launch system 1 includes a primary set of cables 27 which are separated from each other by spacer or stabilizer assemblies 158. Spacer assemblies 158 are shown in detail in FIG. 10A, and include three side pieces 159 forming a triangle, and arms or flanges 161 orthogonal to the plane of said triangle for engaging respective cables 27. Flanges 161 or side pieces 159 or both, are made of electrically non-conductive material. Cables 27 are capable of conveying electrical power, are of lightweight as explained below, and have a high tensile strength. The preferred construction and manner of employment of spacer assemblies 158 is shown in FIG. 10A. Extending from each of cables 27 are adaptive connectors 501 (each similar to an adaptive connector 247 discussed below). Adaptive connectors 501 are provided along each primary cable 27 at spaced intervals, connectors 501 being in alignment along respective cables 27. Each adaptive connector 501 has a pair of spaced, parallel aligned flanges 503 generally radially (but not exactly radially since they clamp loops of wire extending from the respective cables 27) adjacent respective cables 27. Flanges 503 each have a pair of columns 505, 506 of holes, each column of holes 505, 506 on each pair of flanges 503 being in alignment. The column of holes 506 being closest to respective cables 27 are attached to cables 27 as explained later with respect to an adaptive connector 247. A set of lugs (not shown) extend through the respective aligned holes 505 and also holes in alignment on respective orthogonal flanges 161 to attach each corner of respective spacer assemblies 158 to respective primary cables 27. Each arm 159 of the respective spacer assemblies 158 has an enlarged portion 520, preferably of tubular construction for stiffness and resistance to buckling, extending between adjacent primary cables 27, which have shoulders or tapering surfaces 522 to help restrain movement of cables 27 with respect to each other, and to create a lateral clearance between spacer assembly 158 and each cable 27. Arms 159 have smaller end portions 524 for attachment to each other and to respective orthogonal arms 161. Spacer assemblies 158 can have various configurations; spacer assemblies 158 are shown having square cross sections, but circular cross sections are also advantageous. Spacer assemblies 158 can each be one piece, being bent into their triangular shapes and slipped onto three primary cables 27, or arms 159 can be welded together before or after installation on cables 27. Arms 159 are preferably welded to spacer assemblies 158 although bolted connections are possible.

At the uppermost part of the rocket launch system 1 is the set of lighter-than-air, tensioning balloons 160 (FIGS. 1, 1B, 12-14), and there are other lighter-than-air tensioning balloons 164 (FIGS. 1, 1B, 11, 15, 17, 18, 21) positioned along the cables 27 for offsetting the self weight of cables 27 and somewhat contributing to their tensioning. Balloons 160 are connected to a tensioning balloon attachment frame or top large harness 162 (shown in FIGS. 12-14) for the purpose of supporting part of the weight of the primary cables 27 and all components above other tensioning balloons 164, docking station 166 (FIG. 13 discussed below), inclusive of the operational weight of a carriage 20 with a flight ready rocket 18. Balloons 160 and 164 must accommodate any lift fluctuations and reaction forces due to the movement of carriage 20 and its contents, and other components. There are variations in lift from tensioning balloons 160 and 164 due to daily thermal and atmospheric pressure variations. An additional amount of lift is required to cause primary cables 27 to be tensioned to a significant part of their safe working load, since cables 27 must be kept as close to vertical as practical. As noted, one or more additional sets of lighter-than-air balloons 164 or 164A (FIGS. 1, 11, 15, 16, 17, 20A, 20B), which can be smaller than lighter-than-air balloons 160, must be interspersed along cables 27 to relieve the self weight of cables 27 and the weight of the supporting structure and spacer assemblies 158 of primary cables 27 together with daily thermal lift variations with a margin of safety to prevent cable breakage under self weight, the net effect being that cables 27 with associated balloons approximate cables with no weight or negative weight. Primary cables 27 are engaged by and provide power to a winch or hoist 169 discussed below, and form a cableway path 170 shown in FIGS. 11 and 13. Cableway path 170 is formed of and enclosed by primary cables 27, which carriage 20 engages and from which derives power so it can travel along cables 27. Tensioning balloon attachment frame 162 is composed of an upper ring 145 and a lower ring 146 (FIGS. 13-14) which are counter rotational, about a rotary bearing 149. Upper ring 145 and lower ring 146 are driven by a geared rotational drive system 177, and are described below.

Docking station 166 is shown in FIGS. 13 and 14. Docking station 166 has upper ring part 172 which can be rotated with respect to a lower ring part 174, parts 172 and 174 being engagable with a ring bearing 176, are driven by a geared rotational drive system 147 (also see FIG. 28 for a corresponding rotational drive system 379), which includes and is assisted by reaction force thrusters 178. Geared rotational drive systems 177 and 147 are also used to provide the opposed rotation of upper ring 145 with respect to lower ring 146 of tensioning balloon attachment frame 162, and also of upper ring part 172 and lower ring part 174 of docking station 166 mentioned above. The rotational drive systems 177 and 147 of tensioning balloon attachment frame 162 and docking station 166, respectively, are coordinated so that all components between and inclusive of, upper ring part 172 and lower ring 146 rotate together as a unit, with associated cables kept from twisting around each other. Force thrusters 178 and 148 counter wind induced rotation or rotation resulting from the rotation of a carriage 20, when the lower end of carriage 20 is held within upper ring part 172 of docking station 166, and carriage 20 is being rotated into an optimal direction for launch. Docking station 166 has two sets of three internal carriage guides 180A, 180B (FIGS. 13, 14) for entering radial recesses 130 of each carriage 20 to keep the respective carriages 20 in proper alignment and stable, while supplying electrical power to the carriage traction drives 26.

Still referring to FIGS. 13 and 14, lift ring assembly 182 is shown. Lift ring assembly 182 includes a short tubular lift ring 183 with a triangular or possibly circular cross section, and is guided by and is electrically connected to secondary cables 184 extending upwards from upper ring part 172 of docking station 166 to connect to lower ring 146 of tensioning balloon attachment frame 162. Tertiary cables 186 (FIGS. 13, 14) extend upwardly from lift ring assembly 182 to the frame of a lower hoist 198. Lift ring assembly 182 is guided by and derives electrical power from secondary cables 184 which are connected to docking station 166. Lift ring assembly 182 is supported by tertiary cables 186 which are connected to a lower hoist carrier 200 which is the frame of lower hoist 198. Referring to FIG. 14A, carriage end gripper 196 is provided with a set of four orifices 195 through which secondary cables 184 freely pass, and a pair of orifices 197 through which tertiary cables 186 freely pass. Electrical power for a carriage end gripper 196 can be provided by secondary cables 184.

Tubular lift ring 183 has a set of inwardly extending guide structure elements or internal carriage guides 188 which are engaged in the respective three recesses 130 extending longitudinally in carriage 20 for maintaining the orientation of carriage 20 in tubular lift ring 183 and supplying power to carriage 20. Lift ring assembly 182 comprises tubular lift ring 183, a carriage pivoting assembly 189 which itself includes a pair of opposing pivot pins 190 and a rotational drive system 194, lift ring guides 192 and reversible traction drives 193. Rotation drive system 194 rotates tubular lift ring 183 which is pivotable about the horizontal axis defined by pins 190. The center of gravity of tubular lift ring 183 is made to fall in its geometric center which is co-incident with the axis of pins 190. Tubular lift ring 183 has a clamping or locking mechanism 996 (shown schematically in FIGS. 13 and 14) to permit it to be releasably attached to carriage 20 in such a manner that center of gravity 36 of carriage 20 is held on the axis of pins 190. The axis of rotation of reversible variable pitch thruster 31 is made parallel to the horizontal axis defined by pins 190. Tertiary cables 186 are respectively connected to the respective lift ring guides 192. Tertiary cables 186 are provided in two groups of cables of fixed length, and are attached to lower hoist carrier 200 180.degree. apart, to connect carrier 200 to lift ring guides 192 below and assist in guiding the movement of carriage end gripper 196 (discussed below), and carries electrical power if needed.

Lift ring assembly 182 includes rotational drive system 194 to change the elevation angle indicated by the arrow P (FIG. 13) of tubular lift ring 183 and carriage 20 held thereby with respect to cables 184 and 186. Carriage end gripper 196 is also shown in FIGS. 12, 13 and 14. Carriage end gripper 196 can be supported by a lower hoist cable 201 attached to lower hoist assembly 198 mounted on lower hoist carrier 200. Lower hoist cable 201 moves in the directions indicated by the arrow Q in FIG. 14. Carriage end gripper 196 is guided in motion by secondary cables 184 which carry electrical power and are supported by tertiary cables 186. Carriage end gripper 196 is able to releasably lock to the top of a carriage 20 by means of locking pins 204 which cooperate with pin lock receptacles 32 in the upper part of carriage 20. When carriage end gripper 196 is firmly connected to carriage 20, carriage end gripper 196 is able to lift or assist in lifting carriage 20 from docking station 166 and up through lift ring assembly 182 until center of gravity 36 of carriage 20 coincides with the horizontal pivot axis of lift ring assembly 182 defined by pins 190 when lift ring assembly 182 is lowered into contact with upper ring part 172 of docking station 166. The length of cables 186, which guides the motion of end gripper 196 must be long enough to permit carriage 20 to rotate about the horizontal axis when end gripper 196 detaches from carriage 20 and is lifted a short distance out of engagement with docking assembly 166.

Lower hoist assembly 198 is fixed to the lower end of lower hoist carrier 200 as noted above, and also as noted above is used for lifting or assisting the traction drives 26 of carriage 20 in moving carriage 20 into and out of engagement with tubular lift ring 183. Lower hoist carrier 200 is raised and lowered as indicated by arrow R on hoist cables 202 from upper hoist 168 attached to tensioning balloon attachment frame 162 shown in FIGS. 12, 13, and 14. Power is provided to hoist 169 through secondary cables 184. Either three-phase current or direct current can be used to power hoist 169. In the three-phase current system as shown, the group of four secondary cables 184, further identified (FIG. 14) from left to right as cable 184A is phase one of three, cable 184B is phase two of three, cable 184C is phase three of three and 184D which may be used as an electrical neutral or as a duplicate of phase one of three. Also as noted earlier, lighter-than-air balloons 160 support the upper components of rocket launching system 1 and provide a significant portion of the tension required to keep primary cables 27 and secondary cables 184 in tension so as to make them taut, even with operational loads. As shown in FIGS. 12, 13 and 14, tensioning balloon attachment frame 162 is disposed beneath lighter-than-air or tensioning balloons 160.

Figure 20A:
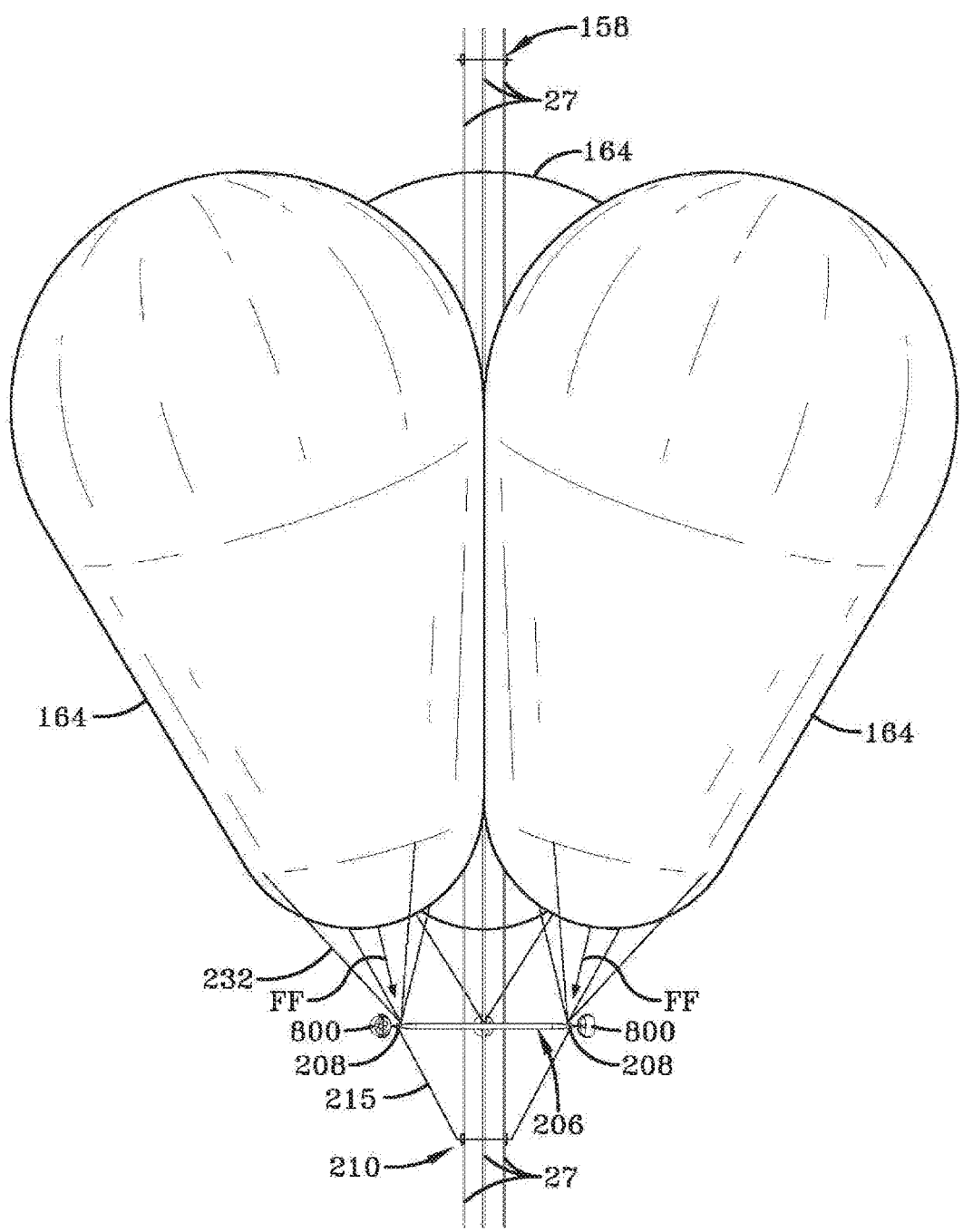
FIGS. 20A and 20B are side views of two of many sets of lighter-than-air balloons attached to a cable assembly according to preferred forms of the invention.
Figure 20B:
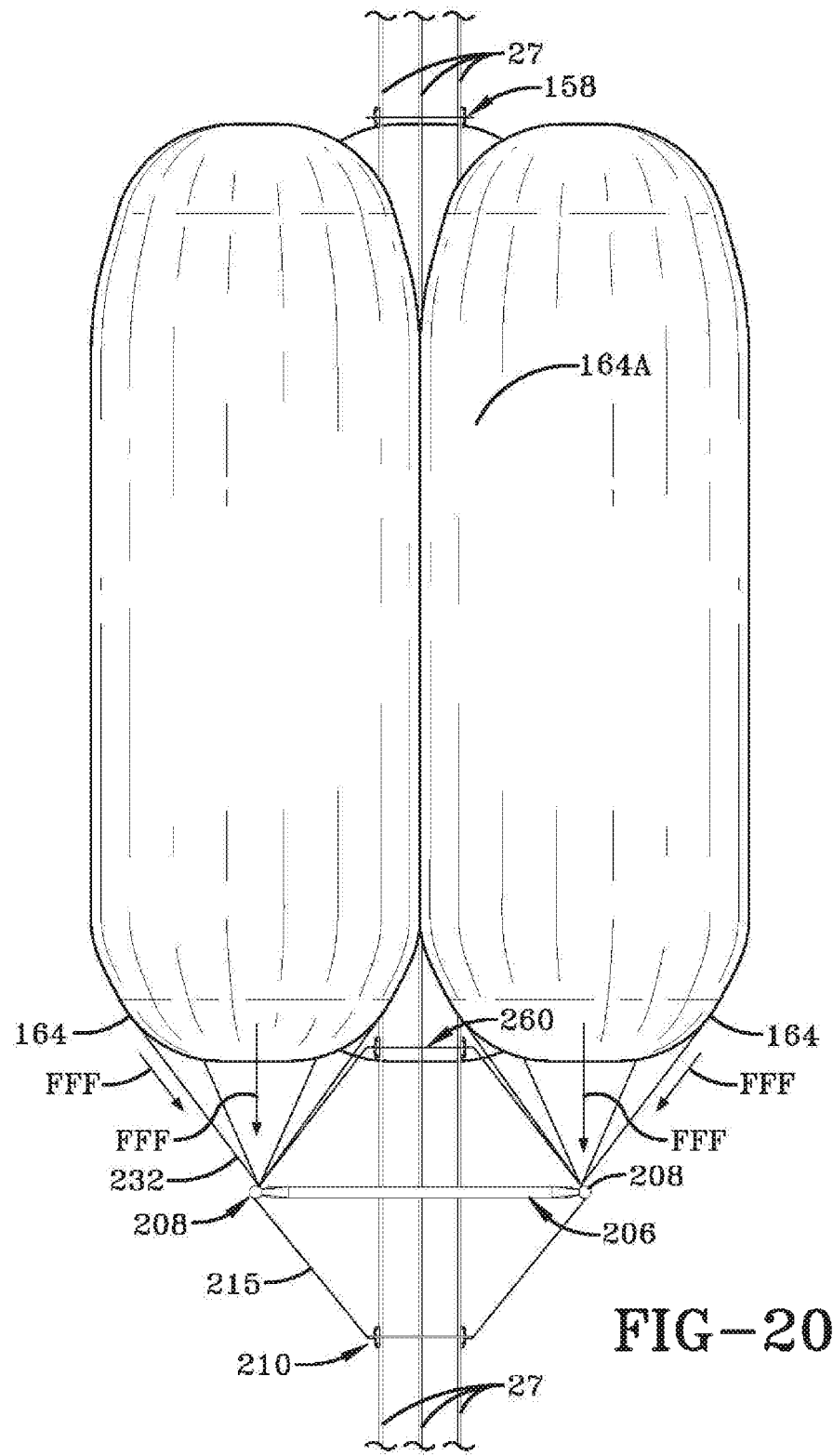

Referring to FIGS. 1, 1B, 11, 15, 16, 17, 20A and 20B, these figures show a number of groups of smaller lighter-than-air balloons 164 or 164A used to relieve the self weight of cables 27 and associated support structures and spacer assemblies are shown. Balloons 164 are tapered and balloons 164A are cylindrical, although other shapes and configurations are possible and fall within the scope of the invention. Each of a number of large harnesses 206 having tensioning balloon holders 208 is attached to primary cables 27 by means of a three-sided lower spacer or stabilizer assembly 210. Each lower spacer assembly 210 is constructed and attached to primary cables 27 in the same manner as spacers 158 were constructed and employed as described earlier. Balloons 164 or 164A are respectively connected to balloon holders or attachment points 208 (FIG. 18). Lower spacer assembly 210 has three arms 211 forming an equilateral triangle as viewed in plan, arms 211 being parallel to respective arms 222 of large harness 206. Lower spacer assembly 210 has a connecting structure 214 at the respective intersections of arms 211, from which leads 215 extend. Each lead 215 from lower spacer assembly 210 extends for attachment to the respective balloon holders 208 of large harness 206. There are also provided a number of upper spacer or stabilizer assemblies 216 which, like spacer assemblies 210, separate primary cables 27 and further hold in place cable ties 218 and 219. Upper spacer assemblies are constructed and employed as are spacer assemblies 158 and lower spacer assemblies 210. Each upper stabilizer 216 has three arms 217 forming together in a plan view, an equilateral triangle, arms 217 being parallel to respective arms 222. A cable connector 220 is at the intersection of the respective arms 217. Pairs of stabilizing ties 218 are connected at one end to a cable connector 220 at opposite ends of arms 217 and to tie holders 221 at the midpoint of arms 222 parallel to respective arms 217. Another set of cable leads 219 is connected between tie connectors 220 and balloon holders 208. This arrangement assists in holding harness 206 stably in place. Harnesses 206 are installed periodically with balloons 164 and 164A, respectively, along the length of primary cables 27 to compensate for the self weight of cables 27 and any attached structures, and to induce tension in the cables to assist in keeping them upright. Considering balloons 164, these are shown in FIGS. 11 and 20A, and have generally an upper spherical cap, a lower spherical cap (but inverted) with a smaller diameter than the upper spherical cap, and tapered sides connecting the upper spherical cap and the lower spherical cap. The lower portion could have a basically zero diameter, which is more typical of lighter-than-air balloons. This type of balloon can be referred to herein as conical balloons. Referring to balloons 164A shown in FIG. 20B, these each comprise an upper spherical cap, a lower spherical cap (but inverted) with the caps having equal diameters. The upper and lower caps are connected by cylindrical sides. This type of balloon can be referred to herein as cylindrical balloons. Considering tensioning balloons 160 as in FIGS. 12 and 28, these balloons have upper spherical caps and conical sides terminating at their lowest portion at essentially a point. These are also conical balloons.

A specific assembly for connecting the various components of upper spacer 216 is as follows. Upper spacer assembly 216 and the items connected to them are shown in FIGS. 15A, 15B and 15C. As noted above, upper spacer 216 is composed of three arms 217 forming an equilateral triangle. Referring to FIGS. 15B and 15C, cable connector 220 comprises a base plate 902 having a central arm 904 and two arms 906 and 908 separated from central arm 904 by an angle exceeding 90.degree. Cable connector 220 further has a support portion 910 which is generally opposite arm 904. Base plate 902 is advantageously flat, and extending perpendicularly thereto is a cable connecting flange 912 which extends along the middle of support portion 910. A pair of arm support flanges 914 and 916 also extends perpendicularly from base plate 902 and are equiangularly spaced from cable connecting flange 912. Arms 904, 906 and 908 have lug-receiving holes 920, 918 and 922 respectively, extending perpendicularly through the respective arms 904, 906 and 908. Cable connecting flange 912 has a series of equally spaced, lug-receiving holes 924 extending along the height of flange 912.

Each cable 27 has at least one, and more likely many, connecting structures 925, each connecting structure 925 being composed of pairs of parallel, opposing, spaced flange-receiving connecting flanges 926, 927 which are parallel to the respective axes of cables 27. Flange 926 has parallel aligned columns of lug-receiving holes 928 and 930, which are aligned with corresponding holes 928, 930 on the other flange 927. In order to attach each cable connector 220 to a position on a respective cable 27, cable connecting flange 912 is inserted between flange-receiving connecting flanges 926, 927 with holes 924 in alignment with each of the respective holes 928. A set of lugs 932 is inserted into the respective aligned holes 928 and 924 and attached to a nut or other fastener receiver 933. To further connect respective cable connectors 220 to respective cables 27, similar bolts 256 as shown in FIG. 22 are used to clamp loops 244 of cable 27. Flange-receiving connecting flanges 926, 927 are close enough to each other to enable traction drives 26 to engage respective cables 27 as carriages 20 with traction drives 26 pass flanges 926 and 927 in full operative engagement with respective cables 27.

As noted earlier, pairs of stabilizing ties 218 connect cable connector 220 to respective midpoints of a pair of arms 222 of large harness 206. Each stabilizing tie 218 has at one end a connecting yoke 934 with a pair of parallel flanges 936 with aligned holes 938 through which extends a lug 940 which also passes through hole 908 for subsequent reception by a nut or other fastener receiver 942 to connect stabilizing tie 218 to cable connector 220. Similarly, cable tie 219 has a coupling yoke 944 with a pair of parallel flanges 946 with a pair of aligned holes 948. Arm 904 is inserted between flanges 946, and a lug 950 is inserted in holes 948 and 920, and into a nut or other fastener receiver 952.

Figure 15D:
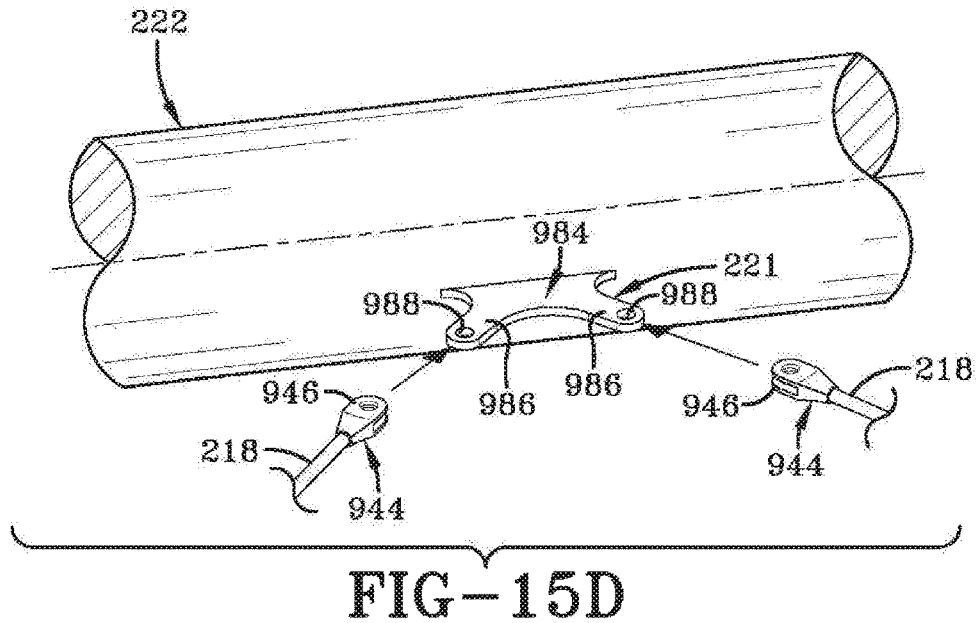
FIG. 15D is an enlarged perspective view of cable attaching structure for the middle of a spacing assembly arm.
Figure 15E:
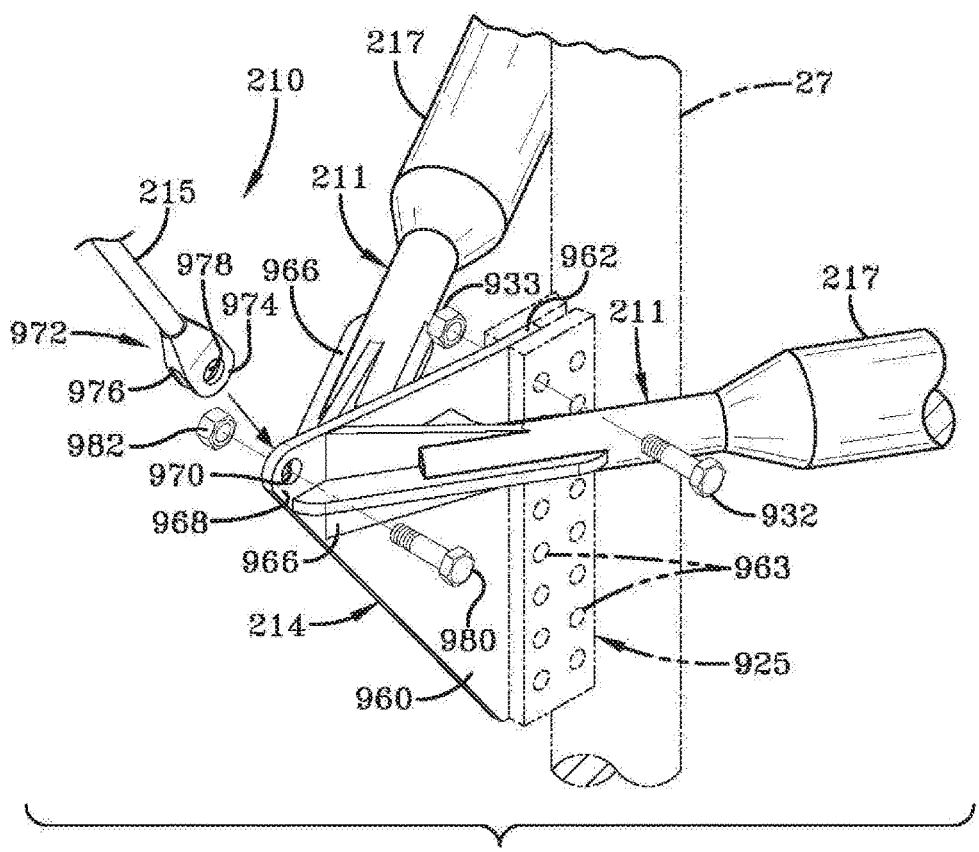
FIG. 15E is an exploded perspective view of the connection of a lower spacer to a cable and to a large harness.
Figure 16:
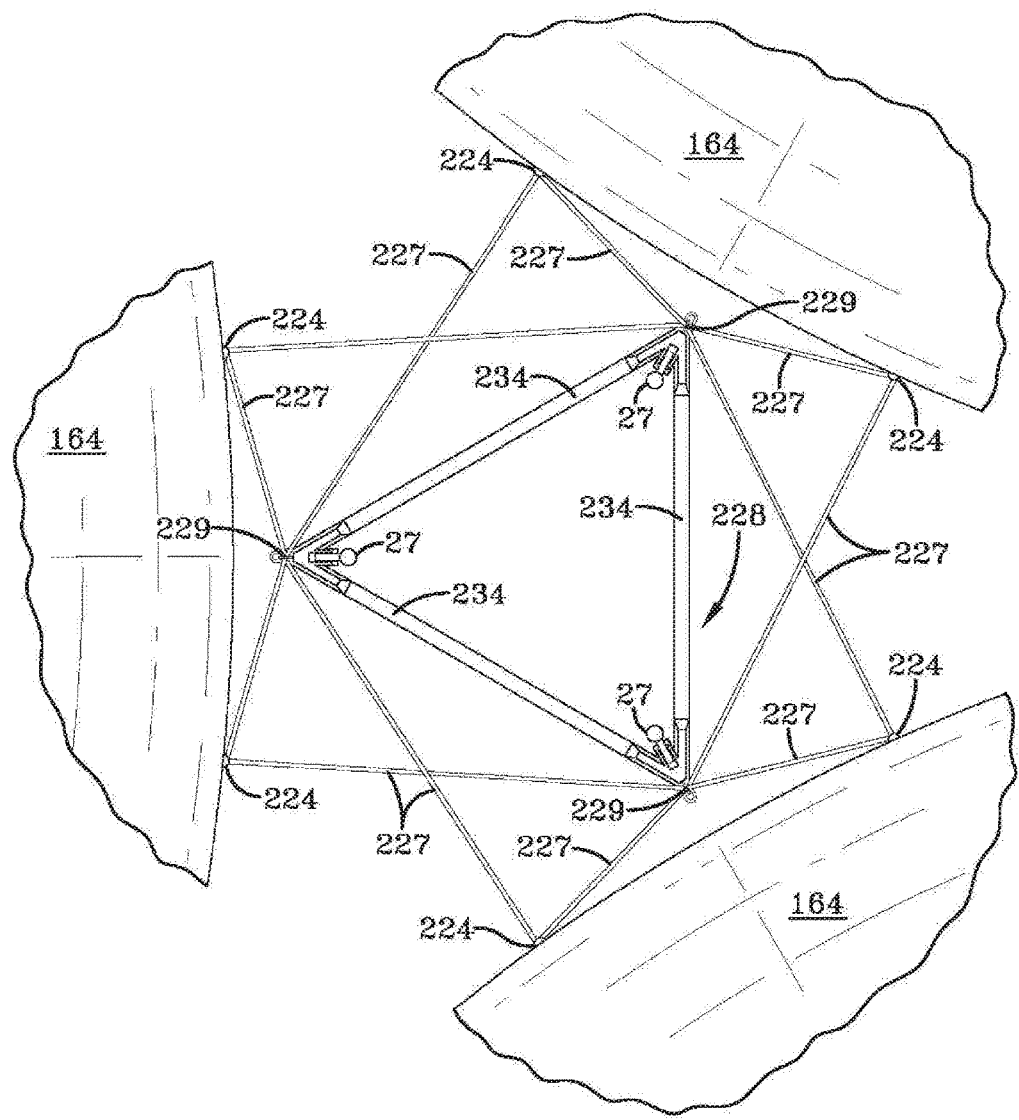
FIG. 16 is a detailed schematic plan view of part of the stabilizing portion of the preferred form invention, taken in the direction 16-16 in FIG. 15.

FIG. 15E shows a detail of the connection of lower spacer assembly 210 (FIG. 15) to cables 27 and to large harness 206 by means of connecting structure 214. The pair of connecting structures 925 is affixed to cable 27 by engaging loops 244. Connecting structure 925 is composed of a vertical flange 960 having a connecting flange 962 extending therefrom and including a column of lug holes 963. A set of arm support flanges 966 extends from vertical flange 960 to which they are welded by an appropriate welding procedure, and are respectively connected to respective arms 217 of lower spacer assembly by an appropriate welding or other procedure. Arm support flanges 966 are angled from each other and angled where they engage respective arms 217 to provide a structurally strong support. Connecting flange 962 is placed between the parallel flanges of connecting structure 925 with the holes being aligned with holes 928 (see FIG. 15B) and lugs 932 and inserted through respective aligned holes of connecting flange 962 and holes 928 and through nuts or other fastener receiver 933 (see FIG. 15A) to secure connecting structure to cable 27.

Vertical flange 960 has a finger portion 968 through which extends a hole 970. The end of each lead 215 for attaching lower spacer assembly 210 to large harness 206 has a coupling yoke 972 composed of parallel flanges 974, 976 through which extend aligned lug-receiving holes 978. Yoke 972 is moved so that finger portion 968 is inserted between flanges 974 and 976 with holes 970 and 978 being aligned. A lug 980 is inserted through holes 970 and 978, and into a nut or other fastener-receiving means 982.

It was mentioned earlier that stabilizing ties 218 were connected to the midpoint of arms 222. Apparatus for doing this is shown in FIG. 15D. A tie-connecting flange 984 is attached to and extends from the midpoint of each of arms 222. Flange 984 has two short arms 986, each having a lug-receiving hole 988. Each tie 218 has connecting yoke 944 with flanges 946 as discussed above. Yokes 944 from each tie 218 are slipped over an appropriate arm 986 of flange 984, and a lug is inserted through holes 948 and 988 and tightened in place with a fastener such as with a nut.

Structure for attaching each of the harnesses, spacers and stabilizers is preferably composed of the same type of components and subcomponents. This type of structure is strong, stable, easy to fabricate and put into use.

A number of three-sided upper spacer or stabilizer assemblies 260, virtually identical to spacer assemblies 210, are located above large harness 206 (as shown in FIG. 18). The detailed construction of spacer assemblies 260, and how it is attached to primary cables 27, is virtually the same as spacer assemblies 158 and lower spacer assemblies 210. Spacer assemblies 260, as shown in FIG. 18, is attached to cables 27 by means of connecting structures 262 at the intersection of pairs of connected arms of the three arms 264 which form an equilateral triangle. A set of lightweight cables 266 (as compared to relatively heavy weight cables 27), extend from connecting structure 262 to balloon holders 208, which are constructed to hold them to large harness 206. Lightweight cables 266 support large harness 206 during assembly of the launch system or during maintenance of balloons 164.

Figure 18:
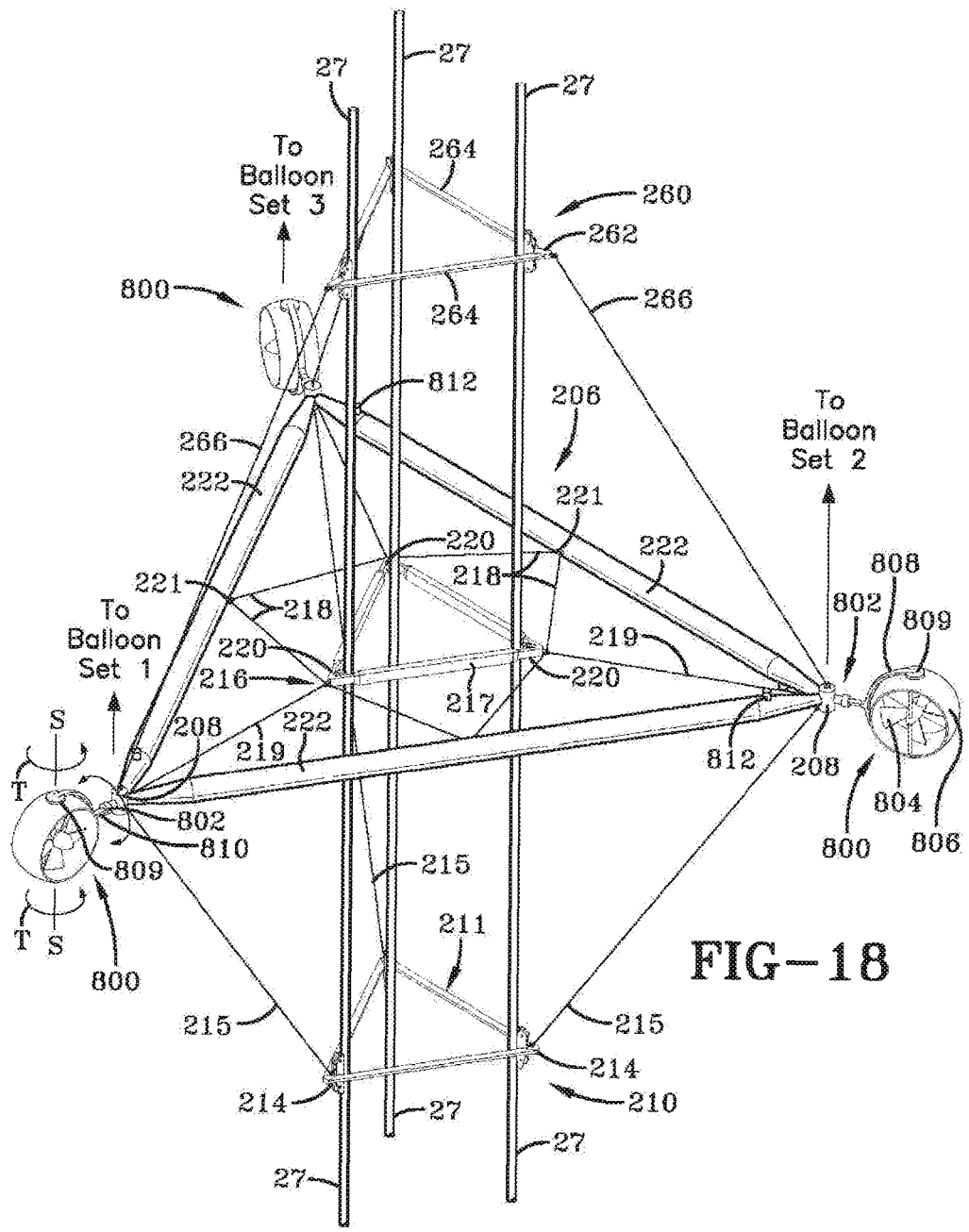
FIG. 18 is a perspective schematic view of a stabilizing assembly with thrusters according to the preferred embodiment of the invention.
Figure 19:
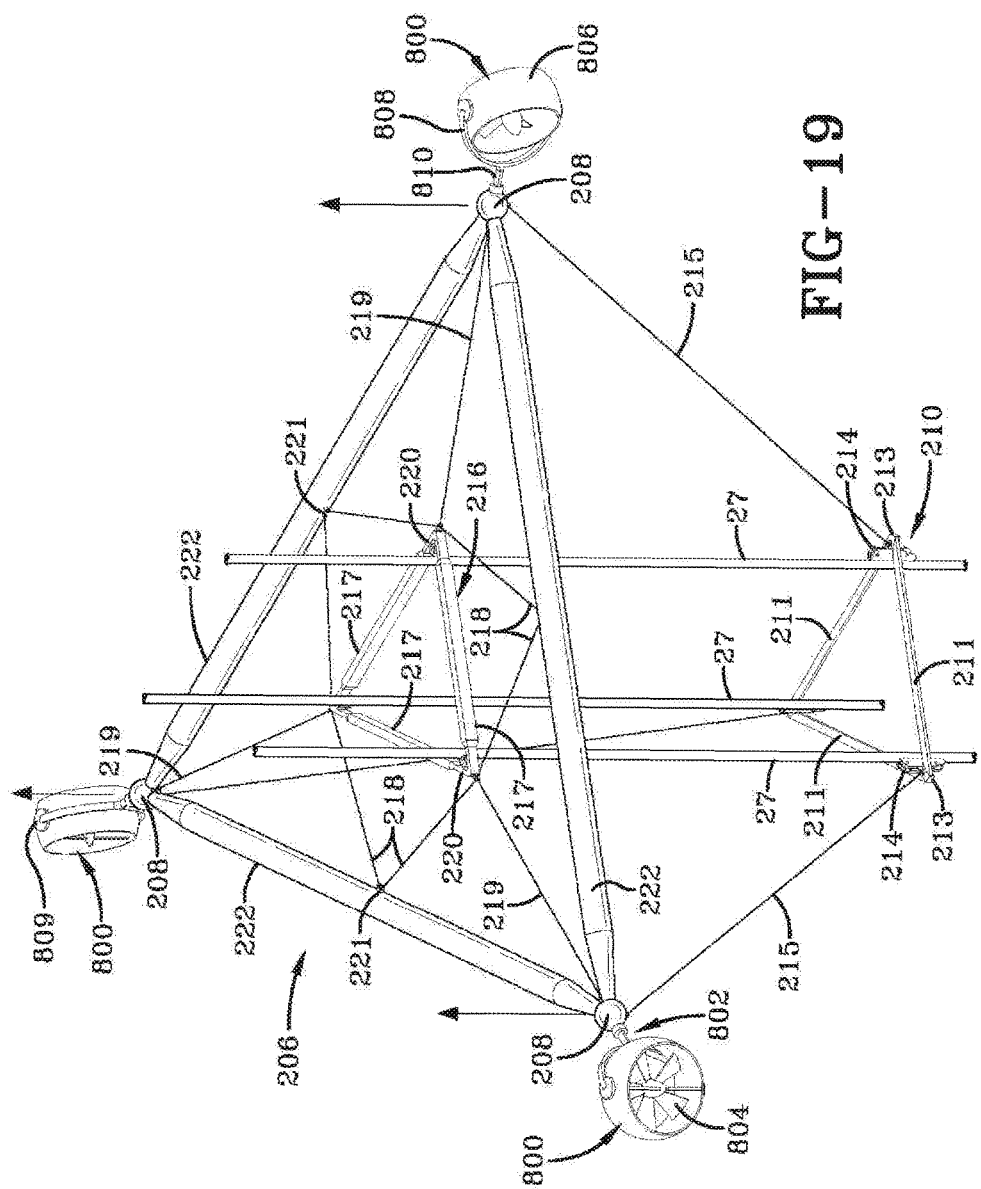
FIG. 19 is a perspective view of a cable stabilizing device according to a preferred form of the invention.

A set of three electric reaction thrusters 800 are respectively attached to rotatable support joints 802 at the intersection of respective arms 222, as depicted in FIGS. 18 and 19. Each thruster 800 comprises a fan 804 which are each mounted in a fan housing 806. Each housing 806 is pivotably mounted between a pair of arms 808. Each arm 808 has coaxial pivot pins 809 extending into housing 806, enabling each housing 806 to pivot about an axis S-S in the direction of the arrows T both clockwise and counter clockwise. Arms 808 branch from a central arm 810, which is attached to rotatable support joints 802 as discussed above. Thrusters 800 are gimballed electric thrusters. Thrusters 800 are pivotable and rotatable, and are operated to hold the launch system 1 oriented with respect to the vertical as required. Thrusters 800 compensate for wind forces and for the partial or total deflation of any balloons 164 until they can be replaced or otherwise maintained. The position of large harnesses 206 with respect to the base of launch system 1 is controlled by position sensors 812, which could be a global positioning system (GPS) for supplying position reference data to the computers controlling the direction and force of thrusters 800.

The following is an explanation of the matter in which balloons 164 (which would apply to balloons 164A) are attached to the primary cables 27 is shown with respect to FIGS. 15, 16, 17, 18, 20A and 20B. Spacer assembly 260, together with lightweight cables 266 shown in FIG. 18, located above upper stabilizer 216, has been omitted for clarity in FIG. 15. Viewing FIG. 15 first, a portion of primary cables 27 is shown, with lower stabilizer 210 and upper stabilizer 216 being provided to stabilize upper harness 206. Three balloons 164 (only one of which is shown in solid lines in FIG. 15) are provided for offsetting the self weight of cable 27, various stabilizers, and any excess loads applied to cables 27. Depending on their diameter, balloons 164 may require tubular separators made of the same material as the balloons and inflated with the same lighter-than-air gas. In order to keep cables 27 from touching balloons 164 (or balloons 164A), stabilizing straps or webbing 227 (FIG. 15A) are provided for attaching balloons 164 to cable separators such as upper spacer assembly 260 (FIG. 18) to prevent such contact. Each stabilizing strap 227 is part of a stabilizer 228 which is connected to each of cables 27 in the same manner that other stabilizers are attached to cables 27. Stabilizers 228 further have a connecting member 229 for holding the respective stabilizing straps 227 in place. The manner in which the foregoing is done can be seen in greater detail in FIG. 16, which is a top view taken in the direction 16-16 in FIG. 15. It can be seen that each stabilizer 228 is attached to primary cables 27 within the three intersections of stabilizer 228. Stabilizer 228 is composed of three respective arms 234, which collectively intersect to form an equilateral triangle. From each connecting member 229, a pair of stabilizing straps 227 forms an angle so that the respective pairs contact the respective balloons 164, to which they are nearly tangential. Straps 227 are each attached to a balloon 164 by a tangential strap connection 224. Strap connections 224 prevent cables 27 from contacting balloons 164 (or balloons 164A). Strap connections 224 (FIG. 15) can advantageously be an appropriate adhesive, plastic welding or stitching with an adequately strong thread, for connecting stabilizing straps 227 to respective balloons 164 (or balloons 164A).

Figure 17:
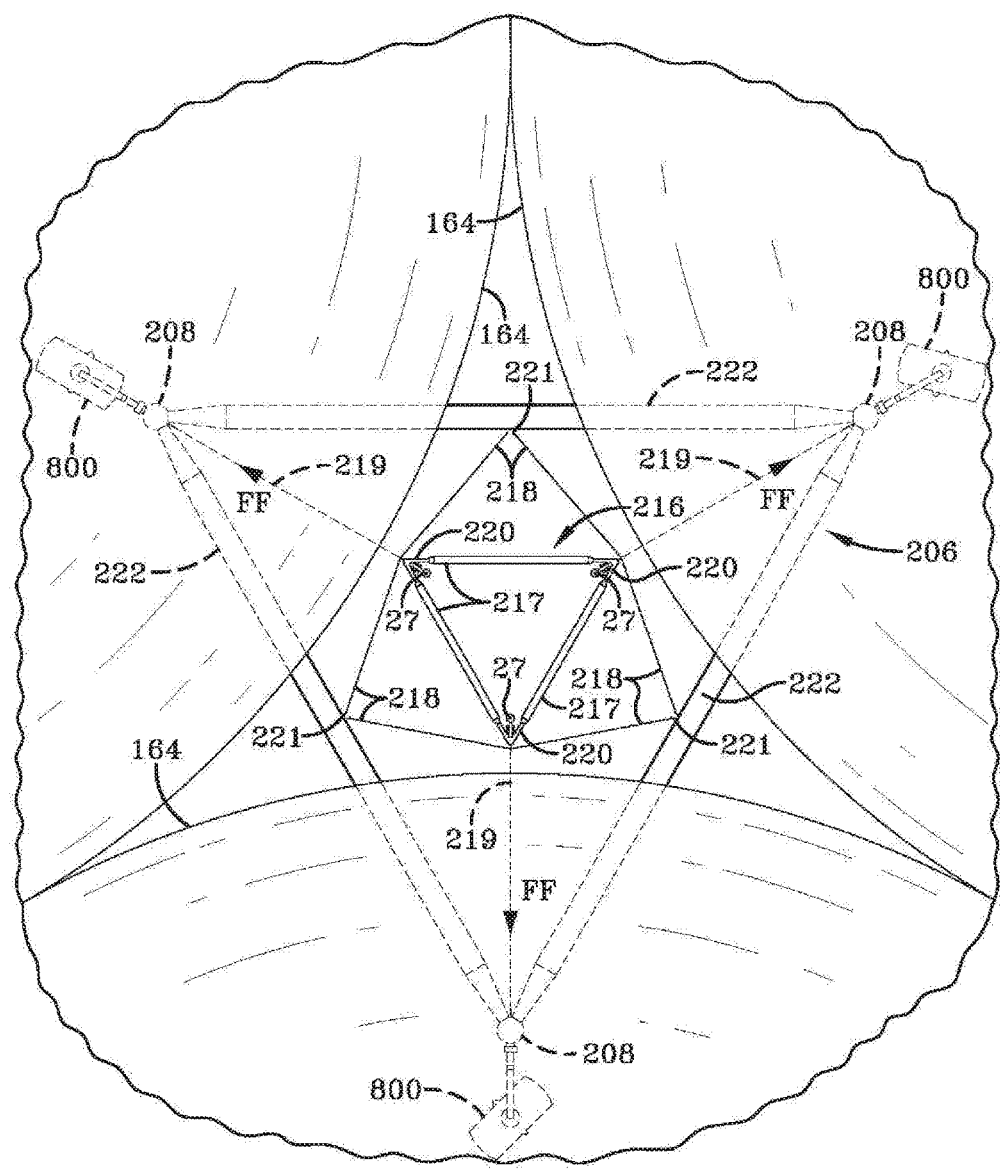
FIG. 17 is another detailed view of part of the stabilizing part of the preferred embodiment of the invention, taken in the direction 17-17 in FIG. 15, showing certain force vectors.

FIG. 17 shows three balloons 164 attached to large harness 206 at balloon holders 208. Upper stabilizer assembly 216 is shown having its stabilizing cable ties 218 connected to tie holders 221 on arms 222. Force vectors FF are shown in FIG. 17 extending along tensioning cable 219, showing tension forces extending from cable connectors 220 to balloon holders 208.

A side view of the attachment system is shown in FIGS. 20A and 20B. Each balloon 164 (FIG. 20A) and 164A (FIG. 20B) has light, strong, tension basal connectors 232 connected to a balloon holder 208 of large harness 206. One or more of connectors 232 may be tubular to carry replacement lighter-than-air gas into each balloon 164 to compensate for leakage. Balloons 164 and 164A are lighter-than-air balloons, so the tensile forces FF are as shown by the arrows along connectors 232. Connectors 232 are tangent to the skin of each balloon 164 and 164A. A set of three or more connectors or stabilizers 228 (FIG. 16) are shown for connecting the respective balloons together at several points.

As explained earlier, tensioning balloons attachment frame 162 has upper rotating part 145 and lower rotating part 146 (FIGS. 13, 14), which are connected through ring bearing 149 on the vertical axis for reducing the friction from the rotational movement as depicted in FIG. 12. Reaction force thrusters 148 are tangentially attached to the periphery of upper rotating part 145. Similarly, reaction force thrusters 178 are attached to the periphery of lower part 174 of docking station 166. The propulsive units mounted on upper rotating part 145 and those mounted on part 174 are used to maintain them non-rotatable. The propulsion units on upper part 145, in conjunction with geared rotational drive system 177, assist the rotation of the lower rotating part 146 relative to upper rotating part 145. Similarly, the propulsive units on lower part 174, in conjunction with geared rotational drive system 147 (FIGS. 13, 14), assist the rotation of the upper rotating part 172. Secondary cables 184 collected in two groups are attached opposite each other (180.degree. apart) on lower rotating part 146. Upper hoist 169 is attached to lower rotating part 146. Cables 184 connect balloon attachment frame 162 to docking station 166 (FIGS. 13, 14) and carry electrical power as needed. Cables 184 also guide movement of lower hoist carrier 200, carriage end gripper 196 and lift ring assembly 182. Cables 184 are long enough to safely allow a period of downward acceleration at the local acceleration due to gravity of lower hoist carrier 200 and items suspended therefrom, sufficiently long for a rocket 18 to be disconnected from its restraint while in freefall conditions and boosted clear of carriage 20. An additional length of cables 184 to allow an additional period of time is also required for the deceleration for the rest of lower hoist carrier 200 and all items (including loaded or empty carriage 20) suspended therefrom. An additional length of cable would permit deceleration of a completely loaded carriage 20 to rest in the event of a short duration booster misfire.

As explained above and further discussed below, a means is required for securing items of system 1 to the various cables. FIG. 21 shows a cable 240 made of strands 242 of wire. Each strand 242 of cable 240 can have looped-out portions or loops 244 extending from the outer surface of the body of cable 240 for securing items to cable 240, while leaving the majority of the cable's outer surface unobstructed. Each loop 244 extends out from the body of each cable 240 and returns into the body of cable 240. For example, adaptive connector 247 is shown in FIG. 22 as discussed in detail hereafter. Adaptive connector 247 has an outstanding flange 248 having a series of bolt holes 249 and a further series of bolt holes 250 extending through a pair of parallel walls 252 extending in parallel form from a common base 253. Adaptive connector 247 can be urged against cable 27, with loops 244 slid between parallel walls 252 and their respective loop holes 254 in alignment with holes 250. A bolt 256 can be extended through loop holes 254 and bolt holes 250 to secure adaptive connector 247 to cable 27 and a nut can be put on respective bolts 256 to effect a firm connection. A top view is shown in FIG. 23. Alternatively, parallel walls 255 separated by a spacer 259 as an alternative adaptive connector 257 can be used, as shown in the top view of FIG. 24. Cable 27 can be gripped by a pair of traction drive wheels 26A of carriages 20 as shown in FIG. 25, rotating in opposite directions $O_1$ and $O_2$.

In order to use the rocket launch system 1 described thus far, rockets 18 are loaded in carriages 20, respectively in one of the apparatus as shown in FIG. 5, and transported along pathway 15 with a lateral conveying device 46. Lateral conveying device 46 is secured to elevating assembly 60 using the respective tapered alignment pins 142 and fractional rotation twist lock pins 144 and their respective cooperating alignment pin sockets 152 and fractional rotation twist lock pin sockets 154, as explained with respect to FIG. 9. Secondary cables 184 and primary cables 27 are held taut by means of tensioning balloons 160 and balloons 164, respectively, with balloons 164 contributing to the tension in primary cables 27. Tension to the cables below is transferred via tensioning balloons attachment frame 162 and cable separation and further tension is achieved via large harnesses 206, spacers 158 and spacer 228 (FIGS. 11, 15 and 18).

Each carriage 20 is rotated into alignment with internal carriage guides 133 and loaded into lower guide tube 124 (FIG. 8). The upper part of lower guide tube 124 is then tipped into engagement with the lower part of secondary guide structure 125 (FIG. 10) until lower guide tube 124 engages stop 132 to align carriage guides 133 and 138 as discussed earlier. The traction drives 26 are then used to drive carriage 20 up cable 27 through docking station 166 into its upper part 172 and partially into lift ring assembly 182, which is lowered by use of hoist 168 so that lift ring assembly 182 engages with upper part 172 of docking station 166 (FIGS. 13, 14). End gripper 196 is lowered and properly attached to the upper end of carriage 20. Lower hoist 198, powered by current in secondary cables 184 transferred from cables 27, lifts carriage 20 further into engagement with lift ring assembly 182 such that the combined centers of gravity of lift ring assembly 182, carriage 20 and rocket 18 coincide with the pivot axis of lift ring assembly 182. Lower hoist 198 thus assists traction drives 26 which engage internal carriage guides 180A and 180B in lifting carriage 20 upwardly relative to docking station 166. Then carriage end gripper 196 disengages locking pins 204 from pin lock sockets 32 of carriage 20 and is lifted minimally clear by use of lower hoist assembly 198. Lift ring assembly 182 is guided by secondary cables 184 and supported by tertiary cables 186. Hoist 169 lifts carriage 20 further until the lower end of carriage 20 is no longer within the lower part 174 of docking station 166 and is only within upper part 172. Geared rotational drive system 147 within lower docking station 166 and geared rotational drive system 177 with tensioning balloon frame 162 now rotate all components in a coordinated manner between ring bearings 176 and 149 into a direction suitable for launching rocket 18. Thrusters 148 and 178 operate simultaneously to keep the lower part 174 of docking station 166 and upper ring 145 of tensioning balloons attachment frame 162 from rotating (FIG. 14).

Hoist 169 next lifts carriage 20 entirely out of engagement with docking station 166 (carriage 20 holding rocket 18 must be lifted higher and higher according to their combined weight) and as high as required into the middle of short tubular ring 183 for the safe launch of rocket 18. Rotational drive system 194, in coordination with reversible variable pitch thrusters 31 extended 90.degree., rotates short tubular ring 183 with carriage 20 into an appropriate angle with respect to the horizontal suitable for launch. Reversible variable pitch thrusters 31 are being used to assist rotary drive system 194 and to prevent carriage 20 from oscillating about the horizontal axis through pins 190. When carriage 20 is at the desired elevation angle for launch and stable, reversible variable pitch thrusters 31 are rotated further about their hinges to avoid contact with hot rocket gases.

Variations are possible to assist rotary drive system 194. This includes the positioning and stabilizing of carriage 20 in lift ring assembly 182, and in particular to prevent the oscillation of carriage 20 about pivot pins 190. Referring to FIGS. 13B-13C, there can be provided at both ends of carriage 20 reversible variable pitch thruster 31 and a pair of accompanying hub motors 822. Each thruster 31 and hub motor 822 can be housed in one end of carriage 20 beneath an end cover 830. Each thruster 31 has a set of rotatable blades 826 that are mounted in a pivotable thruster mounting 828 at both ends of carriage 20. Each mounting 828 is mounted on a hinge assembly 829 and is movable between a rest position (shown in dotted lines in FIG. 13C and an active position parallel with the longitudinal axis of carriage 20 (shown in FIG. 13C in solid lines) by means of a hydraulic actuator 832, which pivots about an actuator pivot 834. When thrusters 31 are in their active position, an airstream is created as shown by arrows U. This prevents oscillation of carriage 20. Hub motors 822 are reversible since the airstream can go in both directions. Likewise, the pitch of blades 826 is variable to vary with variance of the ambient air in which blades 826 are rotating. However, when the engine of rocket 18 ignites, thrusters 31 can be moved at an obtuse angle as shown in dotted lines at the left-hand part of FIG. 13C to avoid the short duration booster exhaust. The upper end of thruster 31 is also moved to its obtuse position to enable the loading of a rocket 18 into carriage 20. It should be noted that the inside of carriage 20 has continuous heat-and-pressure resistant tube 836 running from end-to-end to contain a rocket 18 therein. A set of three or more centering supports 840 maintain the centering of each reversible, variable pitch thruster 31.

The upper end of hoist cable 202 (FIG. 14) is fed out from upper hoist 168 and reversible traction drives 193 of lift ring assembly 182 begin to drive downwards, while in operative engagement with secondary cables 184. Hoist cable 202 unreels and moves lift ring assembly 182, carriage 20, rocket 18 and all other components supported by cable 202 downwards assisted by drives 193 to overcome friction and air resistance, so that they are in freefall at an acceleration of 1 g, and rocket 18 becomes weightless with respect to carriage 20. There is a slight friction maintained in upper hoist 168 to maintain control during freefall, and to avoid any slack and any uncontrolled unwinding of cable 202. Prior to freefall, retractable end covers 30 (FIGS. 9, 9C, 13, 13A) of carriage 20 are opened (or end covers 830 shown in FIG. 13C are opened). Retractable arms 34 or 35 (FIG. 26) inside of carriage 20, which had been holding rocket 18 in carriage 20, are retracted (as discussed below), and the short duration booster rocket motor of rocket 18 is ignited to drive rocket 18 out of carriage 20. The short duration booster rocket motor only operates within the heat and pressure resistant confines of carriage 20 to prevent damage to launching system 1.

After rocket 18 has travelled sufficiently far on its ballistic path, its main motors can be safely ignited as required to avoid damage to launching system 1. The feeding out of the cables 202 from upper hoist 168 (FIG. 12) is gradually stopped while reversible traction drives 193 of lift ring assembly 182 (FIG. 13) are operated in a braking mode to prevent the further freefalling of carriage 20, lower hoist carrier 200, carriage end gripper 196 and lift ring assembly 182 (FIGS. 12, 13, 14). Reversible variable pitch thrusters 31 (FIG. 13C) may then be used to assist the rotation of carriage 20 into a vertical position before they are retracted into the ends of carriage 20 and may be used to purge any exhaust gases from the interior of said carriage before closing the weather covers 30.

Short tubular ring 183, of lift ring assembly 182 with empty carriage 20, having been rotated into the vertical position (in preparation for rotation about the vertical axis, since the rotational moment of inertia is lowest when carriage 20 is in the vertical position), is then and lowered by means of upper hoist 168 in engagement with upper part 172 of docking station 166, shown in FIGS. 13 and 14. Carriage 20 and carriage end gripper 196 may then be brought together to lock carriage 20 to carriage end gripper 196 before carriage 20 is lowered into engagement with upper part 172 if additional support or guidance is needed.

The lower end of carriage 20 is then lowered into engagement with upper part 172 of docking station 166. Lower part 146 (FIG. 14) of tensioning balloons attachment frame 162 and upper part 172 of docking station 166 are next rotated so that the internal carriage guides 188 of lift ring assembly 182 (FIG. 13, 14) and internal carriage guides 180 of upper part 172 come into alignment with cables 27 of docking station 166 (FIG. 13). Hoist 168 then lowers carriage end gripper 196 to the top of lift ring assembly 182 (FIGS. 12, 13, 14) and releases carriage 20. Lift ring assembly 182 also disengages from carriage 20.

Carriage 20 quickly drives down the cableway path 170 (FIG. 11) formed by primary cables 27 using regenerative braking to keep the downward speed of carriage 20 to a manageable level. The power returned to primary cables 27 in this and other launching stations is transferred to another launch system to supplement or replace the power required for the elevation of another carriage 20 up its cableway path 170. A minimum group of four active launch systems is envisaged with a fifth acting as a ready spare used for light duties such as tourism or high altitude skydiving utilizing special lightweight carriages until an active launcher requires maintenance or a higher net rocket launcher rate is needed. A combined launch rate of once per hour is believed to be feasible.

After empty carriage 20 re-enters secondary guide structure 125 (FIGS. 1A, 2, 8, 10 and 11), it is further lowered until carriage 20 disengages from secondary guide structure 125 and becomes centered in lower guide tube 124 at the point where the combined centers of gravity of carriage 20 and lower guide tube 124 coincide with the rotational axis of lower guide tube 124. Lower guide tube 124 is then returned to the vertical position and carriage 20 is lowered onto an appropriately aligned lateral carrying device 46 atop elevating assembly 60. Lateral conveying device 46 returns empty carriage 20 to blast resistant assembly bay 10 for reloading or to storage racks 7 for replacement and refurbishing. Another pre-assembled rocket 18, carriage 20 and lateral carrying device 46 can be loaded into system 1, and the next rocket 18 launched as described above.

Figure 26:
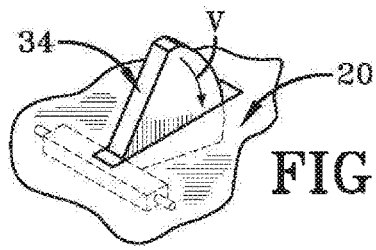
FIG. 26 is a perspective view of a retractable arm assembly, according to a preferred embodiment of the invention.

One possible construction of a retractable arm is retractable arm 34 in the direction of arrow V for holding rocket 18 in carriage 20 as shown in FIG. 26. Rocket 18 has at least six equally spaced adjustable slots 300 for receiving retractable arms 34, there being one arm 34 for each slot 300.

Figure 27:
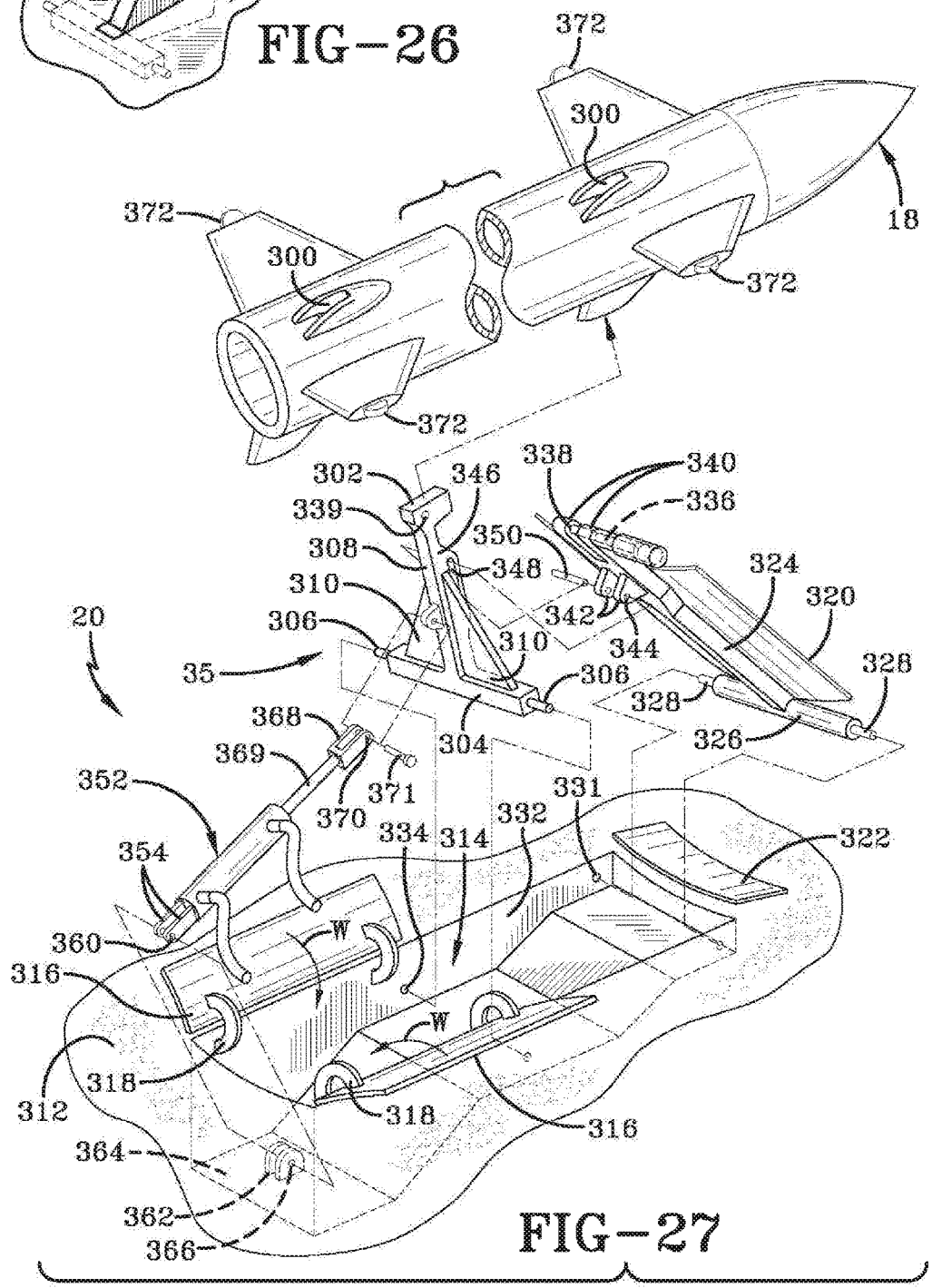
FIG. 27 is a detail showing a retractable arm assembly for holding a rocket in a carriage according to the preferred embodiment of the invention.

Referring next to FIG. 27, alternate, different retractable arms 35 may be provided. Each retractable arm 35 has a head member 302 for entering one of slots 300, and a base member 304 from which extend opposing, coaxial pivot pins 306. A stem 308 interconnects head member 302 and base member 304, and strengthening webs or braces 310 extend between base member 304 and stem 308. Carriage 20 has an interior, blast resistant tube 312 having a cavity 314. Tube 312 has a pair of protecting doors 316 mounted on hinges 318 which can be positioned to close part of cavity 314 (as indicated by the arrows W) or pivot outwardly to open part of cavity 314 as shown in FIG. 27. Tube 312 also has a cavity-covering end door 320. Door 320 may have an airflow deflector 322 for protecting doors 316, 320 and cavity 314, a reinforcing spine tension member 324 and a pin holder 326 holding coaxial pivot pins 328 for entering pivot sockets 331 on approximate sides of side walls 332 defining part of cavity 314. Door 320 pivots on pins 328 between open and closed positions. Walls 332 also have pivot sockets 334 for receiving pins 306 of retractable arm 35.

Cavity-covering end door 320 further has a hydraulically retractable pin 336 for moving in and out of a socket 338 located in an arm 340 of door 320, and a hole 339 in stem 308. Door 320 also has parallel legs 342 with aligned holes 344. Stem 308 of retractable arm 35 has an upstanding portion 346 with a slot 348 extending longitudinally in stem 308. Portion 346 extends between legs 342, and a slider pin 350 extends through slot 348 and into each hole 344 to couple retractable arm 308 to cavity cover door 320. A hydraulic arm 352 has legs 354 with aligned holes 360 for going between a pair of legs 362 at an end floor 364 of cavity 314, legs 362 having aligned holes 366, and legs 354 are held in place by a pin 356 extending through holes 360 and 366. Another pair of parallel legs 368 extends from a shaft 369 extending generally forwardly from arm 352, and a pair of aligned holes 370 receive a pin 371. Doors 316 are opened and closed by hydraulic or electro-mechanical means, coordinated with door 320.

The foregoing arrangement locks doors 316 and 320, which are shown in FIG. 27 in their open position, and head members 302 of each retractable arm 35 remain in the respective slots 300 in rocket 18. When rocket 18 is in freefall with carriage 20 and becomes weightless with respect to carriage 20, arms 35 are rapidly retracted into their respective cavities 314 along with the rest of the assembly operating with arms 35, and doors 316 and 320 are closed just prior to ignition of a short duration booster rocket 998 of rocket 18 as shown in FIG. 7. Each rocket 18 can have small sets of wheels 372 to keep rocket 18 centered in tube 312 during launch in the event the line of thrust is not exactly coaxial with the internal tube of carriage 20 or does not pass through the rocket's center of mass.

Figure 28:
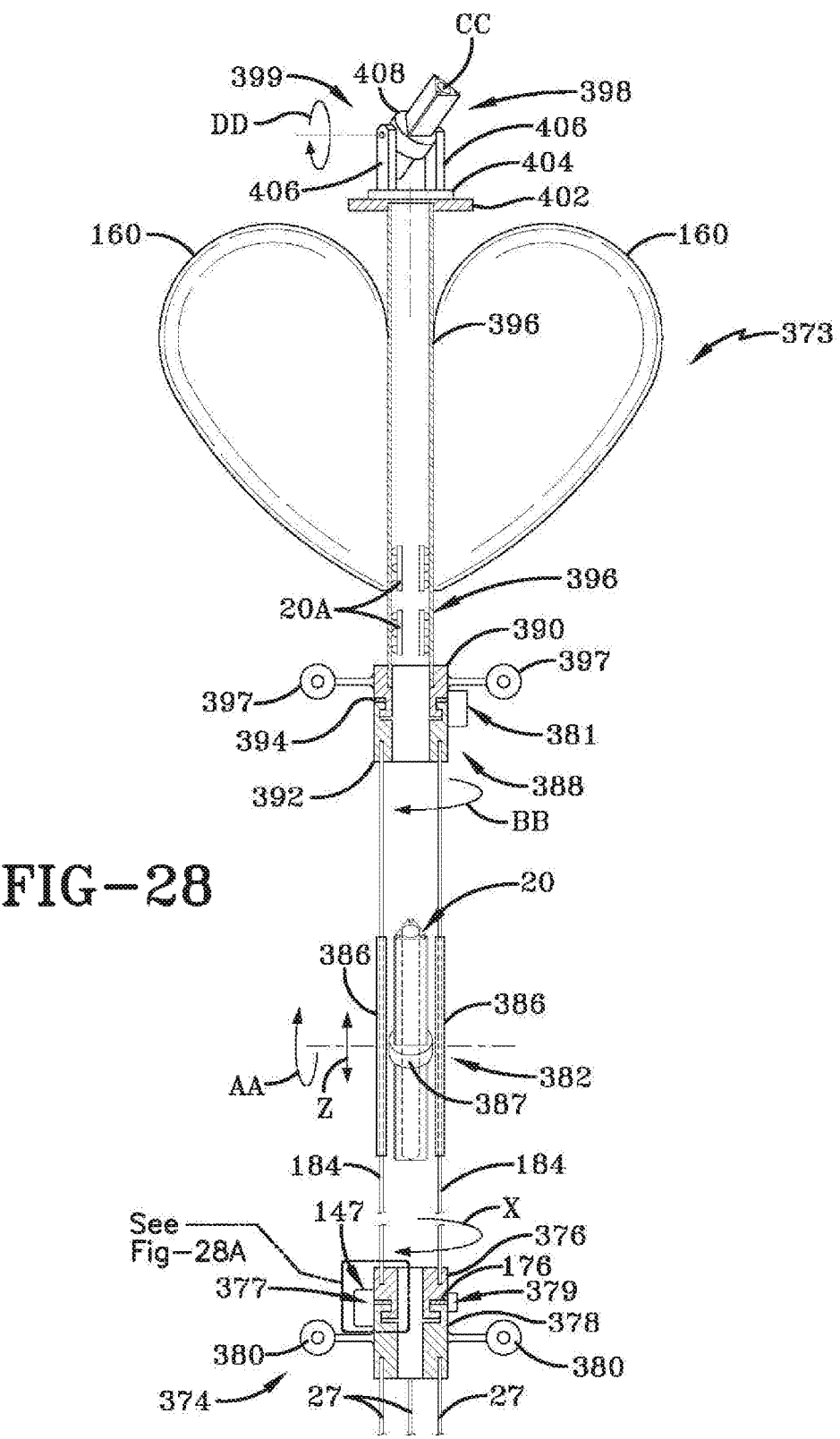
FIG. 28 is a schematic view of the upper portion of a preferred embodiment of the rocket launching invention if a telescope is to be mounted on top of the main lift balloon or balloons.
Figure 28A:
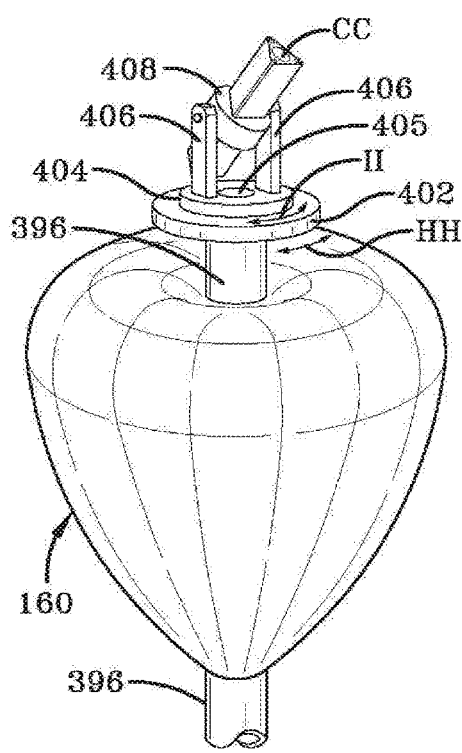
FIG. 28A is a perspective view of the upper portion of FIG. 28.
Figure 28B:
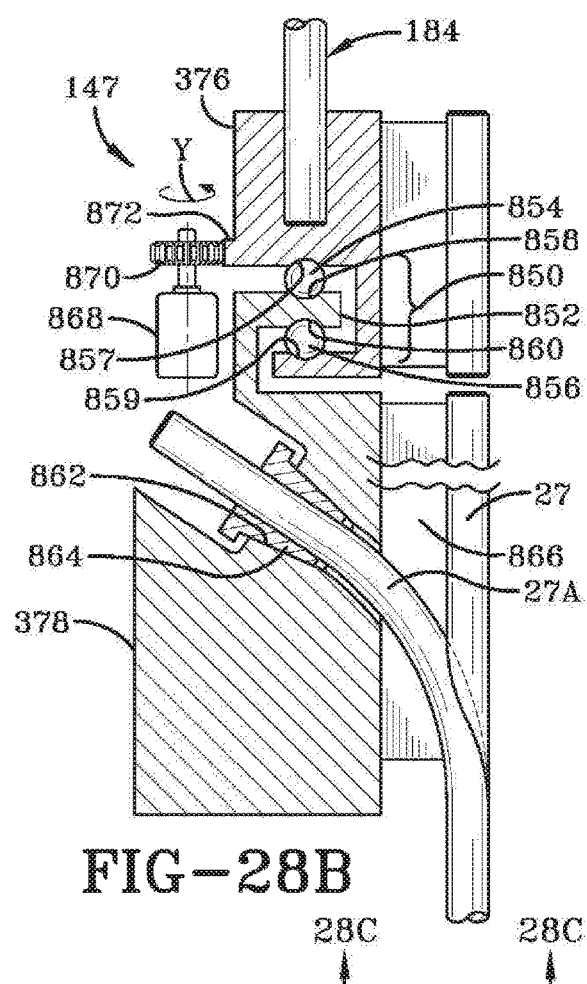
FIG. 28B is a detailed, enlarged detail cross-sectional side view of a portion of the apparatus shown in FIG. 28 including a geared rotational drive system and a ring bearing.
Figure 28C:
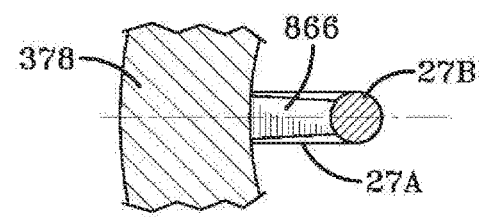
FIG. 28C is taken in the direction 28C-28C in FIG. 28B, and showing generally how cables may be terminated.

Another version of the invention, in addition to launching rockets, can be used if a telescope is to be lifted to the top of the unit. Referring to FIGS. 28 and 28A, a telescope holding system 373 is shown. FIG. 28A shows balloon 160 in reduced form. The components related to the telescope are discussed below. System 1 has three primary cables 27 which carry electric power, and are attached to a docking station 374. Docking station 374 has an upper part 376 which is rotatable in the direction of arrow X relative to a lower part 378 using rotational drive system 379. Referring to FIGS. 28B and 28C, rotational drive system 147 rotates upper part 376 and lower part 378 relative to each other by means of a ring bearing 850 having an inverted L-shaped member 852 in cross section, with sets of ball bearings 854 and 856 in tracks 857, 858 and 859, 860 in upper part 376 and L-shaped member 852, and lower part 378 and L-shaped member 852, respectively.

The upper ends of cables 27 are held fast as shown. One cable 27A extends at an angle through an opening 862 in lower part 378 and an appropriate clamping mechanism 864 for holding cable 27A fast. A second one of cables 27 is shown as cable 27B, and it is held fast by an appropriate means to a flange 866, as further shown in FIG. 28C. The third one of cables 27 is similarly held fast. A motor 868 rotates a gear 870. Gear 870 is sequentially connected to teeth 872 of upper part 376 to effect the foregoing rotation as shown by arrow Y. A protective housing could enclose motor 868 and gear 870.

Three or more reaction thrusters 380 can be used, and they offset the relative rotation of parts 390 and 378 which are kept stationary when the alternate launching system depicted in FIG. 28 is used to launch rockets. Similar to other docking stations, a ring bearing 377 and rotational drive system 147 are included between upper and lower parts 376, 378 of docking station 374. Secondary cables 184 also carry electrical power for operating the electrically powered components. It could be a two cable direct current apparatus or a four cable, three-phase apparatus.

A lift ring 382 drives up or down in the direction shown by arrows Z on cables 184. Lift ring 382 includes reversible traction drives 386, and a structure 387 for holding carriage 20 which is able to pivot in the direction indicated by arrow AA and a rotary drive 381 to change the angle of lift ring 382 and carriage 20. An upper docking station 388 has an upper part 390 normally held stationary and a lower part 392, being rotatable in directions shown by arrows BB about a vertical axis using rotary drive 381. A ring bearing 394 reduces the friction from such rotation. A minimum set of three reaction force thrusters 397 counters the tendency of upper parts 390 to rotate about the vertical axis.

A rigid elevator shaft or elevator tube 396 may carry special carriages 398 each having a telescope CC built within, to a top mount 399. A special lightweight carriage or carriages 20A could also be used for transporting carriage 20 up elevator tube 396 to mount 399 after transfer from lift ring 382. A set of electricity carrying cables or rails could be mounted on the inside of elevator tube 396 which the wheels of carriages 398 or 20A would engage and also receive electric power (as did wheels of traction drives 26 which engaged cables 27), to enable the transport of carriage 20A up and down the inside of elevator tube 396. Balloon(s) 160 are attached to or surround elevator tube 396 as described earlier to provide sufficient tension to cables 184 to enable the transport of lift ring 382 with special carriage 398 holding telescope CC therein, as well as to support the cables themselves and the apparatus attached to the cables.

Figure 29:
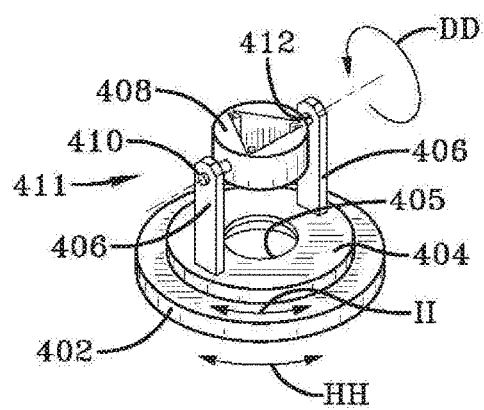
FIG. 29 shows a possible telescope mount for use in the embodiment shown in FIG. 28, the view being in a detailed, perspective form.

Telescope top mount 399 includes a turret-like platform 402 upon which is disposed a rotatable turntable 404, which rotates with respect to stationary upper part 390. A telescope-receiving hole 405 extends through platform 402 and turntable 404 as shown in FIGS. 28A and 29. Mounting walls 406 extend from turntable 404. A telescope-holding structure or ring 408 clamps special carriage 398 with telescope CC therein, with the center of gravity of carriage 398 disposed in the center of ring 408 which acts in the same manner as lift ring assembly 182 but without traction drives. As shown in detail in FIG. 29, ring 408 has coaxial pivot pins 410 which extend into sockets 412 of mounting walls 406. Mounting walls 406, ring 408 and pivot pins 410 for a telescopic tilting structure 411 are provided. Therefore, carriage 398 and telescope CC mounted within it can be tilted in elevation as desired, and the rotation in azimuth shown by arrow DD of turntable 404 directs carriage 398 and telescope CC included in any desired direction. Turntable 404 and platform 402 may be made independently rotatable in the respective opposite directions shown by arrows HH and II (FIGS. 28A, 29) with respect to elevator tube 396. This rotation is effected by means of a rotary drive 383, similar to drive 381. Platform 402 may have radially adjustable weights to make its rotational moment of inertia equal to the rotational moments of inertia of the assembly of turntable 404 and parts above it so that when they are rotated in opposite directions no net torque is applied to elevator tube 396 as turntable 404 and parts above it are rotated.

Figure 30:
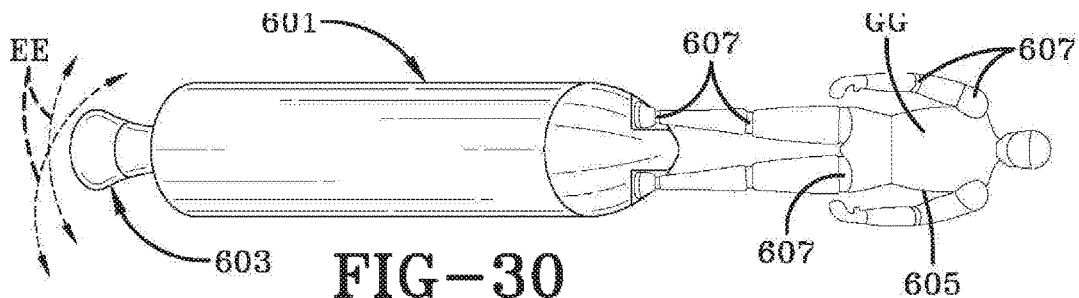
FIG. 30 is a schematic view of a rocket for launching a single space suited person, according to a preferred embodiment of the invention.

Rocket launch system 1 can be used for a variety of purposes. For example, it could be used to launch a single man or basic rocket 601 which has a steerable motor 603 as shown in FIG. 30, which is movable as indicated by arrows EE to steer rocket 601. A person or occupant GG is shown wearing a fluid filled launch or re-entry suit 605 with joints 607 locked in an optimal aerodynamic upright position for launch and locked feet first onto the top of rocket 601, for resisting the g-force effects of the firing of rocket 18 during launch. Suit 605 detaches from rocket 601 as desired after rocket 601 stops operating and the joints of the suit are unlocked, permitting the occupant GG to move freely. If the suit is to be used for re-entry, a portion of the fluid surrounding the occupant GG can be pumped through porous pads to cool by evaporation the exterior of re-entry suit 605 upon re-entry, feet first. (The same pumping operation and the cooling effect would apply at launch as well.) Rocket 601 with occupant GG in suit 605 mounted on top, should afford occupant GG an excellent view during the launch phase. An aerodynamic fairing around suit 605 may not be required, unless when so configured, and the set of joints 607 are locked in position, aerodynamic drag is still higher than necessary for optimal launch.

Figure 31:
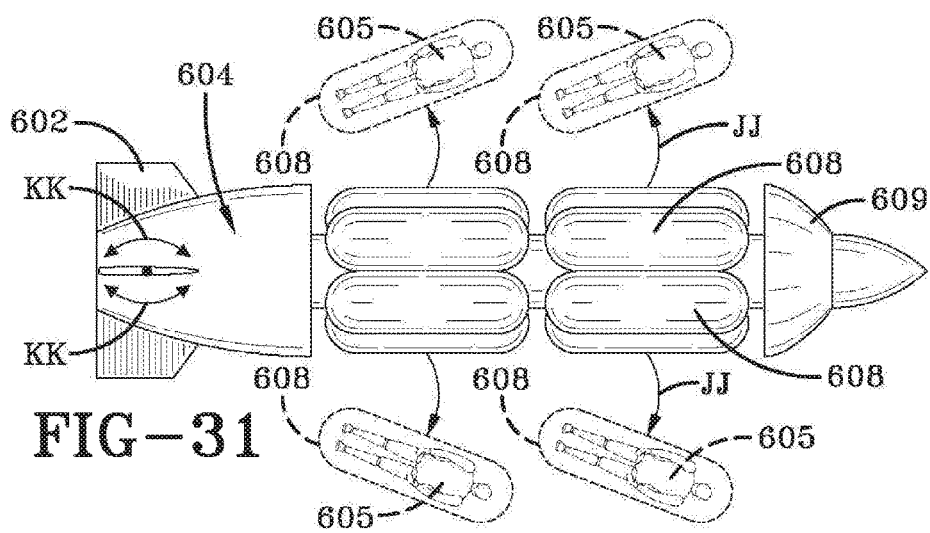
FIG. 31 is a variant of the rocket for multiple, individually releasable pods or space suited persons.

FIG. 31 shows a possible method for transporting tourists in suits 605 or materials in rigid pods 608 releasably clamped to a core rocket 604. Main rocket 601 ceases its controlled launch at a period after its launch. Core rocket 604 is releasable from main rocket 601 upon cessation of the controlled launch of main rocket 601. A windshield 609 can be used to protect tourists in suits 605 or pods 608 from high velocity air as rocket 601 penetrates the atmosphere on its way to space where the suits 605 or pods 608 may be released in the direction indicated by arrows JJ. Core rocket 604 may have a set of turntable fins 602 which are turned in the directions KK by the directional control system to steer rocket 601.

Figure 32:
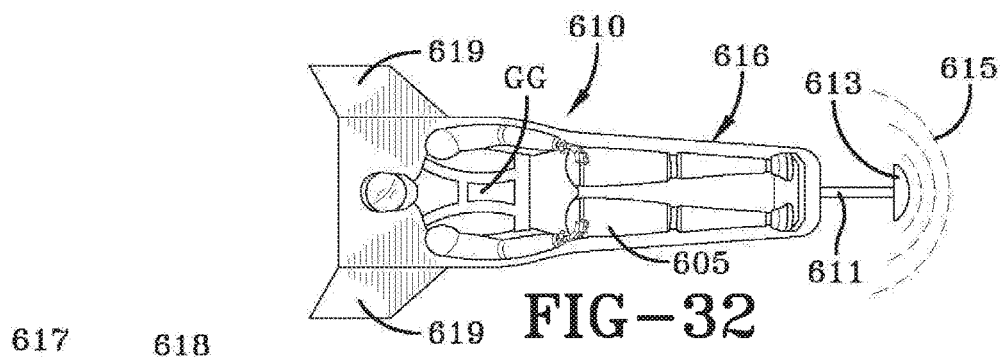
FIG. 32 shows a space suited person on a detachable re-entry frame utilizing an aero-spike for shockwave initiation.

FIG. 32 shows an alternate pod 610 with a sled-like re-entry frame 616. Occupant GG wears launch or re-entry suit 605. Sled-like re-entry frame 616 includes steering fins 619, and an aero-spike 611. Aero-spike 611 has an extendable antenna-like configuration with a disc 613 serving as a forward shockwave initiator to yield a shockwave 615 for reducing aerodynamic heating of suit 605.

Figure 33:
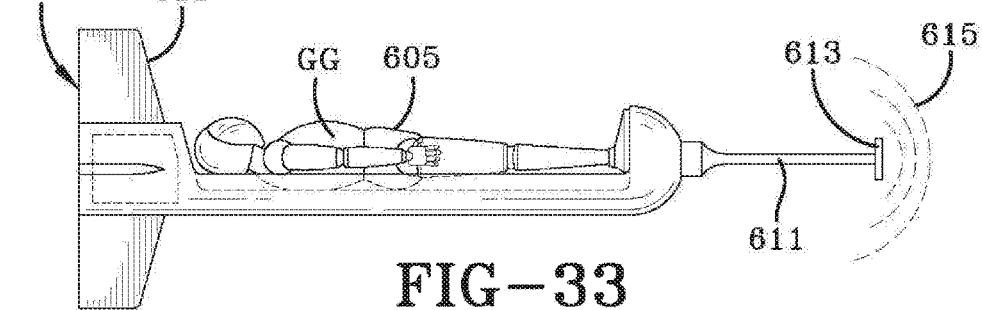
FIG. 33 shows another variant of a detachable re-entry frame utilizing an aero-spike for shockwave initiation.

In FIG. 33, re-entry suit 605 with person GG is shown fitted into a more rocket-like shaped frame 617 with directional steering fins 618 and aero-spike 611. Frame 617 has disk 613 as discussed with respect to FIG. 32. A guidance equipment and storage compartment may be located in the aft interior frame 617.

An appropriate space suit 605 is shown on person GG in FIGS. 34 and 35, also serving to accommodate g-force effects. Space suit 605 enables occupant GG to survive, remain conscious and be able to remain active while in an upright posture in a high acceleration environment. For extended operations, this is achieved by immersing the occupant in a fluid of approximately the same density as the body, within a rigid suit with external electro-mechanical or hydraulic, servo-assisted, constant volume joints. Space suit 605 has a helmet 650 (FIGS. 34, 34A, 34B, 36) surrounding the head of person GG, and a rigid outer shell 648. An inner suit 651 lies close to person GG, and an internal face mask 653 is sealed to the face of the occupant of space suit 605. A nontoxic fluid 656 (FIGS. 34, 34A-34B) such as water fills the space between rigid outer shell 648 and inner suit 651. If fluid 656 is heated to a comfortable temperature, inner suit 651 may be omitted. There is a double seal 654 between the face of the occupant and face mask 653. Inner suit 651 could be skin tight around person GG, and face mask 653 could be ventilated to or from an air supply via an air supply tube 661. A leakage tube or canal 652 is provided on face mask 653 of space suit 605 for draining water if there is leakage into the space between the double seals surrounding the face of person GG. Water or other appropriate nontoxic fluid 656 fills the space between inner suit 651 and outer shell 648, and face mask 653 and visor 655 as shown in FIGS. 34, 34A and 34B. Person GG in space suit 605 can turn his head within helmet 650 while suspended in water 656. Space suit 605 is of rigid lightweight construction; however, volumetric airflow sensors in face mask 653 or visor 655 could be provided to direct a hydraulic or electro-mechanical drive piston (explained below) to move in and out to match the change of volume due to breathing. Additionally, in order to match the breathing rate, that is, the change of volume divided by the change in time, pressure sensors at various places (particularly near the chest) in space suit 605 keep the liquid pressure constant by directing the piston in and out. The use of external high pressure hydraulic power assistance to permit person GG to move about freely in suit 605 in high acceleration environments such as exist during launch or re-entry avoids the possibility of water or other hydraulic fluid used to activate the joints of the suit from escaping into the suit's interior which could crush occupant GG.

With respect to the piston, reference is also made to FIG. 35. Here, space suit 605 has water (or nontoxic fluid approximating the density of the human body) 656 filling the suit around person GG, and a piston 657 moves in and out of a cylinder 660, powered by high pressure hydraulic fluid or direct actuation of piston 657 by electro-mechanical apparatus to vary the volume of suit 605 as required for normal respiration.

The rigid outer shell 648 is typical of the construction of suit 605 depicted in FIG. 34 and is shown in FIG. 36. Rigid outer shell 648 of suit 605 includes a pair of rigid sleeves, each containing internal sleeves 664 (only one is shown) each of which is made from open, elastic webbing or a soft, open pore foam or webbing and a pair of rigid legs each having internal legs of the same construction as internal sleeves 664. The internal sleeves and internal legs will hereinafter be referred to as "internal sleeves." The pores should be large enough so as not to impede significantly the flow of water through sleeve 664. Sleeve 664 is held centered within suit 605 by means of weak elastic tendons 668 attached at one end to suit 605, which extend across sleeve 664 and are attached to, and tangent to sleeve 664 to which they are attached at the other end. The tensions in elastic tendons 668 are sensed and used to provide feedback to direct the powered joints of suit 605 to mirror the motions of occupant GG, keeping him centered within the suit. An occupant GG merely slips into suit 605 and slides his or her entire body into typical sleeve 664. Suit 605 is a practical and efficient space suit to be worn by a person GG on rocket 601 or within rocket 18, particularly during the launch, boost and re-entry phases of flight. Outer shell 648 could have an ablative exterior material with insulation or heat resistant thermal insulation.

Other versions of a rocket are shown in FIGS. 37, 38, 38A and 39. A rocket 700 has an aerospace plane 702 with deployed, and folded lift and directional control structures 704 attached to the body shown in FIGS. 37, 38 and 38A, and foldable in the directions shown by arrows LL and MM A lifting body type re-entry vehicle 706 is shown in its folded launch configuration in FIG. 38 with lift and directional control structures 704 in folded condition. Lifting body type control re-entry vehicle 706 with lift and directional control structures 704 foldable in the further direction indicated by arrows NN is shown in FIG. 38A in the folded and unfolded configurations. Rocket 700 is primarily a military version of rocket 18.

Referring to FIG. 39, a more typical rocket 720 is shown. Rocket 720 includes a satellite or other payload 722 which is protected during launch and flight by a pair of disposable aerodynamic shells 724. After rocket 720 has left the atmosphere, shells 724 are automatically detached in the directions indicated by arrows PP and preferably fall back to earth and the satellite or other payload 722 goes into space. Rocket 720 is primarily a commercial version of rocket 18.

The preferred embodiment described above can be achieved using presently available materials and products. The typical carriage, loaded with a rocket, can be estimated to weigh 80 tons although greater weights are possible. Each cable must be strong and electrically conductive. It should further be wear resistant to withstand the travelling of traction wheels up and down the cables. Thus, cables 27 and 184 could have a steel exterior, with intermediary portion of aluminum, and a steel core. The cables could be multi-stranded with copper and steel strands and copper coated steel strands or other suitable construction. For a 70 ton lift, the cables should be about ⅔ inch in diameter. Each of three cables could have 1.25 inch diameter, and the secondary cables should each have a diameter of one inch.

As noted earlier, the weight of the cables is advantageously offset periodically. Steel cables having a diameter of 1.125 inches weigh about 2.03 pounds per foot. A factor of safety of at least five should be used. A one inch diameter cable holds 120 tons at its breaking point.

The preferred gas for the balloons should be hydrogen, which is much more buoyant than helium and may be generated from water, while limited supplies of helium are primarily mined from natural gas wells. However, safety is an important factor. The higher in the atmosphere the balloons go, the risk of a lightning strike increases. Therefore, the turntable, lifting assembly and components above all should be insulated from the earth, electrically charged to the same electric potential as the high altitude atmosphere to avoid attracting lightning, and the electrical power supply inductively connected. The insulating parts of the rocket launch system could advantageously be made from ceramics or glasses.

The skin for the balloons should be light, strong and ultraviolet (UV) light resistant. There has been ample work done in such skins from the design and operation of dirigibles and other balloons recently.

The advantages of the present inventive rocket launching system over those presently in use are quite apparent. The first stage of the Saturn V Rockets launched by NASA consumed 203,000 US gallons of RP-1 (refined kerosene) and 331,000 US gallons of liquid oxygen (LOX) in a period of 2.5 minutes. The present invention could have greatly reduced the amount of propellants to loft the same payload by lifting numerous smaller rockets using the electrically powered carriages with an equivalent payload up the balloon supported cables to a desired height prior to launch. The present state of the art uses a tremendous amount of non-recoverable fossil fuel based energy. For example, the Virgin Galactic White Knight Mothership uses tons of JET-A-1 kerosene fuel to reach its launch altitude for the Space Ship Two which uses a form of rubber with a liquid oxidizer, and yields a black sooty exhaust. Solid rocket boosters often leave fluorine and chlorine compounds and partially-burnt hydrocarbons amongst other dangerous residues in their exhaust. All of these exhausts and residues pollute the atmosphere. On the other hand, the energy used in lifting the carriages in the preferred form of the present invention is derived from renewable sources and a significant portion is recovered when the traction drives switch to their regenerative mode when the carriage goes back down the cableway.

Furthermore, the present invention will reduce the cost of space flight sufficiently to permit the removal of debris in the orbit around our planet and even permit the construction of an orbital shipyard. A vivid example of the hazards of orbital debris in space was the collision of a non-operational Russian Cosmos 2251 communications satellite with a U.S.-based mobile telephony satellite owned by Iridium on Feb. 11, 2008. Each satellite was travelling at an orbital speed of 17,500 miles per hour. The debris from this collision was estimated to amount to 500 pieces. NASA has said that this debris from the collision has elevated the risk of damage to the International Space Station. The International Association for the Advancement of Space Safety has proposed the mandatory removal of non-operating satellites.

The present invention thus includes a set of cables supported by lighter-than-air balloons, which can be used for a variety of purposes in a very effective and efficient manner. When used to launch rockets, the amount of fuel required at launch is dramatically reduced since the rockets are transported into the upper atmosphere before their engines are operated. The rockets can be used for a variety of purposes, and due to the reduced energy expenditure and the resulting cost reduction, such uses as recreational sports using rockets, parachutes, small jet engines, or other apparatus could be economically feasible. Likewise, facilities for servicing satellites become more feasible and economic. Uses for high altitude platforms such as for telescopes could be a tremendous benefit to scientists.

In the preferred embodiment discussed above, three cables were provided for three-phase electrical power. It is likely each cable should transmit exactly one third of electricity. In the event this cannot be done or in the event there is a possibility it can be accomplished during use of the rocket launch system according to the invention, structure should be provided for either having a neutral line or else a ground to get the necessary electrical balance amongst each of the three cables.

The present invention has many uses in addition to those described above. There is a tremendous amount of debris orbiting the earth from the many rockets driven into space. NASA has estimated that in 2009, there are about 14,000 objects which are being tracked by the U.S. Space Surveillance Network. Many of these objects threaten other devices which may pass through the respective orbits of these objects, since collisions could cause considerable damage. The present invention could be used to place debris catchers in orbits for recovering and de-orbiting such debris in an economical and safe manner or recycling such items as may be reusable into useful structures in orbit.

The cables discussed herein were described as being of the general type of rope composed of twisted strands of metal and shown as twisted into a helix. These are wire ropes which are electrically conductive, and are similar to those used on cable cars, funiculars and aerial lifts. Different variations in the cables have been discussed as well. However, the term "cable" is not intended to be restricted to wire ropes. Cables could also be rods of different sorts, coming in single lengths, joined by various types of welding, or in a series of smaller links which are coupled together to yield the desired length. The important feature of whatever cable is used according to the invention is that it be strong, electrically conductive and able to take the stresses and strains which would exist at elevated altitudes for transporting rocket transporting devices and other apparatus as discussed herein. These rods or other types of cables may be modified in different respects, such as, for example, to modify the surface or configuration of the surface of the rods or other cables so that the system would operate more effectively and more efficiently when the rods or other cables cooperate with the traction drives of the respective rocket transporting devices. Such rods could have a cylindrical cross section or other cross sections depending, for example, on the nature of the traction drives used therewith. Referring to FIGS. 40 and 41, a rod 990 is shown connecting flanges 992 attached at joints 994. Flanges have attachment holes 996. As required to attach spacers on other structures to the side of the rods to allow bolted or other connections may be attached by means of bonding, solid state or other forms of welding (e.g. friction welding, explosive welding, brazing, etc.) or joining as deemed fit. The rods could be modified in other ways depending on such factors as the nature of the linkage of the respective rods, the electric conductivity of the rods, the safety of the rods and the like.

The invention has been described in detail with particular reference to the preferred embodiments thereof. However, variations and modifications within the spirit and scope of the invention may occur to those skilled in the art from the foregoing material and from the appended claims.

The invention claimed is:

1. A carriage for transporting a rocket for use in a rocket launch system, the rocket launch system having a set of rocket transport lines extending between a low altitude and a high altitude, a set of electric power lines extending between a low altitude and a high altitude and lighter-than-air balloons connected to sets of rocket transport lines and the set of electric power lines for holding the rocket transport lines and electric power lines at respective altitudes extending between the low altitude and the high altitude, said carriage comprising:
a multi-sided cross section; and
a set of traction wheels configured to engage said rocket transport lines and rotating to convey said carriage along said rocket transport lines.

2. The carriage according to claim 1 wherein said set of traction wheels is configured to be electrically powered, wherein each traction wheel of said set of traction wheels engages a respective one of said electric power lines for deriving electric power from said electric power lines to drive the wheels when said carriage is at a low altitude for transporting said carriage to a higher altitude.

3. The carriage according to claim 1 wherein the carriage is configured to interface with at least one receptacle for lifting the carriages into components of the rocket launch system.

4. The carriage according to claim 3 wherein said receptacles are at least one pin lock receptacle.

5. The carriage according to claim 1 wherein said carriage further comprises at least one internal retractable arm having an active condition for holding a rocket securely within said carriage, and said at least one internal retractable arm being retractable to an inactive condition to enable launch of the rocket from said carriage.

6. The carriage according to claim 5 wherein said at least one retractable arm is configured to hold a rocket with the center of gravity of the rocket being coincident with the center of gravity of said carriage.

7. The carriage according to claim 1 wherein:
said multi-sided cross section consists of the following:
three sides defining a triangular cross section, each of said three sides intersecting the other two sides to form three intersections; and
external recesses extending along said respective three intersections for being engaged for guidance by components of the rocket launch system.

8. The carriage according to claim 1 wherein the set of rocket transport lines and the set of electric power lines of the rocket launch system are integrally combined in a set of power and transporting cables, the power and transporting cables being three in number, and wherein said set of traction wheels engages the respective power and transporting cables for transporting said carriage along the power and transporting cables between lower altitudes and higher altitudes, said traction wheels comprising cylindrical wheels having annular grooves for partially enveloping the respective power and transporting cables.

9. The carriage according to claim 1 for use in a rocket launch system wherein the set of rocket-transporting lines and the set of electric power lines are integrally combined in a set of power and transporting cables, and wherein each traction wheel of said set of traction wheels is a component of a traction drive, wherein each of said traction drives comprise:
electrically powered energizing apparatus for deriving electrical power from the set of power and transporting cables in response to said respective traction drives requiring energy to move said carriage upwards on the power and transporting cables, and for supplying electrical power to the power and transporting cables when said electrically powered energizing apparatus generates and transfers the electric power to the set of power and transporting cables while said traction drives retard the downward motion on the set of power and transporting cables.

10. The carriage according to claim 9 wherein said electrically powered energizing apparatus includes a motor-generator operatively coupled with said set of traction wheels for being powered by said respective traction wheels when said respective traction wheels in said set of traction wheels rotate as said carriage descends the power and transporting cables.

11. The carriage according to claim 5 wherein, in the event a rocket is to be transported by said carriage, the rocket to be transported by said carriage has at least two slots, and wherein:
said at least one internal retractable arm has stem members and a head member connected to said at least one retractable arm;
each of said at least one head member enters the corresponding slot in the rocket to be transported and holds the rocket securely in said carriage in response to said at least one internal retractable arm assuming said active condition; and
said at least one head member being retractable from the slot to enable launch of the rocket from said carriage in response to said at least one internal retractable arm assuming said inactive condition.

12. The carriage according to claim 11 wherein said carriage further comprises:
a heat-and-pressure resistant tube, said heat-and-pressure resistant tube comprising:
walls defining a cavity for holding said at least one internal retractable arm, and protecting doors movable between an open position for enabling movement of said at least one internal retractable arm to hold a rocket in a closed position to protect said retractable arm.

13. The carriage according to claim 12 wherein said heat-and-pressure resistant tube further comprises:
cavity-covering end doors movable between a closed position for covering said cavity and an open position for uncovering said cavity; and
an airflow deflector for protecting said protecting doors and said cavity-covering end doors from hot rocket exhaust gases.

14. The carriage according to claim 13 and further comprising pivot pins for mounting said cavity-covering end doors for enabling the movement of said cavity-covering end doors between said open and closed positions.

15. The carriage according to claim 13 wherein each of said at least one internal retractable arm comprises:
- a base member mounted in said cavity for moving each of said at least one internal retractable arm between said active and said inactive positions; and
- a stem connecting said base member to said head member; and wherein each of said at least one internal retractable arm movably coupled to said cavity-covering end door;

and wherein said carriage further comprises:
- a hydraulic cylinder movably coupled to each of said at least one internal retractable arm for moving said at least one internal retractable arm between the active and inactive conditions in response to movement of said cavity-covering end doors to the closed position to hold the rocket securely in said carriage.

\* \* \* \* \*